United States Patent
Labrosse et al.

(10) Patent No.: US 10,827,829 B1
(45) Date of Patent: Nov. 10, 2020

(54) HEIGHT ADJUSTABLE SUPPORT SURFACE AND SYSTEM FOR ENCOURAGING HUMAN MOVEMENT AND PROMOTING WELLNESS

(71) Applicant: Steelcase Inc., Grand Rapids, MI (US)

(72) Inventors: Jean-Paul Labrosse, Altadena, CA (US); Michael Xinjie Chu, Los Angeles, CA (US); Scott Sullivan, San Francisco, CA (US); Matthew N. Schneider, Sierra Madre, CA (US)

(73) Assignee: STEELCASE INC., Grand Rapids, MI (US)

( * ) Notice: Subject to any disclaimer, the term of this patent is extended or adjusted under 35 U.S.C. 154(b) by 0 days.

(21) Appl. No.: 15/442,947

(22) Filed: Feb. 27, 2017

Related U.S. Application Data

(63) Continuation-in-part of application No. 15/285,939, filed on Oct. 5, 2016, now Pat. No. 10,133,261, and
(Continued)

(51) Int. Cl.
*A47B 9/12* (2006.01)
*G05B 15/02* (2006.01)

(52) U.S. Cl.
CPC ............ *A47B 9/12* (2013.01); *G05B 15/02* (2013.01)

(58) Field of Classification Search
CPC ....... A47B 9/00; A47B 9/20; A47B 220/0062; A47B 220/0056; A47B 220/0061;
(Continued)

(56) References Cited

U.S. PATENT DOCUMENTS

| | | |
|---|---|---|
| 2,561,481 A | 7/1951 | Rody |
| 2,580,598 A | 1/1952 | Rody |

(Continued)

FOREIGN PATENT DOCUMENTS

| | | |
|---|---|---|
| CN | 202286910 U | 7/2012 |
| DE | 19604329 A1 | 8/1997 |

(Continued)

OTHER PUBLICATIONS

Anthro Corporation, Can Anthro "Walk the Talk"?: Employees Embark on a 30-Day Sit-Stand Challenge, Press Release Oct. 11, 2010, www.anthro.com/press-releases/2010/employees-embark-on-a-30-day-sit-stand-challenge, copyright 2016, 4 pages.
(Continued)

*Primary Examiner* — Daniel J Troy
*Assistant Examiner* — Timothy M Ayres
(74) *Attorney, Agent, or Firm* — Quarles & Brady LLP

(57) ABSTRACT

A system for managing the elevation of a workstation, the system comprising a frame, a worktop having an upper worksurface, at least a first powered vertical-displacement drive mechanism connected between the frame and the worktop and arranged to selectively vertically displace the worktop with respect to the frame, a presence sensor and a processor linked to the drive mechanism and the sensor, the processor using information from the presence sensor to track user presence at the workstation and, upon detecting that the workstation is unoccupied, automatically controlling the drive mechanism to move the worktop from a current height to a scheduled height.

23 Claims, 32 Drawing Sheets

Related U.S. Application Data a continuation-in-part of application No. 14/612,302, filed on Feb. 3, 2015, now Pat. No. 10,038,952, application No. 15/285,939, which is a continuation of application No. 14/035,974, filed on Sep. 25, 2013, now Pat. No. 9,486,070.

(60) Provisional application No. 62/409,041, filed on Oct. 17, 2016, provisional application No. 61/935,343, filed on Feb. 4, 2014, provisional application No. 61/795,222, filed on Oct. 10, 2012.

(58) Field of Classification Search
CPC ..... A47B 220/008; A47B 21/02; A47B 17/02; G06Q 10/1091; G05B 19/048; G05B 2219/24015; A63B 71/0622; A63B 24/0075; A63B 2024/0068; G06F 19/3481
USPC ............... 108/50.02, 147, 20–22; 312/330.1, 312/319.5–319.9
See application file for complete search history.

(56) References Cited

U.S. PATENT DOCUMENTS

| | | | |
|---|---|---|---|
| 3,953,770 A | 4/1976 | Hayashi | |
| 4,163,929 A | 8/1979 | Janu et al. | |
| 4,440,096 A | 4/1984 | Rice et al. | |
| 4,571,682 A | 2/1986 | Silverman et al. | |
| 4,779,865 A | 10/1988 | Lieberman et al. | |
| 4,821,118 A | 4/1989 | Lafreniere | |
| 4,828,257 A | 5/1989 | Dyer et al. | |
| 4,849,733 A | 7/1989 | Conigliaro et al. | |
| 4,894,600 A | 1/1990 | Kearney | |
| 5,019,950 A | 5/1991 | Johnson | |
| 5,022,384 A | 6/1991 | Freels et al. | |
| 5,089,998 A | 2/1992 | Rund | |
| 5,140,977 A | 8/1992 | Raffel | |
| 5,224,429 A * | 7/1993 | Borgman | A47B 9/00 108/147 |
| 5,259,326 A | 11/1993 | Borgman et al. | |
| 5,305,238 A | 4/1994 | Starr, III et al. | |
| 5,308,296 A | 5/1994 | Eckstein | |
| 5,314,391 A * | 5/1994 | Potash | A63B 22/0023 340/573.1 |
| 5,323,695 A | 6/1994 | Borgman et al. | |
| 5,335,188 A | 8/1994 | Brisson | |
| 5,371,693 A | 12/1994 | Nakazoe | |
| 5,412,297 A | 5/1995 | Clark et al. | |
| 5,435,799 A * | 7/1995 | Lundin | A63B 24/00 482/1 |
| 5,456,648 A | 10/1995 | Edinburg et al. | |
| 5,485,376 A * | 1/1996 | Oike | B62D 1/181 180/400 |
| 5,583,831 A | 12/1996 | Churchill et al. | |
| 5,612,869 A | 3/1997 | Letzt et al. | |
| 5,666,426 A | 9/1997 | Helms | |
| 5,765,910 A | 6/1998 | Larkin et al. | |
| 5,769,755 A | 6/1998 | Henry et al. | |
| 5,853,005 A | 12/1998 | Scanlon | |
| 5,857,986 A | 1/1999 | Moriyasu | |
| 5,870,647 A | 2/1999 | Nada et al. | |
| 5,890,997 A | 4/1999 | Roth | |
| 5,944,633 A | 8/1999 | Wittrock | |
| 6,013,008 A | 1/2000 | Fukushima | |
| 6,014,572 A | 1/2000 | Takahashi | |
| 6,030,351 A | 2/2000 | Schmidt et al. | |
| 6,032,108 A | 2/2000 | Sciple et al. | |
| 6,075,755 A | 6/2000 | Zarchan | |
| 6,135,951 A | 10/2000 | Richardson et al. | |
| 6,142,910 A | 11/2000 | Heuvelman | |
| 6,161,095 A | 12/2000 | Brown | |
| 6,244,988 B1 | 6/2001 | Delman | |
| 6,286,441 B1 | 9/2001 | Burdi et al. | |
| 6,296,408 B1 | 10/2001 | Larkin et al. | |
| 6,312,363 B1 | 11/2001 | Watterson et al. | |
| 6,360,675 B1 | 3/2002 | Jones | |
| 6,447,424 B1 | 9/2002 | Ashby et al. | |
| 6,458,060 B1 | 10/2002 | Watterson et al. | |
| 6,527,674 B1 | 3/2003 | Clem | |
| 6,595,144 B1 | 7/2003 | Doyle | |
| 6,622,116 B2 | 9/2003 | Skinner et al. | |
| 6,669,286 B2 | 12/2003 | Iusim | |
| 6,702,719 B1 | 3/2004 | Brown et al. | |
| 6,716,139 B1 | 4/2004 | Hosseinzadeh-Dolkhani et al. | |
| 6,746,371 B1 | 6/2004 | Brown et al. | |
| 6,749,537 B1 | 6/2004 | Hickman | |
| 6,783,482 B2 * | 8/2004 | Oglesby | A63B 22/0023 482/51 |
| 6,790,178 B1 | 9/2004 | Mault et al. | |
| 6,793,607 B2 | 9/2004 | Neil | |
| 6,812,833 B2 | 11/2004 | Rothkop et al. | |
| 6,870,477 B2 | 3/2005 | Gruteser et al. | |
| 6,964,370 B1 | 11/2005 | Hagale et al. | |
| 6,977,476 B2 * | 12/2005 | Koch | A47B 9/00 318/280 |
| 6,987,221 B2 | 1/2006 | Platt | |
| 7,030,735 B2 | 4/2006 | Chen | |
| 7,063,644 B2 | 6/2006 | Albert et al. | |
| 7,070,539 B2 | 7/2006 | Brown et al. | |
| 7,097,588 B2 | 8/2006 | Watterson et al. | |
| 7,128,693 B2 | 10/2006 | Brown et al. | |
| 7,141,028 B2 | 11/2006 | Aminian et al. | |
| 7,161,490 B2 | 1/2007 | Huiban | |
| 7,172,530 B1 | 2/2007 | Hercules | |
| 7,301,463 B1 | 11/2007 | Paterno | |
| 7,327,442 B1 | 2/2008 | Fear et al. | |
| 7,439,956 B1 | 10/2008 | Albouyeh et al. | |
| 7,510,508 B2 | 3/2009 | Santomassimo et al. | |
| 7,523,905 B2 | 4/2009 | Timm et al. | |
| 7,538,284 B2 | 5/2009 | Nielsen et al. | |
| 7,594,873 B2 | 9/2009 | Terao et al. | |
| 7,614,001 B2 | 11/2009 | Abbott et al. | |
| 7,628,737 B2 | 12/2009 | Kowallis et al. | |
| 7,635,324 B2 | 12/2009 | Balls | |
| 7,637,847 B1 | 12/2009 | Hickman | |
| 7,640,866 B1 | 1/2010 | Schermerhorn | |
| 7,645,212 B2 | 1/2010 | Ashby et al. | |
| 7,652,230 B2 | 1/2010 | Baier | |
| 7,661,292 B2 * | 2/2010 | Buitmann | A47B 9/00 73/12.01 |
| 7,681,949 B2 | 3/2010 | Nathan et al. | |
| 7,713,172 B2 * | 5/2010 | Watterson | A63B 22/0242 482/4 |
| 7,717,827 B2 | 5/2010 | Kurunmaki et al. | |
| 7,722,503 B1 | 5/2010 | Smith et al. | |
| 7,735,918 B2 | 6/2010 | Beck | |
| 7,857,731 B2 | 12/2010 | Hickman et al. | |
| 7,884,808 B2 | 2/2011 | Joo | |
| 7,892,148 B1 | 2/2011 | Stauffer et al. | |
| 7,909,737 B2 | 3/2011 | Ellis et al. | |
| 7,914,468 B2 | 3/2011 | Shalon et al. | |
| 7,931,563 B2 | 4/2011 | Shaw et al. | |
| 7,955,219 B2 | 6/2011 | Birrell et al. | |
| 8,001,472 B2 | 8/2011 | Gilley et al. | |
| 8,024,202 B2 | 9/2011 | Carroll et al. | |
| 8,047,914 B2 | 11/2011 | Morrow | |
| 8,047,966 B2 | 11/2011 | Dorogusker et al. | |
| 8,051,782 B2 | 11/2011 | Nethken et al. | |
| 8,052,580 B2 | 11/2011 | Saalasti et al. | |
| 8,092,346 B2 | 1/2012 | Shea | |
| 8,105,209 B2 | 1/2012 | Lannon et al. | |
| 8,109,858 B2 | 2/2012 | Redmann | |
| 8,113,990 B2 | 2/2012 | Kolman et al. | |
| 8,141,947 B2 | 3/2012 | Nathan et al. | |
| 8,159,335 B2 | 4/2012 | Cox, Jr. | |
| 8,167,776 B2 | 5/2012 | Lannon et al. | |
| 8,206,325 B1 | 6/2012 | Najafi et al. | |
| 8,257,228 B2 | 9/2012 | Quatrochi et al. | |
| 8,361,000 B2 | 1/2013 | Gaspard | |
| 8,381,603 B2 | 2/2013 | Peng et al. | |
| 8,432,356 B2 | 4/2013 | Chase | |
| 8,462,921 B2 | 6/2013 | Parker | |
| 8,477,039 B2 | 7/2013 | Gleckler et al. | |

(56) References Cited

U.S. PATENT DOCUMENTS

| | | | |
|---|---|---|---|
| 8,522,695 B2 | 9/2013 | Ellegaard | |
| 8,540,641 B2 | 9/2013 | Kroll et al. | |
| 8,550,820 B2 | 10/2013 | Soltanoff | |
| 8,560,336 B2 | 10/2013 | Schwarzberg et al. | |
| 8,593,286 B2 | 11/2013 | Razoumov et al. | |
| 8,595,023 B2 | 11/2013 | Kirchhoff et al. | |
| 8,596,716 B1 | 12/2013 | Caruso | |
| 8,620,617 B2 | 12/2013 | Yuen et al. | |
| 8,668,045 B2 | 3/2014 | Cohen | |
| 8,688,467 B2 | 4/2014 | Harrison et al. | |
| 8,690,578 B1 | 4/2014 | Nusbaum et al. | |
| 8,690,735 B2 | 4/2014 | Wafferson et al. | |
| 8,700,690 B2 | 4/2014 | Raghav et al. | |
| 8,771,222 B2 | 7/2014 | Kanderian, Jr. et al. | |
| 8,812,096 B2 | 8/2014 | Flaherty et al. | |
| 8,814,754 B2 | 8/2014 | Weast et al. | |
| 8,818,782 B2 | 8/2014 | Thukral et al. | |
| 8,821,350 B2 | 9/2014 | Maertz | |
| 8,825,482 B2 | 9/2014 | Hernandez-Abrego et al. | |
| 8,836,500 B2 | 9/2014 | Houvener et al. | |
| 8,847,988 B2 | 9/2014 | Geisner et al. | |
| 8,947,215 B2 | 2/2015 | Mandel et al. | |
| 8,965,541 B2 | 2/2015 | Martinez et al. | |
| 8,984,685 B2 | 3/2015 | Robertson et al. | |
| 8,997,588 B2 | 4/2015 | Taylor | |
| 9,049,923 B1 | 6/2015 | Delagey et al. | |
| 9,084,475 B2 | 7/2015 | Hjelm | |
| 9,119,568 B2 | 9/2015 | Yin et al. | |
| 9,167,894 B2 | 10/2015 | DesRoches et al. | |
| 9,196,175 B2 | 11/2015 | Walsh et al. | |
| 9,236,817 B2 | 1/2016 | Strothmann et al. | |
| 9,486,070 B2 | 11/2016 | Labrosse et al. | |
| 9,795,322 B1 | 10/2017 | Karunaratne et al. | |
| 9,905,106 B2 | 2/2018 | Yang et al. | |
| 9,907,396 B1 | 3/2018 | Labrosse et al. | |
| 9,971,340 B1 | 5/2018 | Labrosse et al. | |
| 10,038,952 B2 | 7/2018 | Labrosse et al. | |
| 10,085,562 B1 | 10/2018 | Labrosse et al. | |
| 10,130,169 B1 | 11/2018 | Labrosse et al. | |
| 10,130,170 B1 | 11/2018 | Labrosse et al. | |
| 10,133,261 B2 | 11/2018 | Labrosse et al. | |
| 10,159,337 B2 | 12/2018 | Abernethy et al. | |
| 10,206,498 B1 | 2/2019 | Labrosse et al. | |
| 10,209,705 B1 | 2/2019 | Labrosse et al. | |
| 2001/0013307 A1 | 8/2001 | Stone | |
| 2001/0028308 A1 | 10/2001 | De La Huerga | |
| 2002/0055419 A1 | 5/2002 | Hinnebusch | |
| 2002/0145512 A1 | 10/2002 | Sleichter, III et al. | |
| 2004/0010328 A1* | 1/2004 | Carson | G06Q 10/00 700/90 |
| 2004/0014014 A1 | 1/2004 | Hess | |
| 2004/0229729 A1 | 11/2004 | Albert et al. | |
| 2004/0239161 A1 | 12/2004 | Lee | |
| 2005/0058970 A1 | 3/2005 | Perlman et al. | |
| 2005/0075213 A1 | 4/2005 | Arick | |
| 2005/0113649 A1 | 5/2005 | Bergantino | |
| 2005/0165626 A1 | 7/2005 | Karpf | |
| 2005/0172311 A1 | 8/2005 | Hjelt et al. | |
| 2005/0182653 A1 | 8/2005 | Urban et al. | |
| 2005/0202934 A1 | 9/2005 | Olrik et al. | |
| 2005/0209051 A1 | 9/2005 | Santomassimo et al. | |
| 2006/0063980 A1 | 3/2006 | Hwang et al. | |
| 2006/0089238 A1 | 4/2006 | Huang et al. | |
| 2006/0205564 A1 | 9/2006 | Peterson | |
| 2006/0241520 A1 | 10/2006 | Robertson | |
| 2006/0250524 A1 | 11/2006 | Roche | |
| 2006/0266791 A1 | 11/2006 | Koch et al. | |
| 2007/0074617 A1 | 4/2007 | Vergo | |
| 2007/0135264 A1 | 6/2007 | Rosenberg | |
| 2007/0146116 A1 | 6/2007 | Kimbrell | |
| 2007/0179355 A1 | 8/2007 | Rosen | |
| 2007/0200396 A1 | 8/2007 | Baumann et al. | |
| 2007/0219059 A1 | 9/2007 | Schwartz et al. | |
| 2007/0265138 A1 | 11/2007 | Ashby | |
| 2008/0015088 A1 | 1/2008 | Del Monaco | |
| 2008/0030317 A1 | 2/2008 | Bryant | |
| 2008/0045384 A1 | 2/2008 | Matsubara et al. | |
| 2008/0051256 A1 | 2/2008 | Ashby et al. | |
| 2008/0055055 A1 | 3/2008 | Powell et al. | |
| 2008/0077620 A1 | 3/2008 | Gilley et al. | |
| 2008/0098525 A1 | 5/2008 | Doleschal et al. | |
| 2008/0132383 A1 | 6/2008 | Einav et al. | |
| 2008/0245279 A1 | 10/2008 | Pan | |
| 2008/0255794 A1 | 10/2008 | Levine | |
| 2008/0256445 A1 | 10/2008 | Olch et al. | |
| 2008/0300110 A1* | 12/2008 | Smith | A63B 22/001 482/9 |
| 2008/0300914 A1 | 12/2008 | Karkanias et al. | |
| 2008/0304365 A1 | 12/2008 | Jarvis et al. | |
| 2008/0306351 A1 | 12/2008 | Izumi | |
| 2009/0076335 A1 | 3/2009 | Schwarzberg et al. | |
| 2009/0078167 A1 | 3/2009 | Ellegaard | |
| 2009/0132579 A1 | 5/2009 | Kwang | |
| 2009/0156363 A1 | 6/2009 | Guidi et al. | |
| 2009/0195393 A1 | 8/2009 | Tegeler | |
| 2009/0212974 A1 | 8/2009 | Chiba et al. | |
| 2009/0229475 A1 | 9/2009 | Bally et al. | |
| 2009/0270227 A1 | 10/2009 | Ashby et al. | |
| 2009/0273441 A1* | 11/2009 | Mukherjee | A47C 31/126 340/5.82 |
| 2010/0049008 A1 | 2/2010 | Doherty et al. | |
| 2010/0073162 A1 | 3/2010 | Johnson et al. | |
| 2010/0135502 A1 | 6/2010 | Keady et al. | |
| 2010/0185398 A1 | 7/2010 | Berns et al. | |
| 2010/0198374 A1 | 8/2010 | Carson et al. | |
| 2010/0201201 A1 | 8/2010 | Mobarhan et al. | |
| 2010/0205542 A1 | 8/2010 | Walman | |
| 2010/0234184 A1 | 9/2010 | Le Page et al. | |
| 2010/0323846 A1 | 12/2010 | Komatsu et al. | |
| 2011/0015041 A1 | 1/2011 | Shea | |
| 2011/0015495 A1 | 1/2011 | Dothie et al. | |
| 2011/0033830 A1 | 2/2011 | Cherian | |
| 2011/0054359 A1 | 3/2011 | Sazonov et al. | |
| 2011/0080290 A1* | 4/2011 | Baxi | A61B 5/1116 340/573.1 |
| 2011/0104649 A1 | 5/2011 | Young et al. | |
| 2011/0120351 A1 | 5/2011 | Shoenfeld | |
| 2011/0182438 A1 | 7/2011 | Koike et al. | |
| 2011/0184748 A1 | 7/2011 | Fierro et al. | |
| 2011/0245979 A1 | 10/2011 | Koch | |
| 2011/0275939 A1* | 11/2011 | Walsh | A61B 5/4561 600/473 |
| 2011/0281248 A1 | 11/2011 | Feenstra et al. | |
| 2011/0281687 A1 | 11/2011 | Gilley et al. | |
| 2011/0296306 A1 | 12/2011 | Oddsson et al. | |
| 2012/0015779 A1 | 1/2012 | Powch et al. | |
| 2012/0051579 A1 | 3/2012 | Cohen | |
| 2012/0116550 A1 | 5/2012 | Hoffman et al. | |
| 2012/0173319 A1 | 7/2012 | Ferrara | |
| 2012/0316661 A1 | 12/2012 | Rahman et al. | |
| 2013/0002533 A1 | 1/2013 | Burroughs et al. | |
| 2013/0012788 A1 | 1/2013 | Horseman | |
| 2013/0086841 A1 | 4/2013 | Luper et al. | |
| 2013/0116092 A1* | 5/2013 | Martinez | A63B 24/0062 482/9 |
| 2013/0144470 A1 | 6/2013 | Ricci | |
| 2013/0199419 A1 | 8/2013 | Hjelm | |
| 2013/0199420 A1* | 8/2013 | Hjelm | A47B 9/00 108/20 |
| 2013/0207889 A1 | 8/2013 | Chang et al. | |
| 2013/0218309 A1 | 8/2013 | Napolitano | |
| 2013/0307790 A1 | 11/2013 | Konttori et al. | |
| 2013/0316316 A1 | 11/2013 | Flavell et al. | |
| 2013/0331993 A1* | 12/2013 | Detsch | G05B 15/02 700/275 |
| 2014/0096706 A1 | 4/2014 | Labrosse et al. | |
| 2014/0109802 A1 | 4/2014 | Dienes et al. | |
| 2014/0137773 A1 | 5/2014 | Mandel et al. | |
| 2014/0156645 A1 | 6/2014 | Brust et al. | |
| 2014/0245932 A1 | 9/2014 | McKenzie, III et al. | |
| 2014/0249853 A1 | 9/2014 | Proud et al. | |
| 2014/0270254 A1 | 9/2014 | Oishi et al. | |
| 2015/0015399 A1 | 1/2015 | Gleckler et al. | |
| 2015/0064671 A1 | 3/2015 | Murville et al. | |

(56) References Cited

U.S. PATENT DOCUMENTS

| | | |
|---|---|---|
| 2015/0071453 A1 | 3/2015 | Po et al. |
| 2015/0142381 A1 | 5/2015 | Fitzsimmons et al. |
| 2015/0302150 A1 | 10/2015 | Mazar et al. |
| 2016/0051042 A1 | 2/2016 | Koch |
| 2016/0106205 A1 | 4/2016 | Hall et al. |
| 2016/0309889 A1 | 10/2016 | Lin et al. |
| 2017/0052517 A1 | 2/2017 | Tsai et al. |
| 2017/0135636 A1 | 5/2017 | Park et al. |
| 2019/0155253 A1 | 5/2019 | Labrosse et al. |

FOREIGN PATENT DOCUMENTS

| | | |
|---|---|---|
| DE | 10260478 A1 | 7/2004 |
| DE | 102008044848 A1 | 3/2010 |
| DE | 202014005160 U1 | 7/2014 |
| EP | 1159989 A1 | 12/2001 |
| EP | 1470766 A1 | 10/2004 |
| GB | 2424084 A | 9/2006 |
| JP | H11178798 A | 7/1999 |
| JP | 2001289975 A | 10/2001 |
| JP | 2005267491 A | 9/2005 |
| SE | 516479 C2 | 1/2002 |
| WO | 0219603 A2 | 3/2002 |
| WO | 02062425 A1 | 8/2002 |
| WO | 2005032363 A1 | 4/2005 |
| WO | 2005074754 A1 | 8/2005 |
| WO | 2006042415 A1 | 4/2006 |
| WO | 2006042420 A1 | 4/2006 |
| WO | 2006065679 A2 | 6/2006 |
| WO | 2007099206 A1 | 9/2007 |
| WO | 2008008729 A2 | 1/2008 |
| WO | 2008050590 A1 | 2/2008 |
| WO | 2008101085 A2 | 8/2008 |
| WO | 2010019644 A2 | 2/2010 |
| WO | 2010023414 A1 | 3/2010 |
| WO | 2011133628 A1 | 10/2011 |
| WO | 2012061438 A2 | 5/2012 |
| WO | 2012108938 A1 | 8/2012 |
| WO | 2013033788 A1 | 3/2013 |

OTHER PUBLICATIONS

Benallal, et al., A Simple Algorithm for Object Location from a Single Image Without Camera Calibration, In International Conference on Computational Science and Its Applications, pp. 99-104. Springer Berlin Heidelberg, 2003.

Bendixen, et al., Pattern of Ventilation in Young Adults, Journal of Applied Physiology, 1964, 19(2):195-198.

BrianLaF, asp.net 4.0 TimePicker User Control, www.codeproject.com/articles/329011/asp-net-timepicker-user-control, Feb. 25, 2012, 5 pages.

Ejaz, Time Picker Ajax Extender Control, www.codeproject.com/articles/213311/time-picker-ajax-extender-control, Jun. 22, 2011, 8 pages.

Heddings, Stop Hitting Snooze: Change the Default Reminder Time for Outlook Appointments, www.howtogeek.com/howto/microsoft-oftice/stop-hitting-snooze-change-the-default-reminder-time-for-outlook-appointments, Apr. 25, 2008, 2 pages.

Hopkins Medicine, Vital Signs (Body Temperature, Pulse Rate, Respiration Rate, Blood Pressure). Source: Johns Hopkins Medicine Health Library, 2016, pp. 1-4.

Kriebel, How to Create a Two-Panel col. Chart in Tableau (And Save Lots of Time Compared to Excel), www.vizwiz.com/2012/02/how-to-create-two-panel-column-chart-in.html, 2012, 14 pages.

Microsoft, Automatically Adjust the Start and Finish Dates for New Projects, Applies To: Project 2007, Project Standard 2007, https://support.office.com/en-us/article/Automatically-adjust-the-start-and-finish-dates-for-new-projects-27c57cd1-44f3-4ea8-941a-dc5d56bdc540?ui=en-US&rs=en-US&ad=US&fromAR=1, Copyright 2017 Microsoft.

mrexcel.com, Forum: How to Calculate Percentage of Total Used Time, www.mrexcel.com/forum/excel-questions/192521-how-calculate-percentage-total-used-time.html., Post Date: Mar. 20, 2006, 4 pages.

Paolo, Arduino Forum, Measuring Point to Point Distances With Accelerometer, http://forum.arduino.cc/index.php?action=printpage;topic=49902.0;images, Post Date: Jan. 26, 2011, 5 pages.

Process Dash, Using the Task & Schedule Tool, www.processdash.com/static/help/Topics/Planning/UsingTaskSchedule.html, Mar. 4, 2011.

Sun Microsystems, Lights Out Management Module, https://docs.oracle.com/cd/E19585-01/819-0445-10/lights_out.html, Copyright 2004, Sun Microsystems, Inc.

Wideman, Issues Regarding Total Time and Stage 1 Time, http://maxwideman.com/papers/resource/issues.html, 1994.

LINAK, Deskline Controls/Handsets User Manual, Copyright LINAK 2017.

LINAK, DPG Desk Panels—A New Way to Adjust Your Office Desk, Product News, May 19, 2017.

Steelcase, Inc., Airtouch Height-Adjustable Tables, Brochure, Copyright 2015 Steelcase Inc.

Steelcase, Inc., Migration Height-Adjustable Desk, Brochure, Copyright 2015 Steelcase Inc.

Steelcase, Inc., Ology Height-Adjustable Desk, Brochure, Copyright 2016 Steelcase Inc.

Steelcase, Inc., Series 5 Sit-To-Stand Height-Adjustable Tables, Brochure, Copyright 2015 Steelcase Inc.

Steelcase, Inc., Series 7 Enhanced Sit-To-Stand Height-Adjustable Tables, Brochure, Copyright 2015 Steelcase Inc.

Linak, Deskline Deskpower DB4/DL4 Systems User Manual, Copyright Linak 2007.

Linak, Deskline DL9/DB9/DL11 System User Manual, Copyright Linak 2007.

Office Details, Inc., Height AdjusTable Worksurfaces User Instructions, Copyright 2004 Office Details Inc.

* cited by examiner

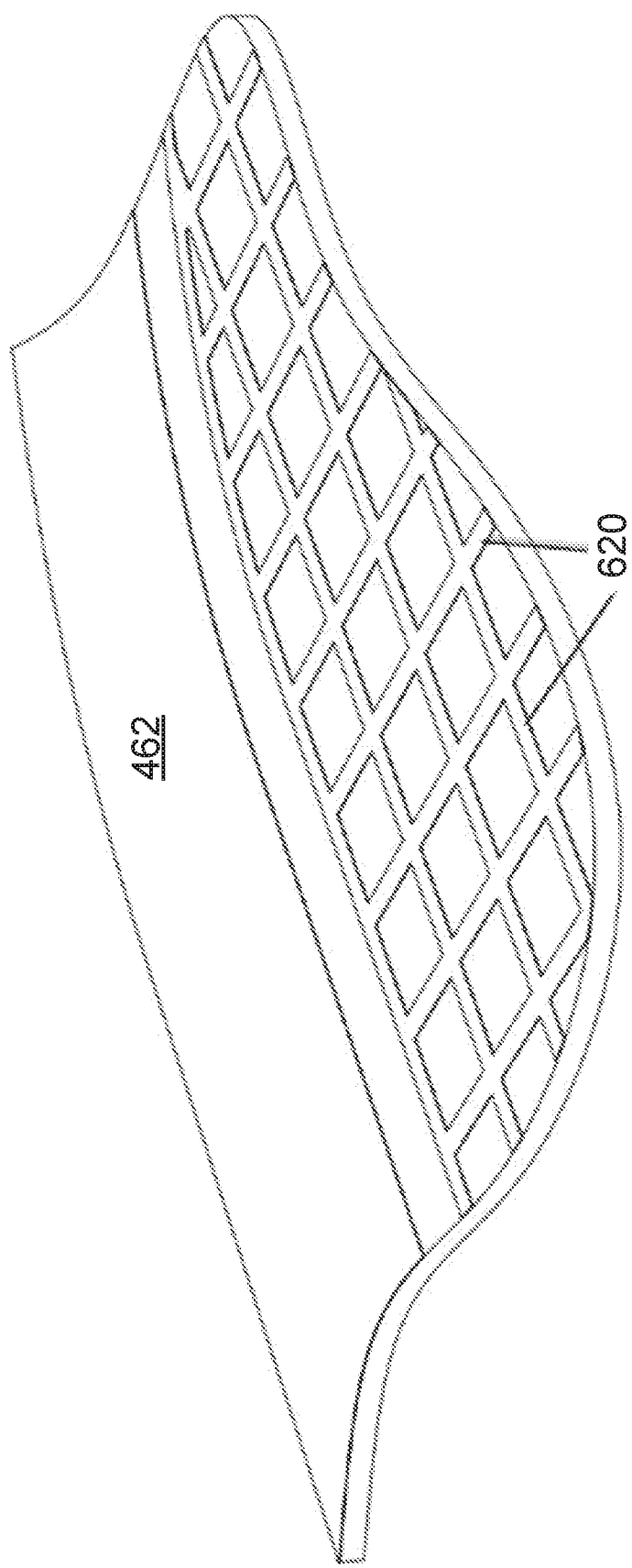

HEIGHT ADJUSTABLE SUPPORT SURFACE AND SYSTEM FOR ENCOURAGING HUMAN MOVEMENT AND PROMOTING WELLNESS

CROSS-REFERENCE TO RELATED APPLICATIONS

This application is a continuation in part of and claims priority to U.S. patent application Ser. No. 15/285,939, filed Oct. 5, 2016, which is entitled "Height-Adjustable Support Surface and System for Encouraging Human Movement and Promoting Wellness" which is a continuation of and claims priority to U.S. Pat. No. 9,486,070, filed Sep. 25, 2013, which is entitled "Height-Adjustable Support Surface and System for Encouraging Human Movement and Promoting Wellness" which claims priority to U.S. provisional application Ser. No. 61/795,222, filed Oct. 10, 2012, entitled "Height-Adjustable Support Surface and System for Encouraging Human Movement and Promoting Wellness". This application claims priority to and incorporates by reference in its entirety each of the applications and patent referenced above. This application is also a continuation in part of and claims priority to U.S. patent application Ser. No. 14/612,302, filed Feb. 3, 2015, which is entitled "Sound Management Systems For Improving Workplace Efficiency" which claims priority to U.S. provisional application Ser. No. 61/935,343, filed Feb. 4, 2014, which is entitled "Sound Management Systems for Improving Workplace Efficiency". This application further claims priority to U.S. provisional patent application No. 62/409,041, filed on Oct. 17, 2016, which is entitled "Ergonomic Seat System". All of the above referenced applications are incorporated herein in their entirety by reference.

BACKGROUND OF THE DISCLOSURE

The present invention generally relates to devices and systems for benefiting the health and efficiency of workers in a workplace, and more particularly, to height-adjustable support surfaces and other devices to encourage health-benefiting movement by the worker.

It is well known that the human body is designed to move and that we do benefit from regular and frequent motion throughout all our activities during each day. The efficiency and health of our circulatory system and our digestive system relies on almost constant movement throughout the day and night—even during our sleep. If a person sits in a chair at a desk for prolonged periods of time without stretching or standing his head will tend to lean forward naturally to try to maintain core balance, which will cause a muscle tone imbalance between the front and rear sides of the body. This results in a high risk of an increase of spinal shrinkage and an increase of intra-disc pressure within the user's spine. This can lead to muscle strain, muscle compression, nerve compression, tendon injury and ligament sprain at the shoulder, the neck, the upper limbs, and the back. This can further result in general musculoskeletal discomfort in the short term and more chronic upper and lower back pain and nerve-damage symptoms in the shoulder, the neck, arms and throughout the back (called: "repetitive strain injury") in the long term. Other health problems linked to a person regularly sitting for long periods of time include the blocking of the returning flow of venous blood causing blood to accumulate in the legs, in particular in the calves and ankles. Continued strain to such blood vessels will often lead to food edema, muscular discomfort in the legs, and varicosity.

Regardless of the specific injury that may result from sitting for extended periods of time, there is general consensus among physicians and ergonomists that there are clear health benefits to a person who breaks up their day with both periods of standing and periods of sitting at regular intervals.

For over two decades, a number of studies support this. For example, a study by Paul and Helander (1995) found office workers with sedentary jobs showing significantly more spinal shrinkage throughout the day compared to those with less sedentary jobs. They also compared spinal shrinkage with office workers who stood in thirty minute sessions with those who stood for fifteen minute periods. When the spine of each of these test subject workers was measured there was considerably less shrinkage in those who stood for thirty minute intervals. Also, workers in the test that had spinal disorders prior to the test showed a greater variability in the shrinkage pattern.

Another study by Winkle and Oxenburgh (1990) determined the benefits of providing active breaks (standing/moving) versus passive rest breaks (sitting) from the point of view of maintaining the health of muscles and the health of the spine. They found that alternating between sitting and standing was the most effective way to maintain a productive workflow and a healthy spine. The posterior wall of the inter-vertebral disc sustains cumulative degenerative changes when exposed to prolonged periods of high intra-disc pressure associated with flexed or semi-flexed seated postures. In other words, if you sit for long periods of time, you will be more likely to impart stress on your spine and, as a result, be uncomfortable. If you sit and then stand at regular intervals, you will not impart as much stress on your spine.

Nerhood and Thomson (1994) studied the introduction of sit-stand workstations at United Parcel Service (UPS). Results showed workers averaged 3.6 adjustments to standing position per day and spent an average 23% of the time per day in a standing position. They found body discomfort decreased by an average of 62% and the occurrence of injuries and illnesses decreased by more than half.

Unfortunately for their health, a typical office worker is forced to spend most of their day working in an environment that demands very little body movement. Sitting in a chair at a desk for hours at a time is not uncommon here and quite often the only movement such a worker will experience while at work will stem from the rapid, albeit slight movement of their fingers, hands and wrists as they operate their computers and phones while "comfortably" seated. A typical worker will not only sit most of their day while at work, but also will sit during their commute between work and home and also when eating their lunch. This may lead to them being in a seated position for upwards to 9-11 hours each day, and often for long uninterrupted periods of time.

This health concern was addressed decades ago with the introduction of a so-called "Sit-Stand" desk—an electrically-powered desk whose working surface can be power-raised and lowered as desired by the user. Unfortunately, these early electric sit-stand desks were cost prohibitive and not sufficiently commercially attractive for most companies to adopt. Eventually however, these powered desks did find their way into the workplace in limited quantities to a select few companies, such as high-end design firms and law firms.

A major problem with the early sit-stand desks and even those currently available today is that they lack intelligence. Yes, they can move up and down and up again, but only when commanded to do so by the user. Human nature prevails rather quickly and soon after the initial novelty and fun wears off of having such a "cool" desk, the user either forgets to raise or lower their desk at regular intervals throughout the day or simply loses interest, typically ending up sitting the whole day, once again. Therefore in short time, the very expensive high-tech sit-stand desk becomes just a sit-desk, and apart from the cost, essentially no different from the very desks it just replaced.

This problem was addressed to some degree in US Patent Publication No.: 2008/0245279 of Chun Ming Pan, published Oct. 9, 2008, now abandoned and also U.S. Pat. No. 5,323,695 of Borgman et al. Both of these patent references disclose height-adjustable workstations (so-called "sit-stand desks") that have a working platform (a top) that can be selectively raised and lowered as desired by the user in a manual mode, and also raised and lowered automatically at predetermined intervals. The devices disclosed in these references do allow for a reminder to the user to sit and stand regularly, but the devices are still considered basic in operation and lack intelligent operational software Like prior art height-adjustable workstations, these workstations do not "read" biometrics of the user or take into account other environment conditions that can provide specific and meaningful data. Such data would enable the up-down schedule of the height-adjustable workstation to adapt to the user, both throughout the day and over time.

Applicants of the present application understand that the user's fitness and habits will invariably change over time. Furthermore, Applicants of the present application have recognized a need for a "smart" height-adjustable workstation that responds to user-changes and other conditions and parameters by adapting or modifying its operation accordingly.

It is therefore a first object of the invention to overcome the deficiencies of the prior art.

It is another object of the invention to provide a useful, affordable power-assisted sit-stand desk that encourages and motivates regular use.

It is another object of the invention to provide such a power-assisted sit-stand desk that is able to measure or otherwise detect select biometrics of the user to help control current and future operation and functions.

It is another object of the invention to provide such a power-assisted sit-stand desk that senses and collects user data over time and communicates the same to a local display and to a second location for secondary use.

It is another object of the invention to provide such a power-assisted sit-stand desk that controls its operation in response to the detection of a user's presence.

It is another object of the invention to provide such a power-assisted sit-stand desk that controls operation in response to detection of sound within the immediate area of the desk.

It is another object of the invention to provide such a power-assisted sit-stand desk that allows height control in response to a single touch command by the user.

In addition, the present invention generally relates to devices and systems for benefiting the health and efficiency of workers in a workplace, and more particularly, to systems and devices for the purpose of mitigating or otherwise controlling unwanted conversation and also managing structured sounds (music) and random sounds generated within a workplace.

Today's workplace environments often include "open spaces" wherein many employees get to enjoy working in close proximity to each other in spaces that are generally replete of barriers, such as cubical walls. This open working arrangement is supposed to provide a means for the sharing ideas and collaboration which is supposed to improve work efficiency and creativity. It has the additional benefit of saving expenses by maximizing floor space and simplifying the lighting requirements for everyone, but unfortunately not everyone can work so efficiently in such an open environment and for many people, work efficiency and even morale can "take a hit."

People are different and many people just need their space and don't appreciate sharing with others and don't appreciate the many distractions that have become common in such open space environments. One such distraction is sound, both general office noises (a nearby photocopier) and other people's conversations. People need to concentrate and many cannot unless they can control the sounds within their work area. If two people seated next to a worker, for example, start a conversation with each other, the worker's brain will involuntarily listen-in and try to comprehend what is being said nearby. This often confuses the worker and his or her concentration and work efficiency plummets, that is until the conversation stops.

In an effort to maintain the benefits of an open-space layout for a workplace and help control noise and regional intelligible conversations, two basic sound-management systems have been developed, sound-cancellation and sound-masking.

Sound cancellation—or "active noise control"—electronically changes a received incoming sound signal within an environment to minimize the signal before it can be received by a human's ear. With sound cancellation, a sound signal is first received by a microphone that has been placed within a subject environment. The signal analyzed by a microprocessor and then an inverted signal (mirror image) is sent to a speaker that has been positioned within the environment. The speaker broadcasts the exact opposite of the original sound signal, thus flattening out the original sound signal, effectively cancelling it. The end result is that the worker located within the environment will hear very little background sounds.

Unfortunately, sound cancellation works best in a very controlled and small environment that has a uniform, consistent, and predictable shape. Therefore, such sound cancellation systems work best with headphones and are not suitable for controlling the many dynamic frequencies common in open areas, such as within a large room that includes a myriad of sources of sounds, moving objects and complex and unpredictable shapes of all sizes. Any attempt to mitigate the background sounds in such a complex environment would require massive processors and a multitude of microphones and speakers. This would be prohibitively expensive and still would likely only produce marginal sound-control within the environment.

Sound masking, on the other hand, works on the principle that when background noise is added to an environment, speech becomes less intelligible. The "Articulation Index" (or "AI), which is a measurement of intelligible speech is controlled within the environment. In order for sound masking to be effective, the AI must be lowered by a change in the signal-to-noise ratio. The "signal" is typically a person speaking within the environment, and the "noise" is the sound masking signal.

A high signal-to-noise ratio means that speech within the environment is very intelligible and the workers will suffer by not being able to concentrate. By simply introducing select sounds (controlled noise) to the environment, the signal to noise ratio can be reduced significantly, to the point that the voices carried by anyone speaking within a subject environment will become unintelligible a short distance away so that even nearby workers will not become distracted and work efficiency will presumably remain unaffected. The generated noise used in such sound-masking systems is typically what is referred to as "white noise", but so-called "pink noise" can be applied as will.

To be effective, sound masking systems must generate sound that is both random and within a specific range of frequency and decibels. The human brain will actively process received sounds in which it can identify a recognizable pattern, such as speech, but will quickly tune out sounds it cannot make sense of, such as static sounds. Sound masking works by injecting a random, low-level background noise within the environment that correlates in frequency to human speech. Control of the decibel level and frequency of the generated noise (white or pink) within the environment is critical. The noise should be just loud enough to make it difficult to understand conversations a predetermined distance away. However, should the noise become too loud, the human brain will no longer ignore it and the noise will begin to interfere with other human processing, such as working. Care must be taken to insure that both the decibel level and the frequency of the sound masking system is appropriate for the particular environment. This is what a "white noise" system does to mask sound it basically "fills in" the sound spectrum around you with barely perceptible "unstructured" noise. The sounds of running water serve well as white noise because the sounds are able to mask human speech very well, without distracting or annoying a listener. The running water sound creates a random, yet relatively uniform sound wave, within a specific frequency spectrum.

Early sound-masking systems installed in buildings in the 1960s simulated the sound of air moving by electronically filtering random noise produced by gas-discharge vacuum tubes. Loudspeakers in the ceiling distributed the amplified noise signal throughout the office. However, making human speech unintelligible required a volume level so high that the sound masking itself became a distracting annoyance.

In the 1970s, electronically generated sound masking employed frequency generators that shaped sound to better mask speech became more practical and worked well when installed correctly. In the 1980s, researchers began using 1/f noise, the phenomenon also known as "flicker" or "pink" noise. Calibrating this "pink" noise to match the frequencies of human speech raised the threshold of audibility just enough to mask intelligibility without requiring the higher volumes used in earlier systems.

Music and Headphones. Although the above sound masking techniques may work well in many situations, many people just cannot listen to the sounds of "ocean waves" all day long. It is not uncommon for workers to simply play some music through their headphones to help create a controlled sound environment and effectively mask surrounding sounds. Unfortunately, even a preset playlist of songs may not also match a particular user's need throughout a day.

Although many of the above-described sound masking systems work generally well, Applicants have recognized areas of improvement with such systems.

It is therefore another object of the invention to overcome the deficiencies of the prior art.

It is another object of the invention to provide a useful, effective sound masking system that can be altered automatically in response to select inputs.

It is another object of the invention to provide a sound controller for controlling the sounds played to a user in response to select inputs.

The present disclosure further relates generally to powered furniture. More particularly, the present disclosure relates to powered rolling chairs that include electrical components and systems for providing such onboard components with remote power.

Chair Movement:

A common misunderstanding is that sitting upright and straight in an office chair is the right way to sit at all times. To the contrary, many ergonomics experts have said "your best position is your next position" indicating that alternating between sitting upright and reclining slightly and other positions is ideal. This is because staying fixed in any one position can cause fatigue, lead to slouching, discomfort or other negative consequences. Sitting in an upright posture for a long period with the person's thigh to trunk angle at or near 90 degrees can cause a person's pelvis to rotate backwards, which in turn, flattens the normal lumbar curve of the user's spine. Changing the curvature of the spine in this manner has been found to significantly increase the lumbar disc pressure by as much as 40% compared to the disc pressure when standing. This increase in disc pressure can cause fatigue and lower back pain, and even pinched nerves.

Lower back pain continues to be among the most common complaints for adults, and is one of the most common reasons given for doctor visits:

According to a University of Missouri-Columbia School of Health Professions report, there is an 80% lifetime prevalence of low back pain for adults. At any given time, 20-30% of people will have back pain, and back pain is usually recurrent and often progressive.

A spinehealth.com poll showed that 70% of all respondents report increased lower back pain after sitting at work (15% report no change and 15% report improved back pain—i.e., less).

There are important benefits to change position while seated. The simple act of moving allows the user's muscles to effectively help pump blood throughout the user's body. Also, movement of the user's spine (for instance when reclining) can nourish and support health of discs of the user's vertebrae, and body movement of a user's joints is generally positive for joints and ligaments. All of this can support comfort and a reduction in the likelihood or incidence of back pain.

In order to support users in changing positions regularly while seated, many current ergonomic chairs are designed with several different adjustments. However, once a chair is initially adjusted to fit a user, many users forget, or simply do not make use of the adjustment features for the purposes of changing the position during the day, due to lack of knowledge on how to make the adjustments, a lack of understanding of the benefits or due to being preoccupied with other priorities.

Interestingly, often seated people seek to achieve different posture variations without adjusting the chair which can also have negative consequences because the chair is not properly supporting their body as designed. A typical seated user may try to position him or herself to any of the following three distinct modes of sitting while performing work at a desk:

Forward sitting: leaning slightly forward in the chair, often used for performing work on the plane of a desk or for interacting with office equipment;

Sitting upright: with the back supported by the back of the chair, which is a general purpose position accommodating most tasks Slightly reclined sitting: used for instance in conversation, telephoning, keyboarding, and mousing. Surveys indicate that it is a preferred work posture for many people; and Deeply reclined sitting: often used for resting, reading, and, in some cases, keyboarding.

Many ergonomic chairs require activation of levers and buttons to change most aspects of a seated position. Even reclining typically requires activation of a lever to release the reclinelock so that a user has solid back support when seated upright. The need for knowledge of how to adjust the chair and the requirement of the user's active management of the process all reduce the likelihood of a changes being made frequently.

U.S. Pat. No. 5,556,163 of Rogers, Ill., et al. discloses a chair that employs several actuators for selectively moving several different components, such as height, and recline, etc. The main intent of the powered drivers is to provide ease for the user to quickly make fine adjustment to his or her chair. This reference does further mention that the actuators may be automatically driven either randomly or following a schedule to make minor movements to each component to avoid user fatigue.

Although the chair disclosed by U.S. Pat. No. 5,556,163 does introduce automatically moving the different components of a chair to avoid fatigue, the movements are only meant to be minor and such movements would not be sufficient to prevent back strain that stems from elevated pressure on the user's spine nor correct a flattened lumbar curve.

U.S. Pat. No. 7,896,436 of Kurrasch et al. discloses a chair that includes powered actuators and sensors to automatically sense the weight of a user and to use this information to adjust the chair components for the best fit. This chair also includes provisions for recognizing different users and automatically adjusting the different settings based on the identity of a seated user.

Although the chair of Kurrasch et al. does utilize powered actuators to move various chair components, it moves the components based on the user's weight for comfort and correct fit and does not automatically move the components for the purpose of alleviating spinal pressure and correcting a flattened lumbar curve to mitigate back strain and associated pain.

It is therefore a primary object of the present disclosure to overcome the deficiencies of the prior art.

It is another object of the disclosure to provide a chair that allows the user to quickly and easily reposition.

It is another object of the disclosure to provide a chair that reminds the user to reposition while seated in the chair.

It is another object of the disclosure to provide a powered chair that automatically repositions components of the chair to alleviate spinal pressure and correct a flattened lumbar curve at prescribed times to mitigate back strain and associated pain.

Some aspects of the present disclosure also relate generally to powered furniture. More particularly, the present disclosure relates to powered adjustable seating that includes moveable components.

Reclining Seating Movement:

Generally, conventional adjustable seating includes a seat and a pivotally attached backrest which can be reclined, as desired. The recline feature is usually spring-biased up to a hard stop so that when selected, the user may lean back against the backrest and gently recline, continuously supported by the spring-bias, up to the hard stop. How far back the backrest reclines (i.e., the angular location of the hard stop) is usually adjustable from a vertical position (or approximately vertical), where the user does not want the backrest to recline at all and prefers to have full support when he or she leans back (sitting up straight). At which recline angle the hard stop occurs is sometimes adjustable by the user, to different degrees of recline (usually maxing out at around 40 degrees from the vertical).

A problem with the recline feature is that many people don't end up using it. They want to be able to lean back and remain solidly upright. To this end, applicants have found that many users prefer to just lock off the recline feature, leaving the backrest effectively fixed in the full upright position. This is problematic because many ergonomics experts have said that one's "best position is his/her next position" indicating that alternating between sitting upright and reclining slightly and other positions is ideal. This is because staying fixed in any one position can cause fatigue, lead to slouching, discomfort or other negative consequences. Sitting in an upright posture for a long period with the person's thigh to trunk angle at or near 90 degrees can cause a person's pelvis to rotate backwards, which in turn, flattens the normal lumbar curve of the user's spine. Changing the curvature of the spine in this manner has been indicated to significantly increase the lumbar disc pressure by as much as 40% compared to the disc pressure when standing. This increase in disc pressure can cause fatigue and lower back pain, and even pinched nerves.

Lower back pain continues to be among the most common complaints for adults, and is one of the most common reasons given for doctor visits:

According to a University of Missouri-Columbia School of Health Professions report, there is an 80% lifetime prevalence of low back pain for adults. At any given time, 20-30% of people will have back pain, and back pain is usually recurrent and often progressive. A spinehealth.com poll showed that 70% of all respondents report increased lower back pain after sitting at work (15% report no change and 15<% report improved back pain—i.e., less).

There are important benefits to changing position while seated. The simple act of moving can allow the user's muscles to effectively help pump blood throughout the user's body.

Also, movement of the user's spine (for instance when reclining) can nourish and support health of discs of the user's vertebrae, and body movement of a user's joints is generally positive for joints and ligaments. All of this can support comfort and a reduction in the likelihood or incidence of back pain.

In order to support users in changing positions regularly while seated, many current ergonomic seating structures of the type used in an office environment are designed with several different adjustments and features. However, once a seating structure is initially adjusted, many users forget, or simply do not make use of the adjustment features for the purposes of changing the position during the day, due to lack of knowledge on how to make the adjustments, a lack of understanding of the benefits or due to being preoccupied with other priorities.

It is therefore a primary object of the present disclosure to overcome the deficiencies of the prior art.

It is another object of the disclosure to provide a seating structure that allows the user to quickly and easily reposition.

It is another object of the disclosure to provide a seating structure that reminds the user to reposition while seated in the seating structure.

It is another object of the disclosure to provide a powered seating structure that automatically repositions components of the seating structure to alleviate spinal pressure and correct a flattened lumbar curve at prescribed times to mitigate back strain and associated pain.

Removable Feature-Module:

Conventional adjustable seating structures usually include many features and are quite expensive. Some of these seating structures may be somewhat customizable, allowing the customer certain choices when ordering, such as fabric type and color, adjustable hand rests, adjustable recline. The Aeron® chair by Herman Miller of Zeeland, Mich. includes a lumbar support insert which is designed to provide two levels of firmness and support, depending on the orientation it is secured to the rear of the backrest.

Applicants have recognized a need to easily provide additional features to an adjustable seating structure, even as an after-market item.

It is therefore a primary object of the present disclosure to overcome the deficiencies of the prior art.

Some aspects of the present disclosure further relate generally to improvements to powered furniture. More particularly, the present disclosure relates to powered adjustable seating and powered height-adjustable sit-stand desks.

Sit-Stand Desk with Remote Height Management:

Sit stand desks are getting more and more popular. Large companies are recognizing the health benefits and associated health-related cost savings in encouraging their employees to follow healthy lifestyles, including the use of sit/stand desks while at work.

Although it has been proven that use of such sit/stand desks are beneficial to one's health, it is not uncommon for the average user to use the standing feature of these height-adjustable desks less over time. In some cases, the user never uses the standing feature. This can be attributed to various reasons including that some users never knew the desk could move up and down and just use it as a sit-only desk and that some users are not being reminded to stand, forget to stand, or just do not break the habit of sitting. Most sit/stand desks are considered "non-intelligent" in that they are just mechanical structures that include a worktop that can be raised or lowered as desired by its user. In such desks, there is no intelligent system tracking when and tor how long the worktop is positioned at a sitting height or a standing height and therefore health status and benefits cannot be meaningfully tracked. Some new versions of sit/stand desks are classified as "smart" desks because they do keep track of exact height usage, facilitate, motivate and remind users to change positions and some even make the height changes automatically to follow a health-schedule customized tor each user. One such desk is sold by a company called Stirworks, located in Pasadena, Calif. 91103. However, even with smart sit/stand desks, some users do not respond to the software effectively losing the associated health benefits, or respond less frequently over time.

It is therefore a first object of this disclosure to overcome the deficiencies of the prior art.

It is a second object of the disclosure to provide a means to help encourage continued use of a sit/stand desk.

System for Charging Seat Structures:

There has been a strong effort in the furniture industry to provide electrically powered accessories to rolling-type office chairs. Lights, buzzers, vibration, heaters, etc. have been suggested and in some cases, developed to a commercial product. A common problem shared by all of these developments is how to provide power to a mobile chair.

1) Batteries:

Batteries can, in most cases, be used to power such features of a chair, but of course these batteries eventually need to be replaced or recharged. Regularly changing batteries would usually be considered impractical and a burden, especially in a large company with many desks and chairs. Such regular maintenance requirements would likely result in the powered features to be eventually ignored and unused.

Alternatively, a chair requiring power could be tethered with a power cord to continuously provide the required power, but such a cord would likely become entangled and damaged during normal use of the chair, or look unsightly. Similar to changing batteries, plugging in a power cord each night would usually be considered a burden and impractical.

2) Generators and Solar Panels:

Another method to bring power to a mobile powered chair is to use the movement of the chair itself to generate power. U.S. Pat. No. 8,016,351 discloses such as system wherein electric generators are mechanically connected to at least one of the several caster wheels.

In use, as the user moves the chair on the floor, the rotating casters will in turn rotate the generators, which will generate power to charge onboard batteries. Unfortunately, a typical user seated in a chair does not roll the chair around enough during normal use to generate sufficient power to be effective or practical. Also, reverse EMF created in a generator generating power would create noticeable breaking torque making it very difficult and awkward for the user to move the chair around. The U.S. Pat. No. 8,016,351 patent also suggests using a solar panel on the back of the chair to help charge onboard batteries. This may help provide some or all required power for the chair, but such panels are expensive, fragile and require strong direct or ambient light to work effectively and generally are less efficient in environments that use low-power fluorescent lighting or indirect lighting (reflected light).

US Patent Publication No. 2013/0106155 discloses a chair having a seating structure that is supported by a central vertically disposed piston. The seating structure is designed to vertically displace in response to a seated person's weight, leveraging the up and down linear movement to generate electricity. It is also known to convert other chair-movements by a seated user into electricity, such as the reclining movement. This generated power is then used to power onboard electronics and/or batteries. Such methods often do not deliver enough power to consistently power desired functions.

3) Wireless Charging:

Power can also be transmitted wirelessly. Wireless technologies are those in which energy is transferred between components without wired connections such as sockets and plugs.

These wireless technologies generally include radio frequency (RF) transfer, induction, conduction and acoustic energy transmission technology. Exemplary wireless energy sources are disclosed in U.S. Pat. Publ. Nos. 2007/0182367, 2009/0072782, 2008/0246215, 2007/0194526, and 2004/0195767, which are incorporated herein by reference. In RF transfer technology, a source circuit generates an RF signal which is received by a second circuit. Energy is absorbed from the signal by the second circuit. RF energy can be transferred over a distance of several feet although the RF signal degrades rapidly as the distance from the source increases. Acoustic energy is similar to RF energy in that energy propagates multi-directionally.

In induction technology, a source, or primary, coil generates a magnetic field which induces current in a second, or secondary, coil. The area in which inductive energy may be received, referred to as a "hot-spot," is fairly localized adjacent the primary coil. Typically, in the embodiments disclosed herein, the primary coil will be integrated into an article of furniture, such as a desk, or a floor mat. A wireless device including the secondary coil may receive power from the primary coil by induction of electrical current in the secondary coil when the secondary coil is brought into proximity with the primary coil. The current generated in the secondary coil may be used to power the electronic device, or charge batteries in the electronic device. A controller produces a signal to power the primary coil at a modulated frequency. Information may be transferred by the signal to the secondary coil and then extracted by the electronic device being charged. The electronic device may include passive circuits and/or wireless communication circuits to transmit information back to the controller, thus establishing a "hand-shake" connection, which the controller may use to modulate the signal.

The use of induction technology is indeed promising, but a common problem with this otherwise elegant system is that the secondary coil must be accurately aligned over the primary coil for the system to be effective and the two coils must be positioned immediately adjacent to each other for effective power transmission to occur. This would require the office worker to carefully roll their office chair to a specific spot on their chair-mat each night before leaving so that the two coils align. It is not likely that a typical office worker would perform this task each day with any confidence or accuracy, especially when they are tired and must hurry to catch their train home. If the chair is not regularly charged, the onboard batteries will quickly lose their charge and the electrically powered features of the chair will cease to operate. If this happens, the user will quickly become frustrated and would likely lose interest in using the otherwise beneficial features of the chair.

4) Conductive Systems:

In conduction technology, an electrically conductive contact pad is mounted at a stationary location and another is secured to the mobile chair. The two contact pads are arranged so that they can be selectively aligned during a charging event. In such instance, the two contact pads are positioned so that they make contact and so that power can be transferred across the connection. The contact pads are typically flat elongate rectangular-shaped plates positioned in parallel. The polarity of each pad may be selected by controlling circuitry based in part on feedback from the contacts. Such controlling circuitry typically includes voltage and current regulators and features designed to protect the electronic devices and the controllers.

It is therefore a primary object of the present disclosure to overcome the deficiencies of the prior art.

It is another object of the disclosure to provide a system that effectively and efficiently provides power to a rolling-type chair without compromising the free-movement and function of the chair.

The features of this disclosure, and the manner of attaining them, will become more apparent and the disclosure itself will be better understood by reference to the following description of the disclosed embodiments taken in conjunction with the accompanying drawings.

SUMMARY OF THE DISCLOSURE

Consistent with at least some aspects of the present disclosure, some embodiments include a sit/stand workstation includes a worktop that has a powered drive and is moveable between a sitting height and a standing height. An electronic controller offers a user different operating modes, each with varying levels of automation. In one such mode, the user inputs a value that represents a desired percentage of standing time over a given period of time. The controller then uses user-profile information and the inputted value to create an initial custom height-adjustment schedule for the user. During use, the controller moves the worktop up and down following the schedule and uses sensors, such as a pressure mat, to detect how well the user follows the schedule and biometric indicators that convey fatigue and also energy. In response to this monitored user-information, the controller changes time, duration, and/or frequency of the schedule to better meet the abilities and fitness of the user and also to help encourage the user to continue regular use. Sounds, voice, lights, colors, and numerical information, as well as displacement of the worktop are used to help encourage the user.

Consistent with other aspects of the disclosure, some embodiments include a sound management system for use by a user located within an environment includes a memory device for storing a selection of sounds. The sounds can be music and/or various "colors" of noise (e.g., white, pink, and brown). A controller is used to select one particular stored sound based on a measured biological condition of the user, such as stress or fatigue, or an environmental condition of the environment, such as ambient noise. According to one embodiment, the system is used in conjunction with a sitstand desk and the sound selection is made in response to changes in the desk height. The selected sound is selected to help abate or mitigate distracting sounds in the environment, such as people talking. The selected sounds are played to the user through headphones worn by the user, or through nearby speakers.

BRIEF DESCRIPTION OF THE SEVERAL VIEWS OF THE DRAWINGS

The invention can be more fully understood from the following detailed description taken in conjunction with the accompanying drawings, in which:

FIG. 32 is a partial close up sectional view of a floor mat, showing details of registration lines that are used to help locate the position of the chair, according to the present disclosure.

DETAILED DESCRIPTION OF THE DISCLOSURE

Figure 1:
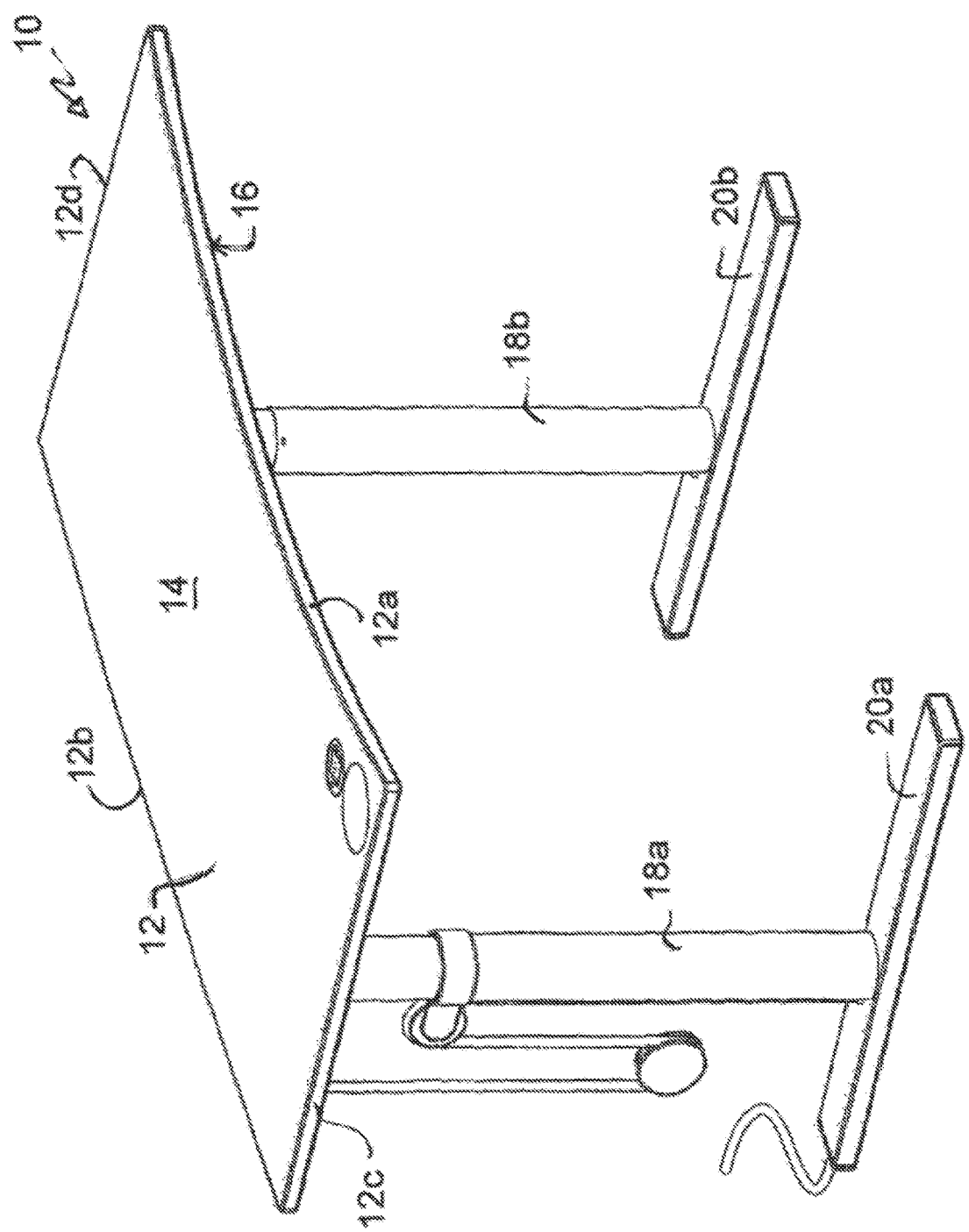
FIG. 1 is a front perspective view of a sit-stand workstation, according to the invention including a frame structure having two vertically displaceable legs each of which being attached to a base at a lower end and attached to a common support at an opposing upper end, a control unit and a power cord system, the desk shown in a lowered position.
Figure 2:
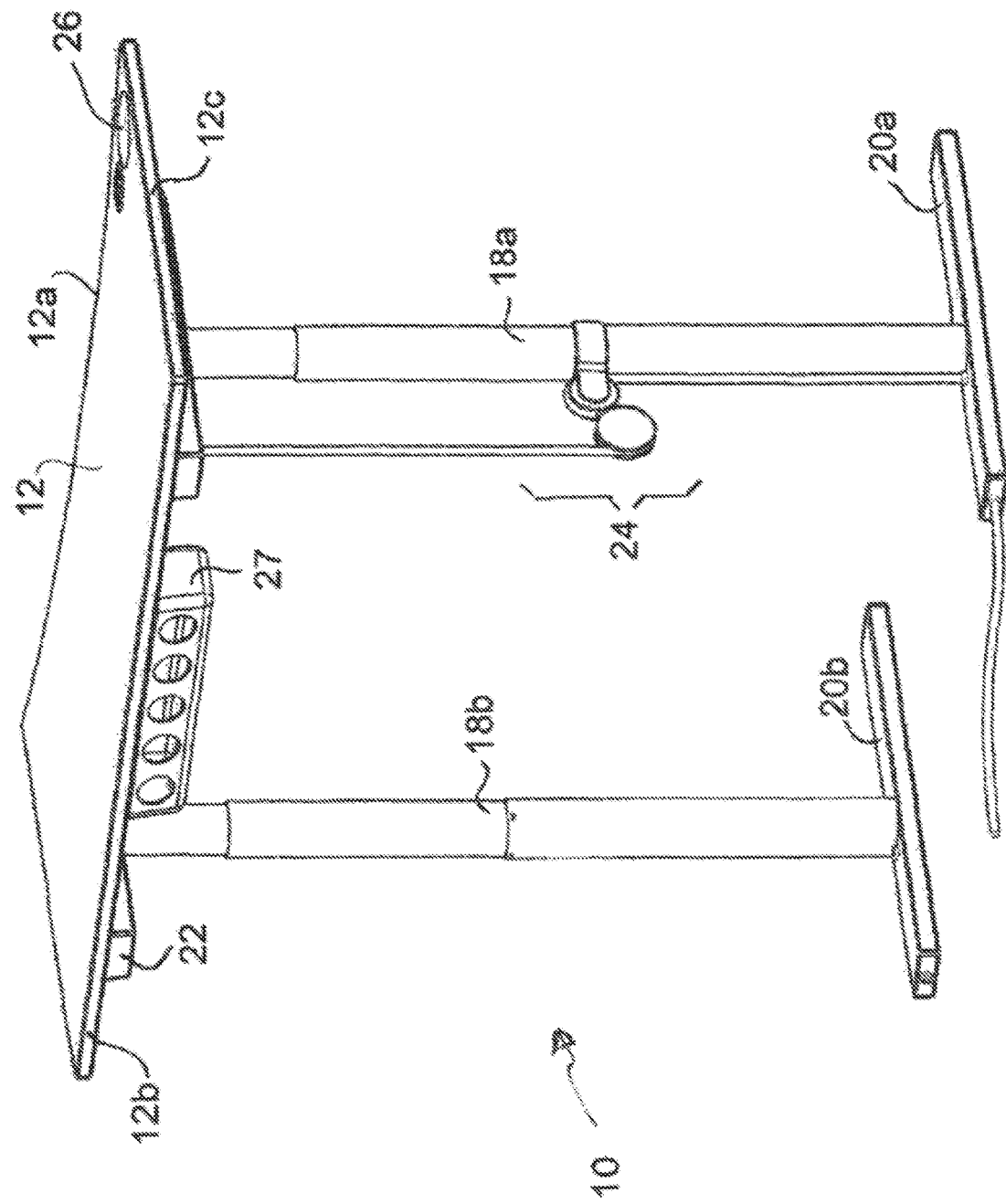
FIG. 2 is a rear perspective view of the sit-stand workstation of FIG. 1, shown in a raised position and showing a cord management box, according to the invention.
Figure 3:
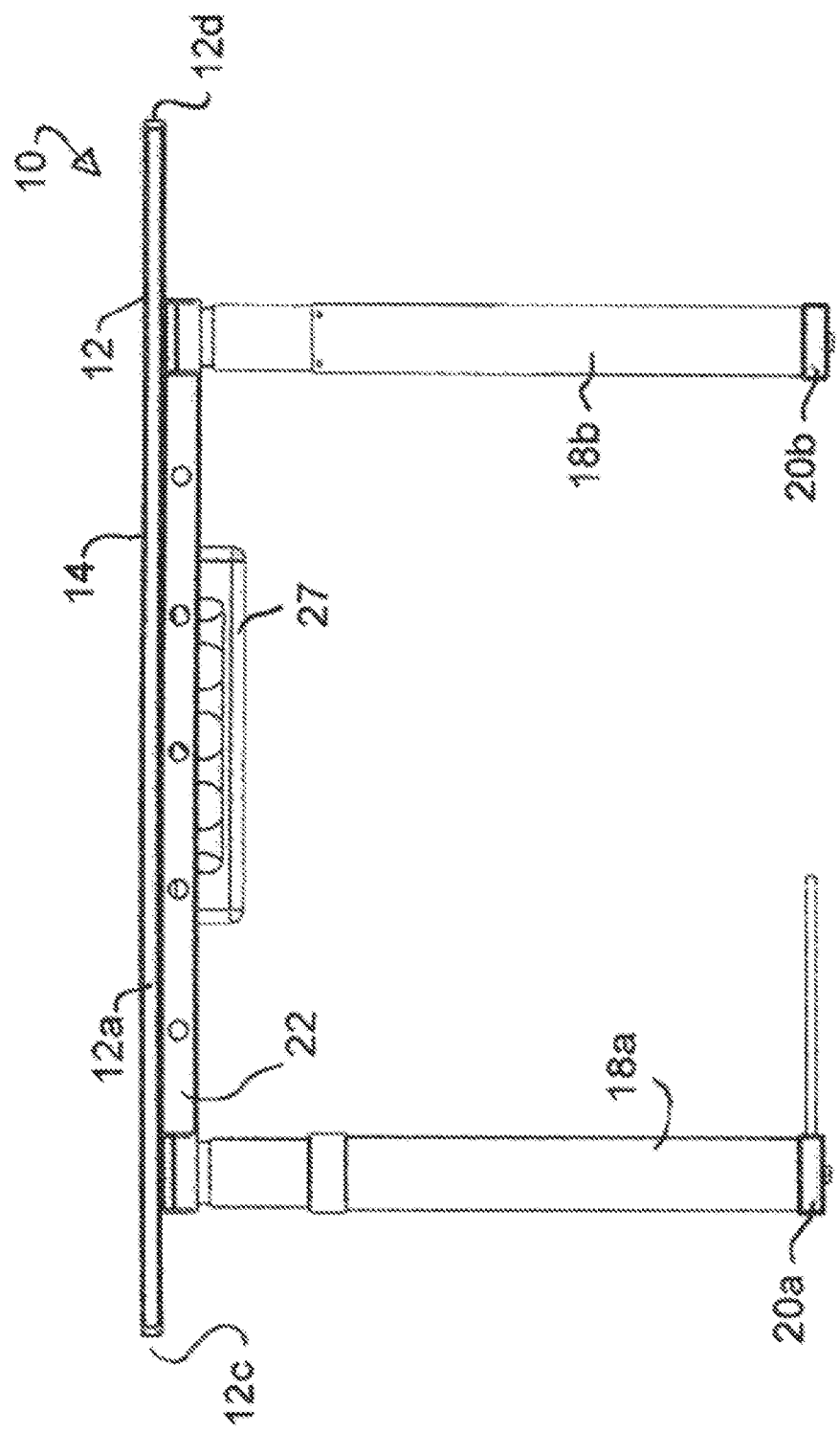
FIG. 3 is a front elevation view of the sit-stand workstation of FIG. 1 shown in a lowered position, according to the invention.

The various aspects of the subject disclosure are now described with reference to the drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

In the following detailed description, reference is made to the accompanying drawings which form a part hereof, and in which is shown by way of illustration, specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions rearrangements, or combinations thereof within the scope of the disclosure may be made and will become apparent to those of ordinary skill in the art.

In accordance with common practice, the various features illustrated in the drawings may not be drawn to scale. The illustrations presented herein are not meant to be actual views of any particular method, device, or system, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or method. In addition, like reference numerals may be used to denote like features throughout the specification and figures.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the disclosure may be implemented on any number of data signals including a single data signal.

The various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the disclosure described herein.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers or processors.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Workstation Structure:

Referring to FIGS. 1, 2, 3, 4 and 5, a height-adjustable workstation 10 is shown in accordance to the invention. The workstation is shown in a lowered position in FIGS. 1, 3, and 4 and in a raised position in FIGS. 2 and 5. The term "workstation" refers to a desk or a table or any other structure that includes a work surface or otherwise supports a machine or device, and can be of any size or shape without departing from the invention, described below. According to this preferred embodiment, workstation 10 includes a panel-like planar worktop 12, defining a work surface 14 and an underside 16, a lower support frame that includes two supporting pedestals 18*a*, 18*b* and two bases 20*a* and 20*b*, an upper support frame 22, a cord tensioning assembly 24, a control unit 26 and wire management box 27.

Worktop 12 includes a front edge 12*a*, a rear edge 12*b*, a left side edge 12*c* and a right side edge 12*d*. Worktop 12 can be any size and shape and made from any appropriate strong and rigid material, such as wood, metal, glass, particle board, Medium Density Fiberboard (MDF), High Density Fiberboard (HDF), reinforced plastic, or reinforced composites and laminates, or combinations thereof, as is well known by those skilled in the art. Since worktop 12 is meant to be raised and lowered at regular intervals, as described below, it is preferably made from a lightweight, rigid material with a durable work surface 14. As mentioned above, worktop 12 can take on any shape, but as shown and described in this application is preferably generally rectangular between about 4 feet and 6 feet long (measured between side edges 12*c* and 12*d*) and between about 26 and 36 inches deep (as measured along either side edge 12*c* or 12*d*). In this application, front edge 12*a* is shown curved inwardly to accommodate the user.

Figure 7:
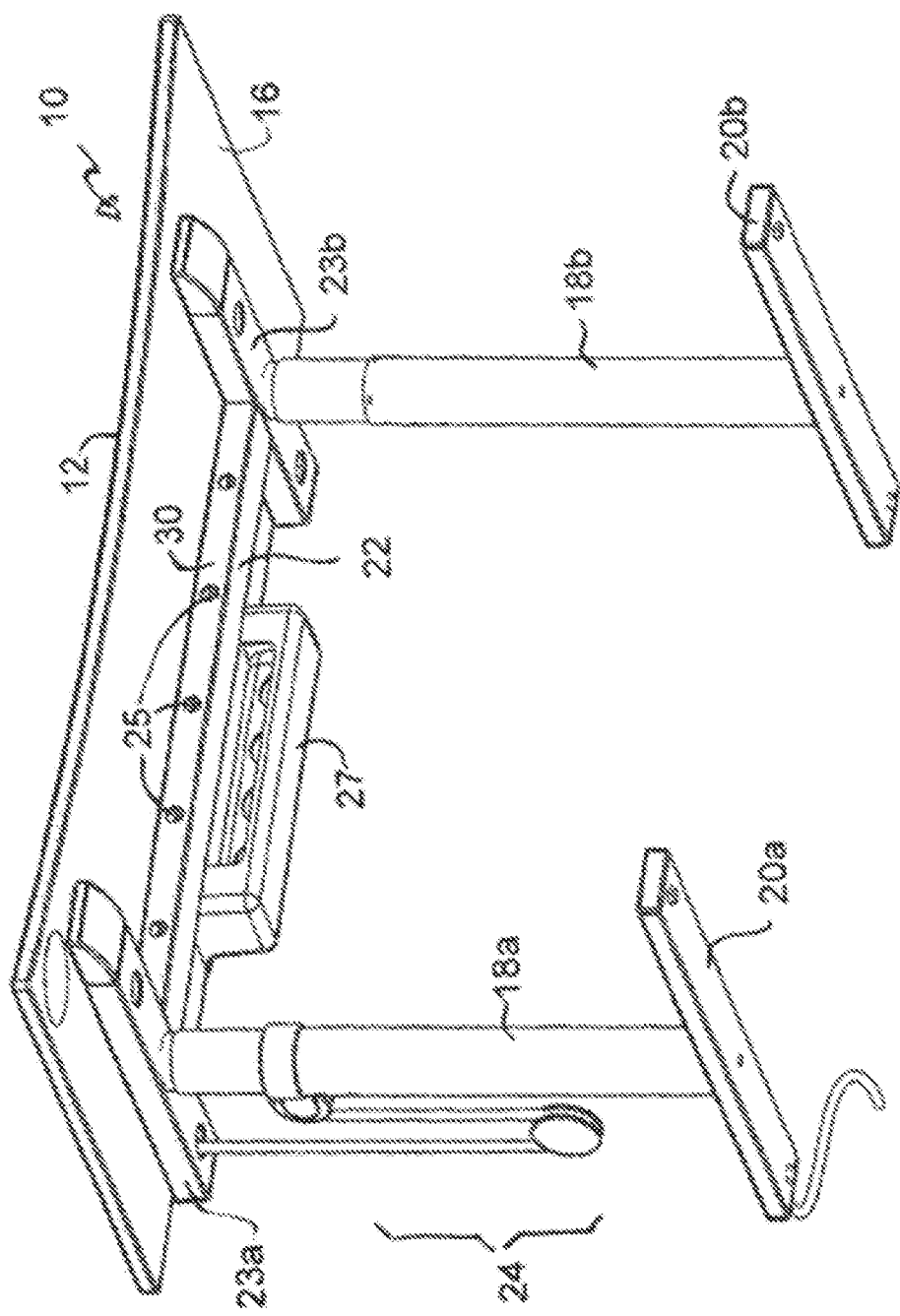
FIG. 7 is a lower perspective view of the sit-stand workstation of FIG. 1 shown in a lowered position, according to the invention.
Figure 8:
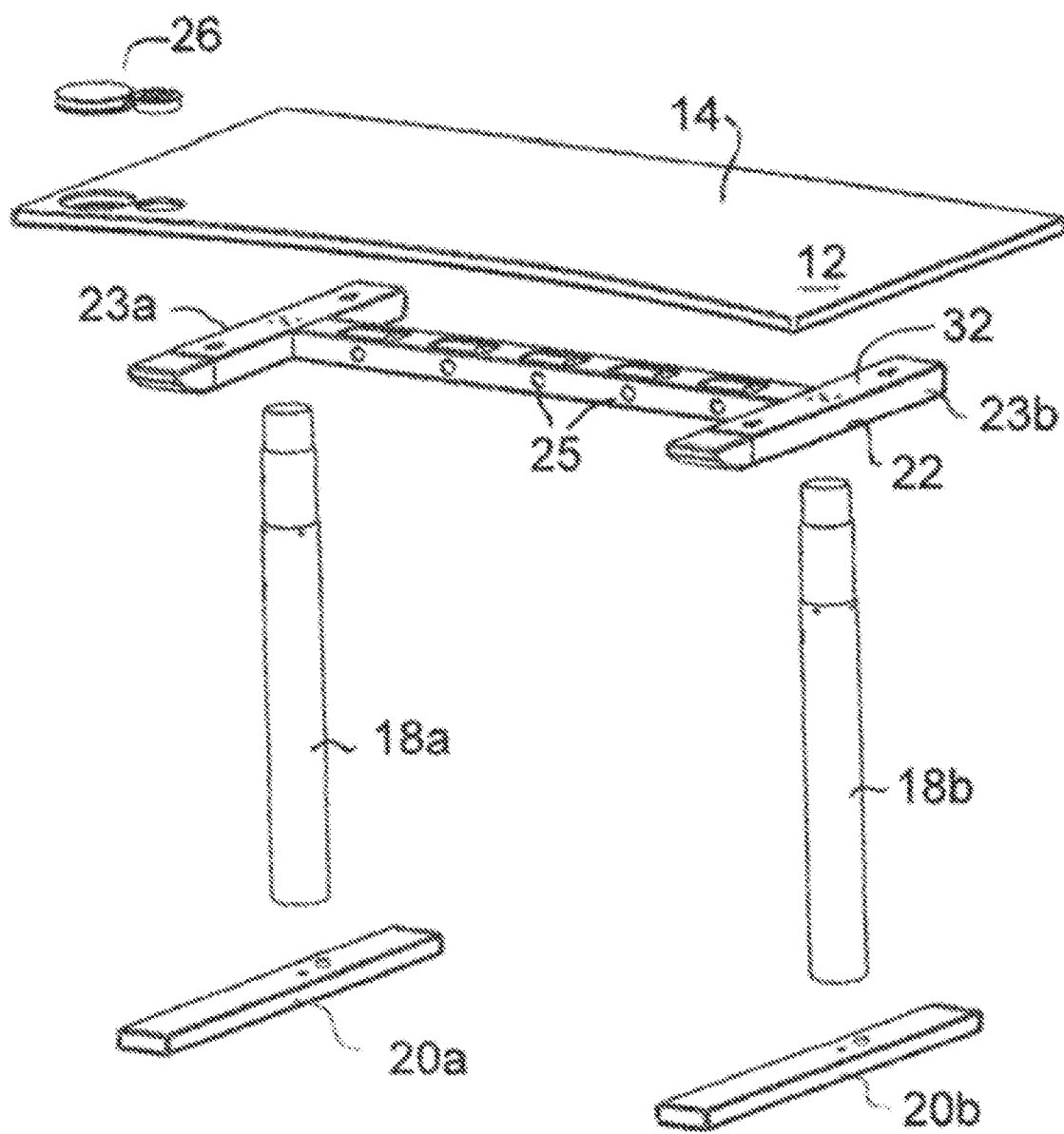
FIG. 8 is an upper perspective assembly view of the sit-stand workstation of FIG. 1, according to the invention.
Figure 9:
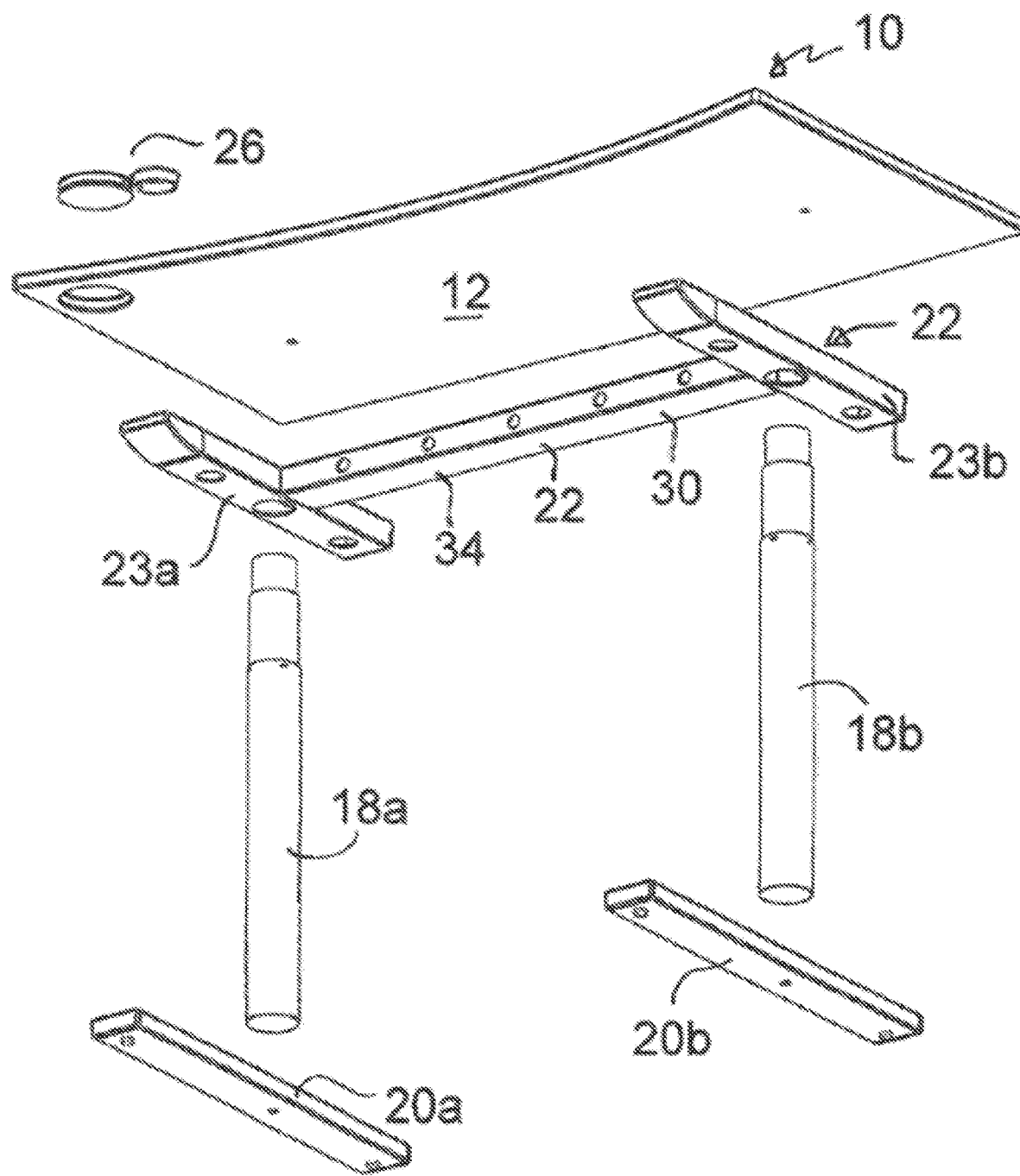
FIG. 9 is a lower perspective assembly view of the sit-stand workstation of FIG. 8, according to the invention.

Upper support frame 22 may be of any shape, but is preferably "H" shaped, as shown in FIGS. 7, 8, and 9, and includes two side sections 23*a*, 23*b*, connected to a central crossbar 30. These three parts are preferably hollow-box-formed and made from steel or aluminum. Each part is welded to each other to form a structurally rigid single body and defines an upper frame surface 32 and a lower frame surface 34. As described below, upper support frame 22 is connected to pedestals 18*a*, 18*b* and provides a rigid connection between the two and also provides a connecting platform to which the worktop 12 can be secured. Upper support frame 22 is preferably made hollow and includes a multitude of wire ports 25 through which various wires and cords may selectively pass between wire management box 27 (not shown in FIGS. 8 and 9, but shown in FIG. 7) and various electrical devices used either on the work surface 14 or in the immediate area.

Each pedestal 18a, 18b is preferably of the type that includes two or more vertically telescoping tubular sections and are each designed to selectively collapse and extend linearly between a lowest height, preferably about 20 inches, and a highest height, preferably about 48 inches. At least one, but preferably both pedestals 18a, 18b includes a drive mechanism (not shown). The drive mechanism is preferably located within the pedestal structure and can be electronically and accurately driven to control the exact magnitude of linear displacement (extension or retraction), and therefore the exact height of worktop 12, as measured between the floor and work surface 14. The drive mechanism preferable includes an electric motor (not shown) connected to a lead screw (not shown) wherein the lead screw engages a threaded follower. The follower is mechanically secured to a rigid portion of the pedestal structure so that as the motor rotates the lead screw, the follower is forced along the lead screw and in turn, causes linear displacement of the pedestal, as dictated by the sliding telescoping components of the pedestal.

Although the above arrangement is preferred, other mechanisms may be employed to raise and lower the work surface 14, as those of ordinary skill in the art are well aware, including a system of pulleys and cables, toothed belts, and/or appropriate bar linkages (e.g., four-bar linkages). Each of these systems may be used to effectively mechanically linearly displace each pedestal 18a, 18b, as instructed. Instead of an electrical drive motor, the linear drive mechanism for linearly displacing the pedestals may alternatively be derived from an appropriate pneumatic or hydraulic drive system or a magnetic linear motor, as understood by those skilled in the art. Appropriate linear drive systems for pedestals 18a, 18b are commercially available by several companies, such as: Joyce/Dayton Corp. of Kettering, Ohio. Regardless of the drive mechanism used, the drive mechanism is able to selectively raise and lower worktop 12 with respect to the lower frame (and the floor).

Referring to FIGS. 8 and 9, and regardless of the type of drive mechanism used to control the linear displacement of each pedestal, a lower end 19a, 19b (usually the telescoping section of largest diameter) of each pedestal 18a, 18b, is mechanically secured to base 20a, 20b and an upper end 21a, 21b is mechanically secured to upper support frame 22 using appropriate mechanical fastening means, such as bolts, welding, brazing, or friction (such as mechanical clamps), or a combination thereof, as long as the end result is that the each pedestal 18a, 18b is firmly mechanically affixed to both base 20a, 20b and upper support frame 22 to create a stable and strong structure. Although not shown, depending on the material and structural details of the different components of work station 10 a cross bar may be required to ensure a sturdy rigid structure that mitigates racking, listing and side-to-side wobbling.

Worktop 12 is secured to an upper side of upper support frame 22 using any appropriate fastening means, such as screws, bolts, rivets, adhesive or an appropriate mechanical friction means, such as clamping, so that underside 16 of worktop 12 contacts upper support frame 22 and so that worktop 12 becomes firmly affixed to upper frame surface 32 of upper support frame 22.

Bases 20a, 20b, pedestals 18a, 18b, and upper support frame 22 are all preferably made from a strong rigid material, such as steel or aluminum, but other materials can be used for all or some of these components, including wood, other metals and metal alloys, composites, plastics, and even the use of glass is contemplated.

Figure 10:
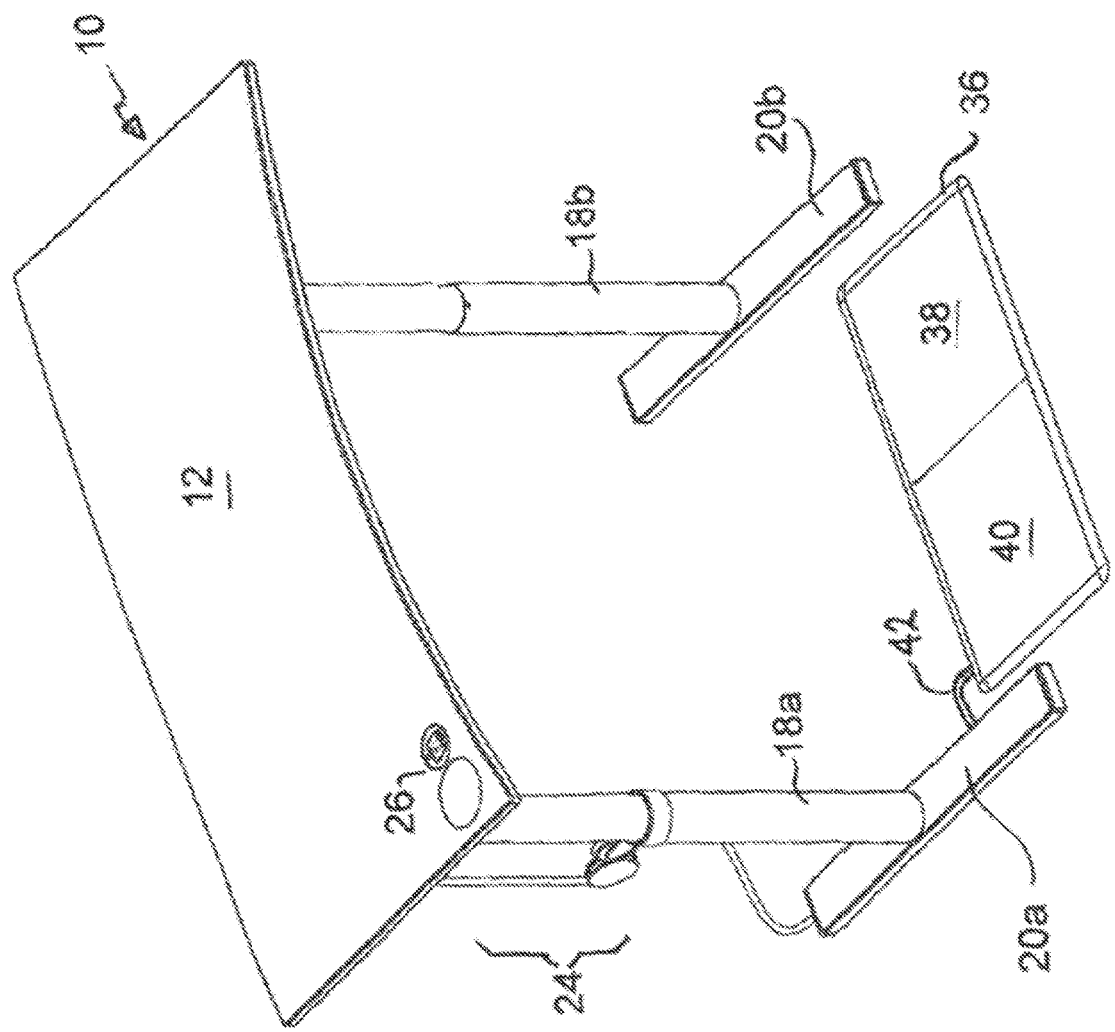
FIG. 10 is a perspective view of the sit-stand workstation of FIG. 1 showing a pressure mat, according to another embodiment of the invention.
Figure 11:
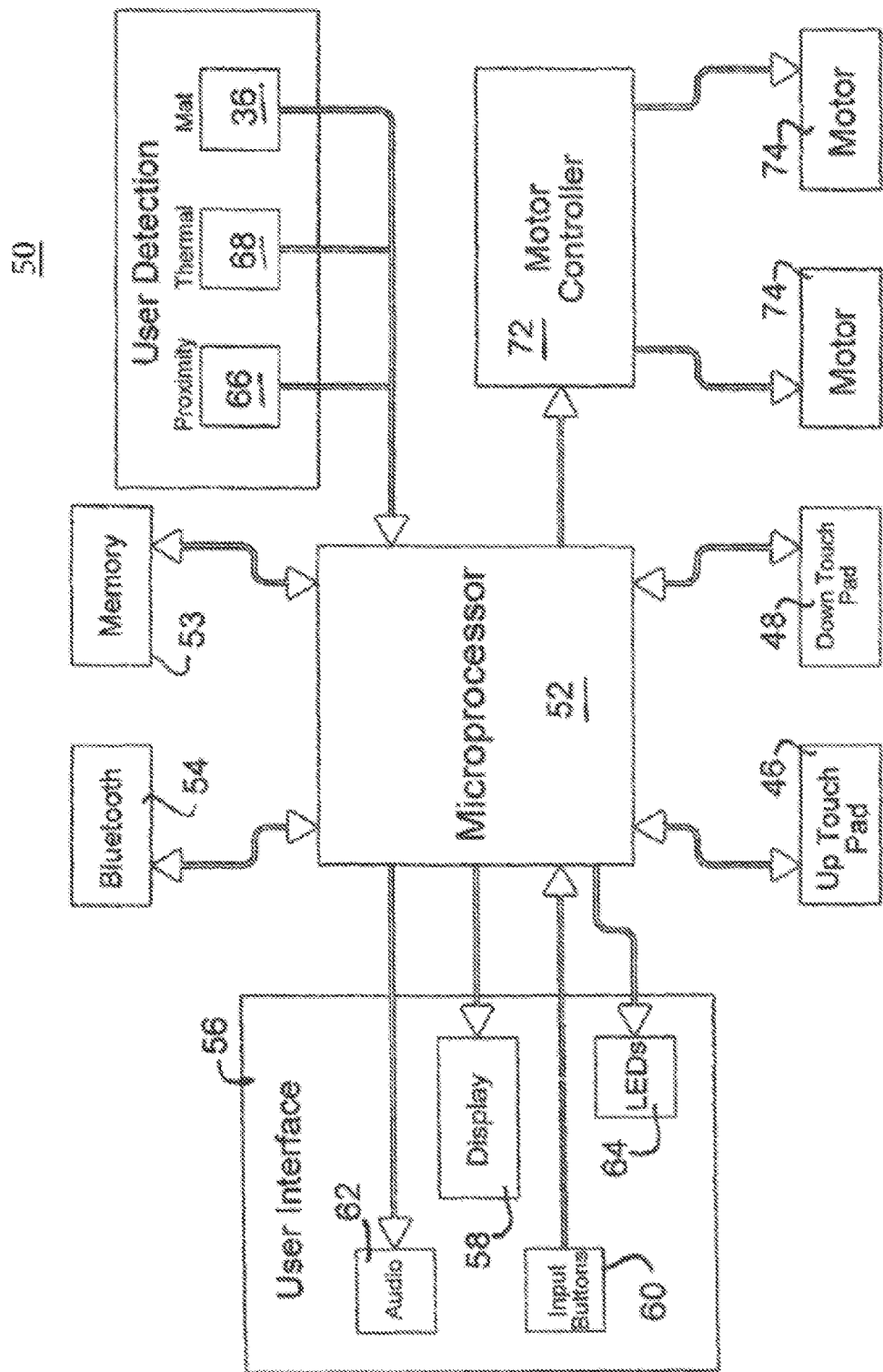
FIG. 11 is an electrical system schematic showing details of a control unit and peripheral sensors and devices, in accordance with the present invention.

Referring to FIG. 10, work station 10 is shown according to another embodiment of the invention wherein a pressure-sensitive mat 36 is provided, positioned on the floor in front of work station 10 and between bases 20a, 20b. Mat 36 includes appropriate circuitry (or other internal structure) to detect and measure isolated pressure within predetermined zones, preferably a right pressure zone 38 and a left pressure zone 40, but other zones are contemplated. The circuitry used within mat 36 is preferably a simple and reliable circuit, such as a strain-gauge system commonly used within conventional electronic scales or even within the floor step-unit of a Wii gaming system, or the pressure mats used to operate the automatic door-opening mechanisms of a grocery store. Mat 36 is electrically connected to control unit 26, either directly using electrical cord 42, or wirelessly using a wireless system (transmitter and receiver), such as Blue-Tooth®, other RF, or infrared. Mat 36 is used to detect and measure the following, according to the invention:

a) If a person is located in front of workstation 10;
b) If that person is standing;
c) If that person is sitting;
d) The weight of that person (used to track the person's weight and also can be used as a user identifier); and
e) Fatigue, by detecting repeated and more frequent weight shift from one foot or zone to the other.

Applicants further contemplate using mat 36 as an input device to help the user communicate to workstation 10, perhaps to raise or lower the work surface 14, or perhaps to cancel a planned height-change event, or to allow the user to perform a bit of exercise while standing, similar in concept to the Wii gaming system.

Also, mat 36 can include transducers (not shown) that would generate mechanical vibration in response to received signals sent to mat 36 from control unit 26 as a means for workstation 10 to communicate to or alert the user. Mat 36 is preferably made from a strong durable material, such as plastic, or rubber or composite and is powered by on-board batteries, or powered from a power unit located within workstation 10. Such mats are well known and the specific internal construction and internal operational details are beyond the scope of this invention. A well-known example of a pressure sensitive mat switch is commonly used at grocery stores to detect the presence of a customer entering or exiting and to then activate a motor-drive unit to automatically open the door.

Control Unit:

According to the present invention and referring to FIGS. 6, 8, 9 and 11, control unit 26 is shown including a display and input unit 44, an upper touch pad 46 and a lower touch pad 48. Control unit 26 preferably includes a control circuit 50 having a microprocessor 52, memory 53, a Blue-Tooth® module 54, and a user interface 56. User interface includes a display 58, such as an LCD display, input switches 60, an audio circuit 62 and status LED lights 64, all electrically connected to microprocessor 52 in a manner to provide the desired operation in accordance to the present invention, as explained below. User-detection transponders, such as an ultrasonic range finder 66, a thermopile 68, pressure mat 36 (shown in FIG. 10 and described above), and a microphone 70 are electrically connected to control circuit 50 so that electrical input signals from these remote transponders can be considered during operational decisions of work station 10, as explained below. Electrical connection of the above described components of control unit 26 are well known by those of ordinary skill in the art and are therefore not described in any great detail here.

A motor control circuit 72 is used to drive each drive motor 74 in response to electrical command signals from the connected control circuit 50, as described below. Motor control circuit 72 may be located within each respective pedestal, 18a, 18b, adjacent to each motor located therein. As explained above, drive motors 74 are used to raise and lower work surface 14, as needed. Control circuit 50 further includes various connectors that allow peripheral and other devices to be hard-wire connected to control circuit 50 and therefore to microprocessor 52, as desired or as necessary for proper operation.

As mentioned above, user interface includes display 58, input switches 60, an audio circuit 62 and status LED lights 64. Display 58 functions to communicate to the user both alphanumerical data and visual data during use of workstation 10. In accordance with the present invention, display 58 preferably changes background color to help convey certain information regarding the operation of workstation 10, the performance of the user, or to provide psychological encouragement or concern, depending on the on-going performance of the user. For example, if the user is on target or within 5% of meeting his or her goals for time standing, then display 58 will appear green. Following this example, a yellow color showing on display 58 will indicate a slight departure from the height-management schedule and a red color could show for a short period of time if and when a particular scheduled raising event is cancelled by the user. Display 58, according to the invention is also used to indicate various numerical information during the setup and operation of workstation 10, such as any inputted data including the user's weight, height and age, the date, the time, etc., and various operational data, such as current height of the work surface, current time and date, and desired and current standing time in percentage or hours and minutes. Display 58 can also indicate an estimate of current calories burned for that day, calories burned for the month, etc. and even a rate of calorie-burn at any given time. For encouragement, Applicants contemplate calculating and displaying an equivalent "age number" as an estimate of improved health that the user would be considered equal to, a kind of representative fitness indicator. The number would be displayed automatically if the number shows a younger age than that of the user, and displayed by request regardless of the age.

Input switches (or buttons) 60 are used to allow the user to input information and control different functions and modes during the operation of workstation 10. Input switches 60 can be any conventional type electric switch, such as a simple momentary push-button membrane switch, a capacitive-controlled "touch-sensitive" contact switch, or even as an "on-screen" switch, provided within display 58 as a touch-screen input device. Regardless of the type of switches used, Applicants recognize the need of a sealed user interface to prevent or at least discourage dirt, dust, crumbs, or any liquids from reaching any internal circuitry of control unit 26.

According to one embodiment of the invention, at least two input switches are large capacitive-controlled "touch-sensitive" contact surface pads, a move-up lower touch pad 48 located on the underside 16 of worktop 12, and a move-down upper touch pad 46 located on work surface 14 of worktop 12. According to this embodiment, if a user just touches move-up lower touch pad 48 with his hand, the "switch" would "close" and this condition would be instantly detected by microprocessor 52 during routine interrogation, which would then immediately send a signal to motor control circuit 72, which would, in-turn, cause drive motors 74 to automatically activate to raise worktop 12. The fact that move-up lower touch pad 48 is located under worktop 12 allows the user's hand to move up with the table, giving the user a better sense of control since the user's hand rising with the table would effectively be lifting the table. This arrangement provides effective bio-feedback to the user. Similarly, having the move-down switch located on the top of the table allows the user's hand to move down with the table.

Applicants contemplate providing each up/down capacitive switches with an adjacent momentary pressure membrane switch. This arrangement, for example would allow the user to raise or lower the worktop 12 at a first speed just by lightly touching the capacitive switch and then selectively increase the rate of height displacement by pressing the same switch a bit harder so that the adjacent pressure membrane switch is activated. Control circuit 50 would be programmed to control the speed of the motors in response to the detected condition of both the capacitive switch and the pressure switch for both up and down directions. The switch can be in the form of a touch-screen wherein a graphic switch or similar can be displayed on the screen to convey a switch function. The user merely has to touch the screen on the switch graphic to effectively generate a "start" command, which is sent to the control circuit (the "start" command may not necessary be generated by the switch itself, but may instead be created within the control circuit in response to detecting that the switch has been activated—either moved to cause the worktop to move up or down or change speeds, as understood by those skilled in the art). Once the control circuit "receives" the start command, the control circuit sends a signal to motor control circuit 72, which would, in-turn, cause drive motors 74 to automatically activate to raise worktop 12.

One Touch Operation:

According to another embodiment of this invention, control circuit 50 and the controlling software program is such that the user only has to touch either the upper touch pad 46 or the lower touch pad 48 a single time to instruct the microprocessor 52 to activate drive motors 74 to move worktop 12 either up or down to a preset or predetermined height. In this arrangement, the user only has to touch the touch pad (46 or 48) a single time and then release (just a tap or a swipe with the finger or palm). This feature is unlike conventional sit-stand workstations of the prior art which require that the user hold the switch constantly for the motor to remain activated during the travel of the worktop to the desired height. The prior art workstations use this continuous hold-down requirement as a safety feature so that the worktop does not accidentally hit anything during its movement.

The pedestals of the present invention preferably include an automatic safety cutoff system which will automatically deactivate drive motors 74 instantly should any part of workstation 10 contact an obstruction during movement. Such a cutoff system can be Piezo-electric based, or based on IR proximity type sensors, or other type of sensors, as understood by those skilled in the art, as long as the sensors can detect or otherwise determine that a portion of workstation 10 may contact with or otherwise damage an object or injure a person during lowering and that in such instance, the lowering movement will either stop or not start to begin with. Also, this feature requires that the user preset the upper and lower height-stops so that the control circuit 50 knows when to stop displacement once activated. If worktop 12 is located at its lowest height, as preset by the user during initial setup, and the user touches touch pad (46 or 48), control circuit 50 will drive the motors to raise worktop 12 until it reaches the highest preset height. Similarly, if the user touches touch pad (46 or 48) again, worktop 12 will descend to the lowest preset height. Now, if worktop 12 is located at some intermediate height somewhere between the preset highest and lowest height-stops, then it is preferred that the single-touch feature not activate. In such instance it is preferred that the user manually raise or lower worktop 12 to either the highest or lowest preset height-stops to reactivate the single-touch feature. This is because the system won't know if the single touch command is meant to raise or lower the worktop. As an alternative here, instead of preventing the single-touch feature from operating if the worktop is located at an intermediate position, the control circuit 50 can display a confirmation request on display 58 before a height-displacement occurs, such as "Tap upper pad once to confirm to move up—Tap upper pad twice to confirm to move down" . . . or words to that effect.

According to another embodiment of the invention relating to the above-described single-touch feature, the user may touch upper touch pad 46 once, as before, to activate the drive motor and move the worktop up or down. If the worktop is located at the highest (preset) position, the single-touch input will cause the worktop to descend to a preset lower position, where the drive motor will automatically stop. If the worktop is located at the lowest (preset) position, the single-touch input will cause the worktop to ascend to a present higher position, again where the drive motor will automatically stop. If the worktop is located at any intermediate height (between the uppermost and lowermost preset positions) the user's single-touch command will cause the worktop to automatically ascend (by default) advancing towards the upper preset position. If the user really wanted the table to descend instead, he or she just taps the upper touch pad 46 once to stop the ascending worktop and once more to cause the worktop to reverse direction and descend to the lowermost position. In this arrangement, as the user taps the upper touch pad, the motor will follow the same pattern: first tap, go up, second tap, stop, third tap, go down, fourth tap, stop, fifth tap, go up, etc.

To prevent accidental activation of the motor drive, the single-touch-to-activate operation can actually be a quick double-touch (like the "double-click" of computer mouse buttons) or a prolonged single-touch (or some other pattern of touching) to prevent accidental motor activation. With a single touch operation, the user may find themselves accidentally touching the upper touch pad 46, which can prove to be annoying. The user may set up the tap-to-move feature to operate as follows:

a) Which direction will the worktop move when the touch pad is touched (up or down);

b) How many taps is required to activate the movement (what is the tap pattern—single tap, double tap, long duration tap, etc.); and c) Which touch pad is to be used in this mode, the upper touch pad 46, the lower touch pad 48, or both.

According to yet another embodiment of this invention relating to the above-described single-touch feature, the user may single-touch the upper touch pad 46 to cause the worktop 12 to auto-move down to the lower preset position and single-touch the lower touch pad 48 to cause the worktop 12 to auto-move up to the upper preset position. In this arrangement, the single-touch feature will work regardless of the height position of the worktop.

According to another embodiment of the invention, Applicants contemplate that control circuit 50 will recognize when a user touches both upper touch pad 46 and lower touch pad 48. This action can be used to cancel a height-displacement event, or cancel a mode or provide an input response to a selection request.

Status LED lights 64 are preferably provided to convey select operational information, such as confirmation of a switch event (confirming to the user that the control circuit has detected the activation of a particular switch), power on, and perhaps a blinking or brighter condition to indicate when the table top is in motion up or down.

Apart from the above-described mat 36 which, as described can be used to detect the immediate presence of a user, ultrasonic range finder 66, and a thermopile 68 (such as Passive Infrared—PR) can also be used to detect when a user is nearby. Such detection allows important features of the present workstation to function, including:

a) Only operating drive motors 74 when a user's presence is detected (a safety feature);

b) Driving drive motors 74 to allow worktop 12 to move quickly up and down as a greeting (and also as a reminder to use the sit/stand operation of workstation 10) when a user first arrives at the workstation, perhaps in the morning; and c) To only calculate stand-time by the user when the user is actually present at the workstation.

Microphone 70 (and voice-recognition circuitry) is preferably included with the present workstation 10 so that control circuit 50 is able to determine if the user is speaking, perhaps on the telephone, or with a colleague. If such determination is made, it is preferred that control circuit 50 will postpone any table top movement during this time. We don't want to surprise or otherwise bother or interrupt the user when it is likely that he or she is busy.

Microprocessor 52 is instructed by a software program stored in onboard read-only memory. According to the present invention, the software is written to control the work-height of the table top in one of the following modes described in the following paragraphs Manual Mode:

This mode simply controls the up-down operation in response to the manual instructions by the user. When the user commands it, the control circuitry responds, the motors are driven and the table top is repositioned until the user releases the up/down switch, or as described above, the motors will automatically reposition worktop 12 from the lowest height stop to the highest height stop without having the user to hold onto the upper touch pad 46, or the lower touch pad 48.

Semi Auto Mode:

This mode provides automatic operation of the table top. The user inputs (as a percentage) how much of the time of use of the sit/stand desk he or she wishes to stand. For example, during an 8 hour period of use, worktop 12 will be in the raised position 25% of the time, meaning that the user will be standing for 2 hours during that time. Control circuit 50 will provide a height-adjustment schedule for this time period so that the user will be asked to stand a total time of 2 hours (or 25%) over the 8 hour period. Of course the actual stand time will be divided up during the 8 hours and will preferably follow a predetermined or random schedule. In this mode, control circuit 50 will signal to the user that a height-adjustment event is imminent, but will not carry out the height-adjustment until the user confirms that he or she approves. The user therefore effectively remains aware of the height-adjustment events during the day, but can override any event by either not confirming at the time of an event, or by actively cancelling the particular event. The user remains in control, but control circuit 50 encourages the user to keep to the sit and stand schedule by reminding the user when each height-adjustment event should occur to meet the pre-established goal. When the user cancels an event or manually changes the height of the worktop, control circuit 50 will automatically adjust the remaining schedule to account for the user's override and ensure that the user meets the standing goal (in this example, 25%). Canceling a height-adjustment event is similar to using the "snooze" button to cancel an alarm. It does not cancel the mode. The control circuit will continue to remind the user of future height-adjustment events, as they come up. According to this semi auto mode, when the worktop is meant to displace vertically during a height-adjustment, the present system will prompt the user by a "whisperbreath" worktop movement, as described below and request permission. When the user senses this movement of the worktop, he or she will understand that it is time for a height-adjustment event and that the workstation is requesting permission to carry out the adjustment. The user can either accept or decline this request, as described above.

Full Auto Mode:

This mode moves worktop 12 up and down following a height-adjustment event schedule. The schedule in this mode can either be generated by the control unit, in response to some initial inputs by the user, or set up by the user entirely. During use in this mode, when an event is to take place, the control unit will alert the user that a height-adjustment is imminent (for example, by activating worktop in a "whisperbreath" movement, as described below). The user does not have to confirm or do anything. After a prescribed period of time (a few seconds), the control unit will send a "Start" command to activate the drive mechanism, to raise or lower the worktop, as scheduled. The user can, at any time, cancel the height-adjustment movement by contacting the touch pads 46, 48. If the user cancels the event prior to movement, then worktop will remain at the same height and the schedule will be updated to account for the cancelled event. If the user cancels the event during the event (when the worktop is moving, the movement will stop). The user can then contact the touch pads 46, 48 another time to return worktop to the start height prior to the event.

According to this full auto mode, when the worktop is meant to displace vertically during a height-adjustment, the present system will prompt the user. When the user senses this movement of the worktop, he or she will understand that a height-adjustment is imminent, unless he or she wishes to cancel the event.

Adaptive Operation:

In either full or semi auto modes, an important feature of the present system is that it will adapt to the behavior of the user so that future operation of the workstation will better match the user's fitness level. This will encourage continued use of the workstation and therefore, continued fitness and wellness.

For example, the user programs workstation 10 to be fully raised 40% of the time during a period of operation (a full work day for example). But during operation, control circuit 50 detects that the user is shifting his or her weight side to side at more frequent intervals, as detected by the right and left pressure zones 38, 40 of mat 36, or by other sensors. This can indicate that the user is getting tired standing. In response to this potential fatigue by the user, control circuit 50 adjusts the height-adjustment event schedule so that worktop 12 will only be fully raised perhaps 30% of the time, taking into account the shortened time remaining of the period of operation during the recalculation.

In this example, the workstation of the present invention learned and adapted to a changing user behavior, as detected by its sensors. During use, the user appeared to be getting tired at the set stand time of 40% so the present system automatically reduced the goal to 30% to better match the fitness of the user. The workstation, according to the present invention uses sensors and data to "get to know" its user and adapt accordingly. In the above example, perhaps control circuit 50 can change the duration that the table resides at the full up position from 60 minutes to 30 minutes so that the user will be less fatigued during each standing period. The duration for each full down condition can also be adjusted to better adapt to the user. Continuing with this example, should the user show more fatigue in the future, the present system will again reduce the standing time until a balance is found, wherein the extra work required by the user to stand matches the condition of the user. Once this balance is determined, the present system can establish a schedule that matches the user's ability and fitness and can slowly work with the user to improve the user's strength, fitness and wellness over time. Similarly, control circuit 50 can adjust the duty cycle of each event to more closely fit the user's ability. As the user of the above example improves their fitness over time, the present system will detect this and will again adapt, but this time by increasing the standing duration, decreasing the sitting duration, and perhaps increasing the frequency of height adjustment events.

The learning feature of the present invention also learns basic work habits of the user, such as when the user goes to lunch each day, when he or she arrives and when he or she leaves. The system, according to the present invention may confirm trends over longer periods of time regarding the user. For example, the user may appear to be a bit more tired on Mondays owing to the number of cancelled raising height-adjustment events (and other measured or sensed factors) and perhaps even the measured amount of time it takes the user to transition from sitting to standing. The controlling system of the present invention uses this information to adjust the height-adjustment event schedule accordingly so that the system works with the user's detected strength and endurance, during the day, the week, and over longer periods of time. Over time, while using the present workstation in this mode, the height-adjustment event schedule and user-prompts on the screen will work to encourage the user and/or modify the amount of time sitting to help achieve long-term health benefits.

Other considerations can be used to influence the duration and frequency of height-adjustment events during the time period. Such information, such as general profile information, including the user's age, weight, overall health and answers to such set-up questions as:

1) Are you a morning person?
2) Do you exercise in the morning?
3) Do you have any injuries?
4) Do you have a heart condition? How much do you weigh?
5) About how many miles do you walk each day? What do you eat for a typical lunch?
6) Do you eat breakfast?

Other considerations may include performance data gathered early on during the day. For example, if the user is asked to stand for a duration of 1 hour and after just 15 minutes control circuit 50 reads data from mat 36 and determines that the user is shifting their weight from one leg to the other at an increasing frequency, then control circuit 50 will re-evaluate the duration and the schedule will automatically change to accommodate the learned ability and apparent health of the user. The system is designed to learn over the short term and the long term the particulars and improvements of the user so that a height-adjustment schedule can be created to benefit the user over a long period of time. In the above example, the schedule would change to shorten the stand—duration and if the user response continues to convey signs of weakness or fatigue, the system will either suggest a lower total stand time (perhaps 20%), or will just automatically adjust the percentage regardless.

According to the invention, when control circuit 50 is set in either the above-described automatic or semi-automatic mode, the present system will automatically adapt to the particular user and will change the duration, the frequency of the height-adjustment events, and the total stand time over the period of use in response to the user's measured behavior, as they use the desk. As described elsewhere in this application, if the user shows fatigue, for example, by rocking side to side, alternating putting his or her weight on his or her left and right foot, the present system will detect this (using mat 36 or other sensors). When this fatigue is detected, control circuit 50 will change the parameters of the height-adjustment schedule to better fit the condition of the user. The present desk is meant to work with the user, nudging them along with encouragement to follow an adaptive sit—stand schedule to thereby maximize fitness and wellness. Examples of such user-behaviors include:

| Measured Behavior | Response to Behavior |
| --- | --- |
| Fatigue of User | Decrease Amount of Stand Time |
| Strength of User | Increase Amount of Stand Time |
| Patterns of Height-Change Event | Avoid those Times for Height-Change |
| User is Not Detected at Desk | Do Not Change Height of Desk |
| Downloaded Fitness Information | Adjust Stand Time Accordingly |

Overtime, the present system will better understand "who" the user really is, and based on these measured behaviors and other considerations, the present workstation can adapt its operation accordingly.

According to another embodiment of the present invention, external devices, such as cell phones, computers and exercise-monitoring devices can be connected, either wirelessly, or by electrical connection to the control unit. An example of an exercise-monitoring device is a Fitbit®, made by Fitbit, Inc. of San Francisco, Ca. 94105. This particular device measures various parameters by a user during their movement, including the number of steps taken, the number of miles walked, the number of stairs climbed, and an estimate of calories burned. This information can be downloaded to the present workstation and used to determine the measured behavior of the user so that the workstation can take this information into account when determining the height-adjustment schedule for the user for the day.

Whisperbreath Movement of Worktop:

As described above, in either the fully auto mode or the semi-auto mode, the user is notified by display 58 and/or by smooth, small up and down height-displacements of worktop 14. This smooth up and down motion of the worktop 14 is known to the Applicants as a "whisperbreath" movement and is an important feature of the present invention. The movement provides a means to communicate to the user of the workstation in a relatively calm and non-interrupting manner. The amplitude of vertical displacement and the frequency is preferably calculated to mimic the breathing amplitude and frequency of a relaxed human. This frequency has been determined to be about 16 cycles per minute and the preferred vertical displacement of worktop 14 is about 1 inch (measured from peak to valley).

According to a preferred embodiment of this invention, whenever a height-adjustment event is about to occur in the auto-mode, the worktop of the present workstation will perform a whisperbreath movement (gently moving up and down) to inform the user that the worktop is about to move. In the above-described semi-auto mode, this movement will be used to indicate to the user that the workstation is requesting permission (prompting the user) to make a height-adjustment and the user must authorize the movement by contacting the display panel with his or her hand, using the pre-established tactile gesture, such as a single or double tap, or perhaps a swipe. Although this whisperbreath movement is preferably used alone to prompt the user, as described above, this movement can be supplemented with a sound. Also, if the user ignores the gentle movement of the worktop 12, the frequency and amplitude can be changed by control circuit 50 to a less-than-peaceful movement to better get the user's attention.

Figure 12:
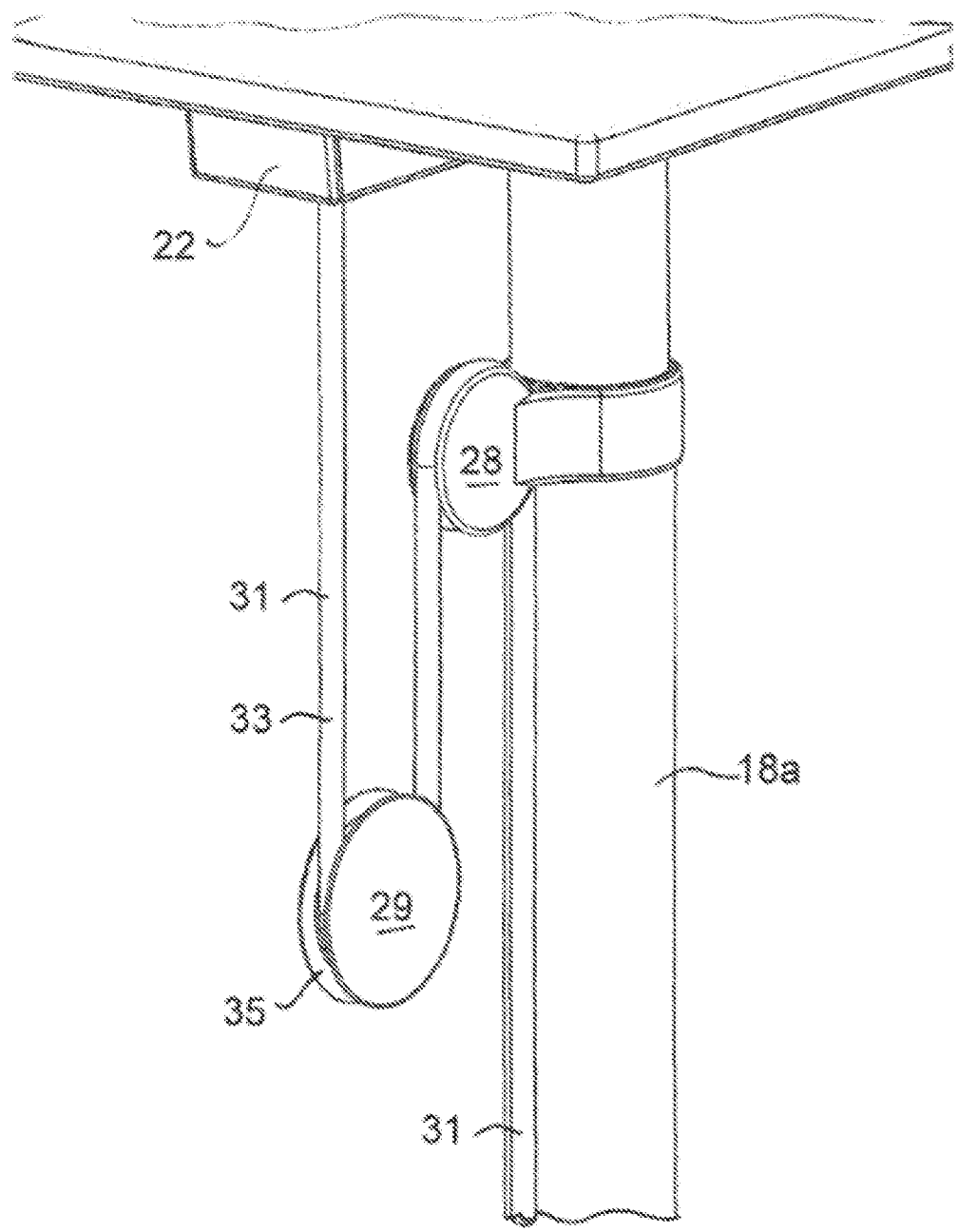
FIG. 12 is a perspective partial view of the sit-stand workstation of FIG. 1, showing details of a power-cord tensioning assembly, according to another embodiment of the invention.

Referring to FIG. 12, when the user receives workstation 10 for the first time and powers it up, workstation 10 will greet the user by the above-described whisperbreath movement of worktop 12. According to one embodiment of this feature, this greeting movement will be repeated once a day when the user first arrives, as detected by mat 36, proximity transducer or some other sensors. According to another embodiment, this same movement, or a similar one can be used to get the user's attention at any time during the period of use (e.g., during the day at the office). As mentioned above, the characteristics of this whisperbreath movement can vary so that more than one movement can be used to indicate different things. As mentioned above, a greeting movement can be relatively quick (almost indicating "happiness" to see the user). This movement can therefore have a relatively quick cycle time, perhaps moving up about ½ inch and then slowly down 1 inch and then quickly up 1 inch and finally slowly down ½ inch. Another unique movement can be described as moving up and down 1/10 inch very quickly, essentially a vibration. This quicker movement could perhaps be used to convey more urgent messages to the user. Another signature movement could be a single quick downward movement of perhaps ¼ inch. It is contemplated that the user's cell phone can be "connected" (by Bluetooth®, or other) to control circuit 50 and the alert movement of the desk can be used to alert the user of certain cell phone events, such as incoming call, email or text, etc. The desk movement can also be used in connection with software programs running on a nearby computer, such as Microsoft's Outlook®, wherein, for example, the movement can alert the user of an upcoming meeting. Other electronic devices can be connected to control unit 26 so that these devices may cause a whisperbreath movement to occur. Such devices include a smoke or fire alarm, a doorbell and a remote security device. For example, if a nearby smoke alarm is activated, a signal could be transmitted to the user's workstation to cause the worktop to alert the user by rapid movement of the worktop. Any amplitude or frequency or sequence can be used to create unique movements for any of a variety of alerts to the user. The general amplitude range for these dips is between about 1/16 inch to about 1 inch (measured peak-to-peak).

In use, during initial setup of workstation 10, according to one embodiment of the invention, the user is asked to answer several questions that appear on display 58 and also to input several bits of information, such as the use's age, date, time, the user's name, weight, height, build and other. The user will then be asked to manually raise worktop 12 to a height that the user considers to be a comfortable maximum height for standing. When the desired height is reached, the user holds lower touch pad 48 until control circuit 50 flashes status LED lights 64 and audio circuit 62 beeps (and perhaps the worktop whisperbreath movements). The user will repeat this process for setting the desired lowest worktop height (i.e., sitting)

Control circuit 50 will then continue the set up by asking the user to select a percentage-standing value, such as 25% so that later when "Semi Auto Mode" or "Full Auto Mode" are selected, workstation 10 can operate immediately under the predetermined guidelines of either of these two modes. The user will also have to input the average consecutive time spent at the workstation. These values can be adjusted either by the user, or automatically as control circuit 50 adapts to user conditions and user behavior patterns over time.

Applicants further contemplate an alternative set up process where after the user inputs the above-mentioned information, the user is encouraged to use workstation 10 in a manual mode for a period of time, perhaps a week. During this time, control circuit 50 will keep track of the different worktop heights, duration at those heights and frequency of height-adjustment event and then use this information to determine highest height stop, the lowest height stop, and a baseline health value. From this information, control circuit 50 can create a more accurate height-adjustment schedule when the user selects Full Auto Mode or Semi Auto Mode later on. The computer will know (eventually, as it learns) if the user is not very fit and will start a plan that is less strenuous to the user, offering perhaps a schedule that asks the user to stand 15% during the work day time period. The computer monitors how the user is able to handle this plan over the next week or two and then slowly increases the standing time and/or frequency of the sit-stand events. If the user starts overriding the automatic events set by the computer, either cancelling or extending the duration or frequency, the computer would detect this and make adjustments to the event schedule accordingly. Applicants recognize that an important feature here is to ensure that the user is not discouraged by using the present workstation according to the invention and follows the prescribed height-adjustment event schedule as closely as possible.

An important goal of the present invention is to provide a sit/stand desk (and other devices) that encourage a user to get fit and stay healthy. As mentioned above, the present invention uses sound, by sound effects and voice (words of encouragement, etc.), lights (different colors displayed on display 58 to convey different levels of success and encouragement), or numerically, by displaying a numerical value on display 58 to convey levels of success or honest levels of current health.

According to yet another embodiment of the invention, to encourage the new user to just get started, the workstation 10 is immediately operational and will automatically follow a preset level of standing time, such as 15%. The user will be able to "play" with the heights to adjust the preferred heights during initial use, when the user wants to. The control circuit 50 will keep track of all adjustments and will slowly fine-tune the user's operational parameters. The present workstation 10 will ask the user questions over a period of time, such as a week, including the use's age, date, time, the user's name, weight, height, build and other. This way, Applicants believe that because the user will not feel like there is a set up period and they can use the workstation immediately, they will feel better connected to the workstation with develop a feeling of trust and oneness, which can only encourage prolonged use of the workstation and a healthy outcome.

Figure 4:
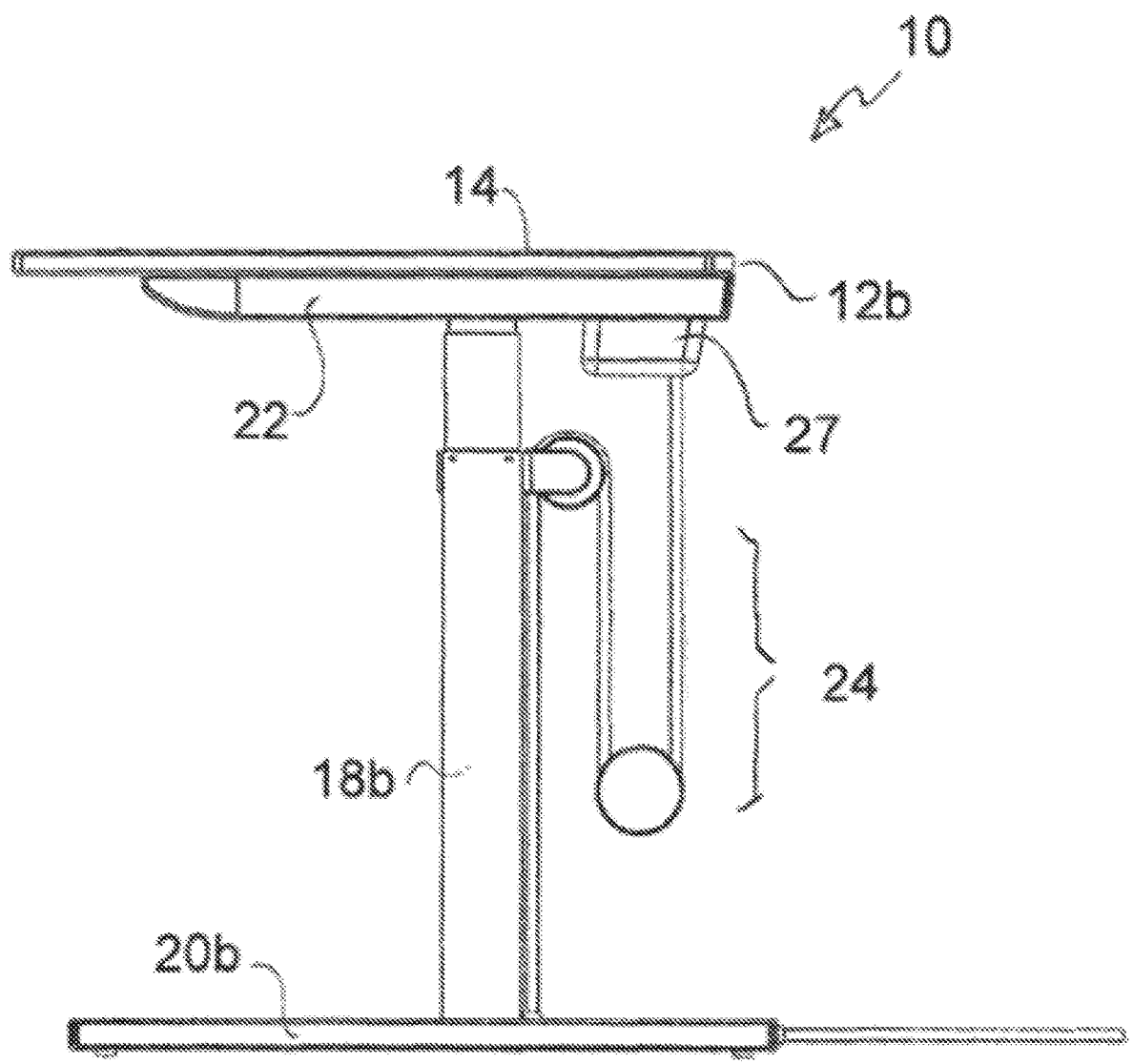
FIG. 4 is side elevation view of the sit-stand workstation of FIG. 1 shown in a lowered position, according to the invention.
Figure 5:
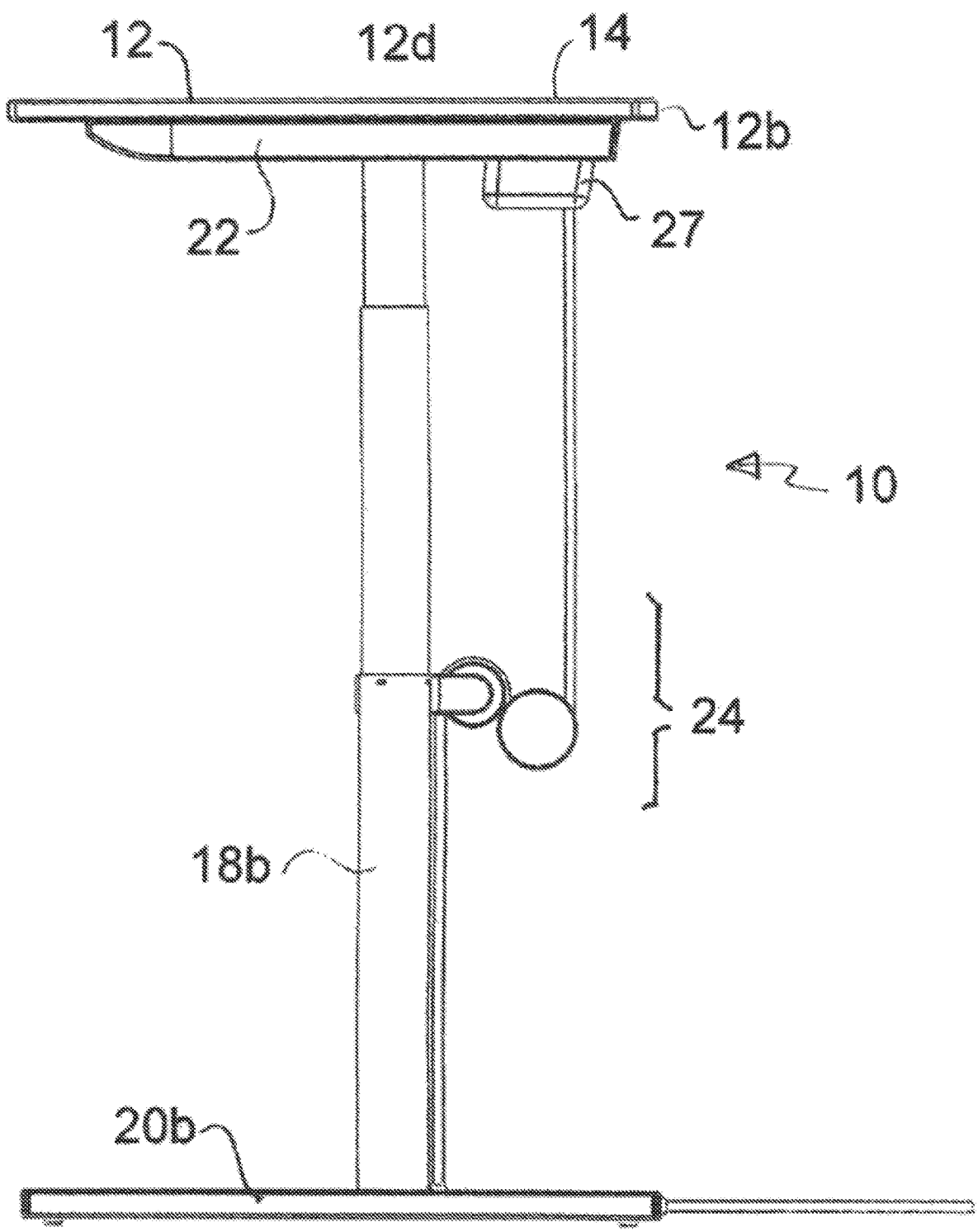
FIG. 5 is side elevation view of the sit-stand workstation of FIG. 1 shown in a raised position, according to the invention.
Figure 6:
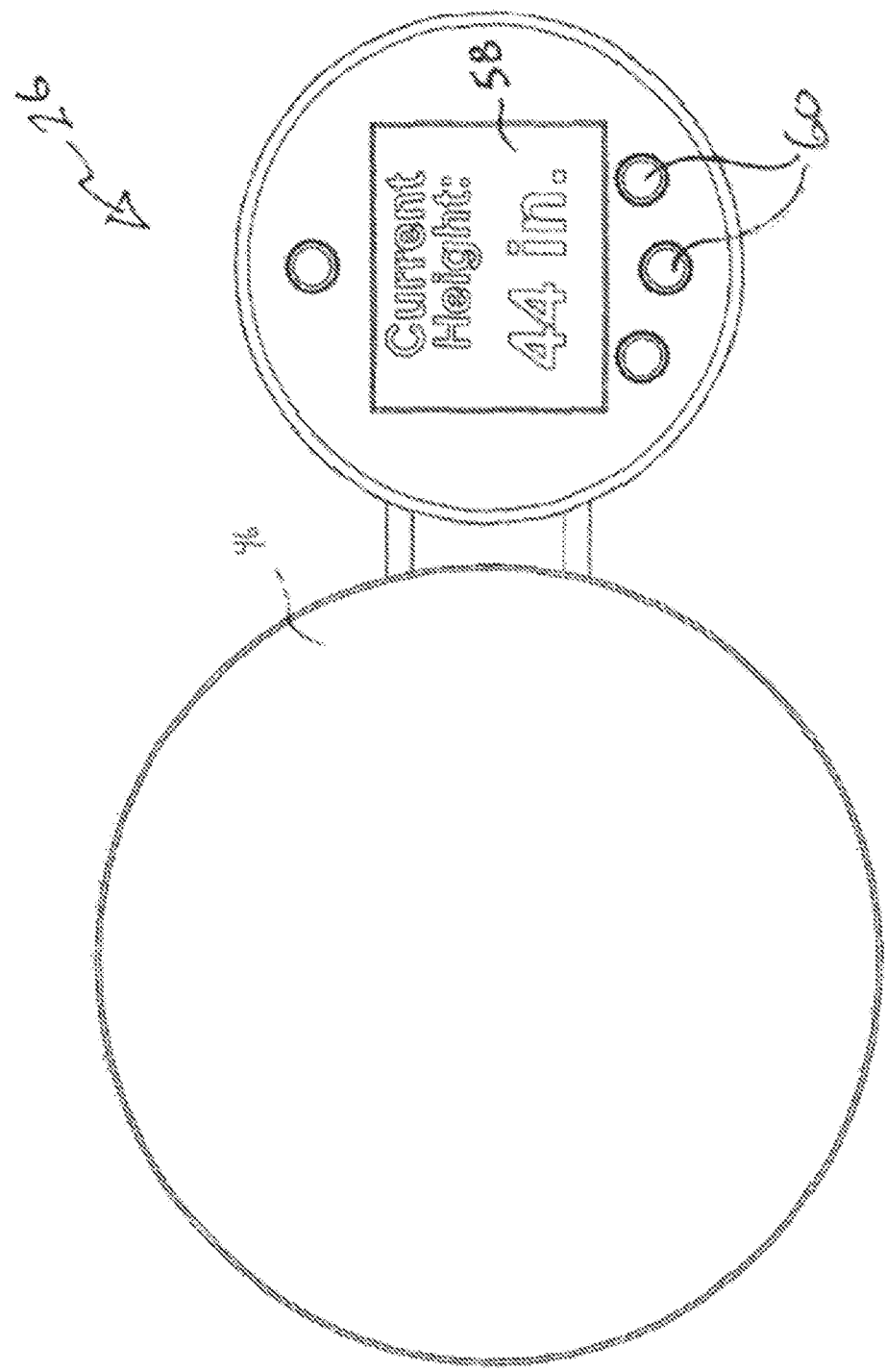
FIG. 6 is a top plan view of the control unit, showing an input contact pad and a display, according to the invention.

Wire Management:

Since work station 10 commonly supports electronic equipment on worktop 12, such as a computer and monitor, it is important to provide a source of power for such devices located on worktop 12. The challenge is to manage the power cable as it follows the worktop up and down during the operation of workstation 10. Referring to FIGS. 4 and 5 and according to a preferred embodiment of the invention, a cord tensioning assembly 24 is shown including a stationary pulley wheel 28 and a tensioning weight 29. Pulley wheel 28 is secured to either pedestal 18a, 18b (shown in the figures secured to pedestal 18a) at a portion that remains stationary with respect to base 20a as worktop 12 moves up and down during the operation of workstation 10. Pulley wheel 28 is preferably circular in shape, like a conventional pulley and includes a circumferential groove that is sized and shaped to receive a power cord 31. Pulley wheel 28 is preferably about 2-3 inches in diameter and is mounted to leg 18a so that the center of pulley wheel is located about 2 to 3 inches away from leg 18a.

As shown in FIGS. 4 and 5, and 12, power cord 31 is fed into either base 20a, 20b (shown fed into base 20a in the figures) and directed up to the groove of pulley wheel 28. According to the present invention, tensioning weight 29 is preferably pulley shaped and includes a groove 35 that is sized to receive power cord 31. Power cord 31 extends up to upper support frame 22 and is provided with slack so that a loop 33 is formed. As shown in FIGS. 4 and 5, tensioning weight 29 is positioned within this loop so that power cord 31 is effectively captured within groove 35 halfway around the pulley-shaped weight, thereby holding tensioning weight in place. As worktop 12 moves up and down during use, the power cord loop 33 changes size, but since tensioning weight 29 is always secured within loop 33, its weight will keep power cord 31 taut and the loop managed so that power cord 31 does not get tangled with nearby objects. The exact weight of tensioning weight 29 will depend on the type and flexibility of the power cord used, but it is expected to be between 8 ounces and one pound, sufficient to keep power cord 31 taut and straight regardless of the height of worktop 12, as shown in FIGS. 4 and 5. Power cord 31 is preferably fed through hollow portions of upper support frame 22 and connected to an outlet strip of several power outlets (can be conventional) and perhaps other communication connectors, which is positioned within wire management box 27. Wire management box 27 is secured to underside 16 of worktop 12 so that it moves up and down with any vertical displacement of worktop 12 during operation of workstation 10. Therefore, any electrically powered device located on work surface 14 or worktop 12 can be easily and effectively plugged into one of the outlets located within wire management box 27 without fear of entanglement during operation of workstation 10.

Communication:

According to yet another embodiment of the present invention, user use-data can be collected and stored by control circuit 50. Following a predetermined download schedule, control circuit 50 can use the Blue-Tooth® module 54 (or WIFI) to link up with the Internet either directly or through the user's computer and transmit the stored user use-data to remote servers for product validity and user evaluation. Applicants contemplate providing a service for users wherein qualified personnel may review the user use-data and other user-profile information, fitness history to help recommend a refined fitness schedule to allow the user to better reach their fitness goals. In such instance, two-way communication between the remote servers and the user's workstation may occur through the Internet and either the Blue-Tooth® module 54, a WIFI connection, or perhaps a hard wire connection. The remote servers can also use this communication link to provide firmware updates as necessary. This communication feature would allow the user to receive weekly or monthly reports showing health improvement, total times standing and equivalent calories burned daily, weekly and total to date, as well as other collected and monitored data. The user would hopefully look forward to receiving their "report card" and would be encouraged to stay with their schedule.

All user-inputted data and settings and collected data can be automatically backed-up at a remote memory location so that the appropriate data and settings can be recalled if necessary, such as if the user disconnects all power to workstation 10 or upgrades to another workstation 10.

Improvements in Workstation-User Sensing:

According to previous embodiments described in this patent application, mat 36, ultrasonic range finder 66, thermopile 68 (such as a passive infrared—PIR), and microphone 70 are used independently or in any combination to detect when a user is nearby or adjacent to the workstation (i.e., "is present"). Such user-detection allows important features of the workstation to function, including:

a) Only operating drive motors 74 when a user's presence is detected (a safety feature);

b) Driving drive motors 74 to allow worktop 12 to move quickly up and down as a greeting (and also as a reminder to use workstation 10) when a user first arrives at the workstation, as detected by the sensors and perhaps in the morning; and c) To only calculate stand-time by the user when the user is actually present at the workstation, again as detected by the user.

Applicants have further contemplated that it would be beneficial for the workstation of this invention to not only 'know" when a person is present at the workstation, but more particularly, to either know if and when the "primary user" of the workstation is present at the workstation, or if not the primary user, to know the identity of whoever is using the particular workstation, perhaps a coworker, the user's boss, or other.

If local sensors cannot accurately detect the presence of the primary user, the workstation will assume that any detected person using the primary user's workstation is in fact the primary user and may respond by switching from standby mode to an operational mode. Such a false detection could lead to inaccurate collected data and would likely result in the workstation poorly meeting the true needs of the primary user. Also, the collected data will yield inaccurate and unreliable trends and statistics of the assumed primary user.

To overcome this potential problem and according to another embodiment of the invention, workstation 10, includes any combination of several sensors, including the above-described mat 36, ultrasonic range finder 66, and thermopile 68 and uses them to create and store an "electronic signature" of a select primary user (the person who regularly uses the particular workstation). This "smart sensing" arrangement allows the present system to accurately determine when a particular person is present at the workstation at any given time and who that person is (or, depending on how the system is set up, to determine who that person is not). For example, a primary user may have habits that can be repeatedly detected by the system, electronically stored within electronic memory, electronically compared and used to ID the current user, or at least used to determine when the person present at the workstation has a signature that is stored within the system. Such habits may include a unique standing pattern (e.g., the user may consistently stand between 2 and 4 inches from the edge of the worktop 12), having a strong and unique body heat pattern that is located at a specific region of the field of view of the sensors, the type of music that the user plays, the user's voice, any tapping the user does against the worktop, the selected height of the worktop 12, or the user's time schedule or known routine. According to one of the embodiments, one of the sensors is a Bluetooth® (or similar) controlled sensor that is able to accurate detect and read an RFID located on the user's body, such as embedded within the user's building ID badge.

If other workers (non-primary users) in the office stop by to visit the primary user's workstation when the primary user is not at the workstation, the sensor array located within and adjacent to the workstation will detect electronic parameters that are particular to the visitor and will store this information along with the time of the visit, the duration of the visit, the visitor's name (if determined by the workstation), the date, and perhaps how much the visitor weighs. By providing "smart sensing", the workstation according to this embodiment of the invention can detect and generate a visitor's and user's log for review by the primary user upon his or her return. Additionally, the workstation can automatically activate a flash-memory voice-recorder when requested to do so by any of the visitors so that the visitor may leave a voice message for the primary user.

By using "smart sensing" with each workstation located within a work environment, the smart sensing system, according to this embodiment of the invention may collect all sensed information and may use this information to help track workers efficiency and attendance. It is not Applicant's desire to create a sensing system that will collect information on the workers of a company to benefit "Big Brother" or to be used against any particular worker, but instead to use this collected information to provide general statistical data regarding a group of workers, such as, what is the average "desk-occupancy" of the workers in the engineering department.

Such "smart sensing" of the present workstation can additionally be used for the following:

1. The collected information can be used to determine which employees are in attendance at a company on any given day, such as engineers, CAD people, sourcing, designers, etc.) to help management manage daily resources and work distribution.

2. The collected information can be used to automatically keep track of billing by determining which workers are working at their desk and for how long each day to improve efficiency and billing accuracy.

3. The collected information can be used to better manage telecommuting, sick-leave, vacations, lunch hours and even smoking breaks.

4. The collected information can be used to learn trends and routines and help the primary user plan ahead for the day's events. For example, as lunchtime on Wed approaches, the system can provide the primary user a list of menus or other information of local restaurants and can even tap into Internet resources to provide wait-time information. Other useful information includes traffic reports or train schedules or train delays, and even weather. This information can be automatically downloaded to the primary user's smart phone, if desired.

5. The collected information can also be used to measure the body temperature of the primary user in an effort to detect the onset of a potential illness, fever, or stress levels. The workstation can use this information to change the sit-stand schedule or perhaps recommend that the user take a break, a vacation, or sick day. Other sensors can be used to measure the heart rate, or other vitals of the primary user.

6. The collected information can be used to power down any combination or all electrical devices connected to or otherwise associated with the user's workstation. For example, if the local sensors connected to the workstation detect that the primary user is no longer at the workstation, the system can turn off the desk lamp located on the worktop and put the computer into a sleep mode. Additionally, the system can turn on various and appropriate announcements on the phone, as predetermined by the user.

According to another embodiment of the disclosure, the drive motors used to raise and lower worktop 12 can be impulse drive so worktop 12 raises or lowers a very small amount (as described in greater detail above), such as a couple of mm. According to this embodiment, this quick movement can be used to help convey the passage of time, such as providing a little "dip" movement every hour, or to alert the user that a scheduled even is soon approaching.

Figure 13:
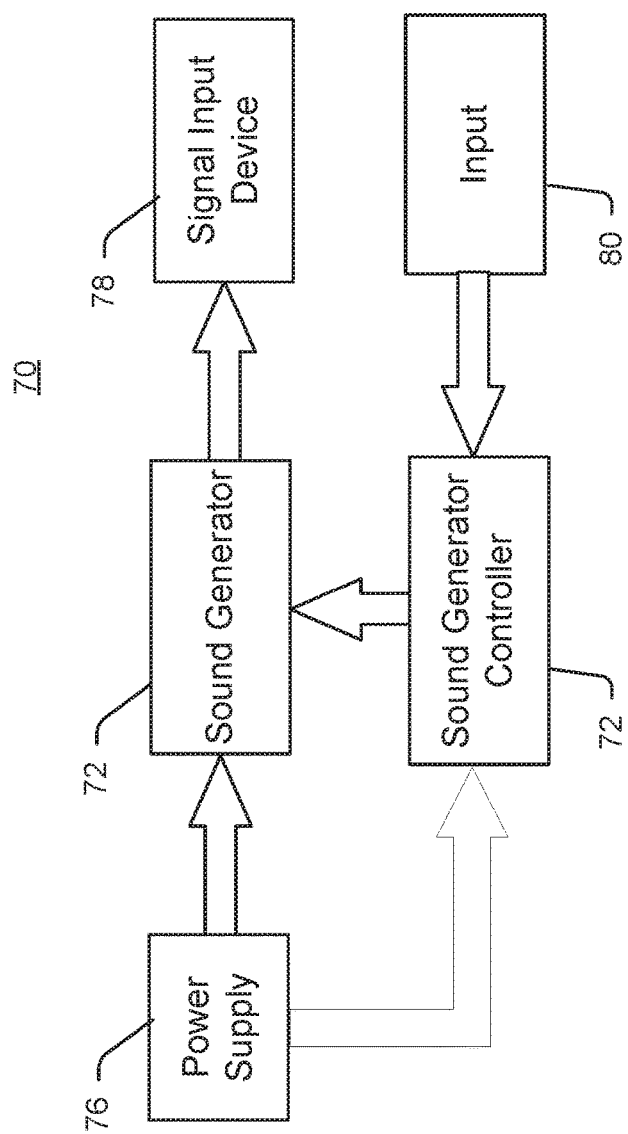
FIG. 13 is a block diagram illustrating a sound management system, according to one embodiment of the present disclosure.

Referring to FIG. 13 and according to another embodiment of this disclosure, a sound-management system 70 is schematically illustrated and includes sound generator 72, power supply 74, sound controller 76, and sound output device 78. Sound output device 78 may be any of several devices, including open speakers, headphones, bone-conduction transducers, vibration generators and any other device that is able to convert electrical signal into a corresponding sound wave that can be heard or felt by a user in a particular environment. Applicants consider use of headphones to be a preferred sound output device for this invention.

Sound generator 72 produces sound, either structured, such as music, or random noise, such as "pink noise." The sound can either be pre-recorded and provided as sound or music files (stored on an appropriate memory), or can be a circuit-based device that includes electrical components that are arranged to generate electronic "noise" and other electrical components that provide various filters for altering the generated noise prior to outputting the signal to a sound output device 78. As is well known by those of ordinary skill in the art, depending on the specifics of the filtering circuitry various types of noise can be created, such as "white", "brown", "grey", "violet", "blue", and "pink." Each type of "noise" has different sound characteristics, as described below:

White: White noise is a signal made of uncorrelated samples, such as the numbers produced by a random generator. When such randomness occurs, the signal will contain all frequencies in equal proportion and its spectrum will turn flat. Most white noise generators use uniformly distributed random numbers because they are easy to generate. Some more expensive generators rely on a Gaussian distribution, as it represents a better approximation of many real-world random processes. To the human auditory system, white noise sounds much brighter than what one would expect from a "flat" spectrum. This is because human hearing senses frequencies on a logarithmic scale (the octaves) rather than a linear scale. On the logarithmic scale, white noise packs more energy in the higher octaves, hence its bright sound. White noise sounds similar to TV channel static or "snow."

Brown: "Brown" noise (also called "red" noise) is a random signal that has been filtered in order to generate a lot of energy at low frequencies. Its power density is inversely proportional to $f2$ and decreases by 6 dB per octave. Brown noise produces a much warmer tone than white noise (0 dB/oct) or pink noise (−3 dB/oct). Brown noise packs a lot of energy in the lowest frequencies. Each octave packs as much energy as the two octaves above it. For example, the 20 Hz bandwidth between 20 Hz and 40 Hz (one octave) will contain the same sound power as the 120 Hz bandwidth between 40 Hz and 160 Hz (the next two octaves). Brown noise is very relaxing to listen to—sounding similar to powerful ocean waves.

Grey: Although white noise plays equally loudly at all frequencies, it fails in giving the listener such a perception, because of psychoacoustics. Grey noise is created by passing white noise through a filter to invert the frequency sensitivity curve. As a result, grey noise sounds relatively flat—a bit like muffled white noise.

Violet: Violet noise is known as differentiated white noise, due to its being the result of the differentiation of a white noise signal. Violet noise generates very high energies at higher frequencies. Its power density is proportional to $f2$ and increases by 6 dB per octave. Violet noise is also referred to as purple noise. This noise is sharp and not very soothing to listen to unless the volume is very low.

Blue: Blue noise is a random signal that has been filtered in order to generate higher energies at higher frequencies. Its power density is proportional to the frequency and increases by 3 dB per octave.

Blue noise is also referred as azure noise and packs a lot of energy in the highest frequencies: each octave packs as much energy as the two octaves below it. Blue noise sounds very sharp and is not very soothing to listening to.

Pink: Pink noise has a spectral envelope that is not flat within a frequency but rolls off at higher frequencies. Pink noise has a greater relative proportion of low frequency energy than white noise and sounds less "hissy."

To the human auditory system—which processes frequencies logarithmically—pink noise is supposed to sound even across all frequencies, and therefore best approximates the average spectral distribution of music. In practice however, it turns out that human ears are more sensitive to certain frequencies, such as in the 2-4 kHz range. Pink noise, despite its even frequency distribution in the logarithmic frequency scale, is perceived as "colored", with a prominent peak perceived around 3 kHz.

Pink noise is a random signal, filtered to have equal energy per octave. In order to keep the energy constant over the octaves, the spectral density is required to decrease as the frequency (f) increases ("1/f noise"). In terms of decibels, this decrease corresponds to 3 dB per octave on the magnitude spectrum.

A basic electronic noise-generating circuit is understood by those of ordinary skill in the art of electronics and the circuit details of such a circuit are generally beyond the scope of this invention. Of course, as is understood by those skilled in the art, that different filter components will create different types of "noise", including the several color types noise types listed above.

Referring again to FIG. 13, and according to one embodiment of the present invention, sound generator controller 76 is connected to sound generator 72 and includes appropriate circuitry that causes sound generator 72 to either:

A) change the type of sound being outputted to sound output device 78; and/or B) change a sound characteristic of the sound being outputted to sound output device 78, in response to receipt of input signal 80.

The term "sound characteristic", includes volume or loudness, timbre, harmonics, rhythm, and pitch. The term "type of sound" refers to sound that is either random noise or structured sound, such as music. An example of "changing the type of sound" can be changing the outputted noise from pink to grey, or white to blue, etc., again in response to receipt of input signal 80. Another example of "changing the type of sound" can be simply changing the song or the genre of music being played, in response to receipt of input signal 80.

As is well understood, all circuitry described herein will be powered by an appropriate power supply 74, which is electrically connected to the circuitry, as required.

In operation, sound management system 70 can be incorporated into an environment for the purpose of managing nearby sounds through masking techniques. As mentioned above, the environment can be very small and controlled, such as a user wearing headphones, larger, such as a desk, or huge, such as a large room including several workers and desks. For the purpose of explanation however, Applicants are considering the environment to be small and controlled—headphones.

Headphones 78 are connected to sound generator 72, which is, in turn connected to sound generator controller 76. As a user works, he or she wears the headphones while a predetermined electronic sound is played through the headphones. The user will enjoy "sound protection" within the surrounding environment (outside the headphone area) because the electronic noise playing in his or her ears will effectively mask any outside noises from reaching his or her ears. In this arrangement, people located nearby the worker can carry on a conversation without the worker hearing them.

According to a first embodiment of the present invention, the user (the person wearing the headphones) can create an input signal 80 that can, in turn, cause sound generator controller 76 to cause sound generator 72 to change the type of electronic sound being played in the headphones, or a sound characteristic of the sound being played in the headphones. The input signal can be created manually (for example, by simply pressing a switch), or automatically, in response to detection of a change of a preset condition. Examples of preset conditions include:

a) Detection of a change of software program being used by the worker;

b) At preset times during the day (such as every hour);

c) At random times throughout the day;

d) Upon detection of changes of the level of ambient noise measured in the room (such as by a microphone);

e) Detection of the user changing their position (such as sitting down from standing, or standing up from sitting);

f) Detection of a change of height of a sit/stand desk being used by the user;

g) Detection of changes of energy levels of the user (e.g., change in measured heart rate); and h) Changes in measured ambient temperature readings.

By way of example, as a user "surfs the web", a certain type of sound and sound characteristic will play in the user's headphones. If the user then starts to read an article, for example, or review spreadsheets, the present sound management system 70, according to the present invention will automatically detect this change in type of work and will change either the type of sound being played on the headphones, or change some sound characteristic. The present sound management system 70 can use a simple algorithm to compare the type of programs that are being used by the user on their computer with a prescribed list to help select an appropriate (or predetermined) type of sound and an appropriate sound characteristic for the particular detected work or task.

In some instances, sound management system 70 can predict what type of work the user is doing while surfing the Internet by detecting level of activity. For example, the present system can measure mouse movement to decide the type of music the user would benefit from. If the user is actively using his or her mouse (or other input device) and actively clicking on links as they surf, then one type of music could be playing in the user's headphones, for example, an upbeat, high-energy type of music. However, if it is later determined that the mouse-use has stopped (or less clicks per minute are detected), then sound management system 70 may decide that it is likely the user is now reading or reviewing a selected article or webpage and may then change the type of music to benefit that particular activity, such as changing the music to something more soothing so the user can better concentrate on the article or webpage.

By way of another example, when the present sound management system 70 is used in combination with a motorized sitstand desk, such as one commercially available by Stirworks, Inc, of Pasadena, Calif., USA (http://www.Stirworks.com), accelerometers or other appropriate sensors located in the desk can be used to predict the type of work the user is doing. Perhaps the present system is programmed (following the setup by the user) to change the music from soothing when the desk is at the "sit" height to high-energy when the desk moves to the "stand' height. Also, vertical displacement frequency of desk movement and desk-height duration at certain heights can be used to predict the level of stress or fatigue of the user and can thereby select the best type of sound and sound characteristic to benefit the user and mitigate the effects of the stress and fatigue.

Other sensors that can be used as input signals for controlling the selected type and characteristic of the sound, according to this invention, include the user's computer (as it's being used), any electronic wearable device, such as a health-monitoring device (for measuring a user's blood pressure, body temperature and heart-rate and level of accumulative and recent activity, a microphone, a thermal sensor, a camera, a touch screen input device, and a computer mouse. These sensors, used alone or in combination can detect levels of stress, fatigue and activity which in turn, can be used to control the type of sound and its characteristic. Sound management system 70 can use this collected information to tune the music, for example, or the type of noise to "match" the measured type and level of work or stress. If the work is determined to be something like Internet surfing, or sketching, etc., the music selected can be active (e.g., rock) and its characteristic can increase in tempo and/or volume.

If the work is determined to be more stressful, perhaps indicated by a measured higher heart-rate of the user, then the music type could be more relaxing, such as jazz or classical, or the type of sound could be changed to an appropriate soothing background noise, such as quiet brown noise.

If sound management system 70 determines or predicts that the user is reading or doing an activity that requires focus and comprehension, then the system will automatically decrease the volume and tempo and select music (or other) that includes no words or lyrics.

The present system can also use microphones (not shown) to measure external noise and other potential audible distractions located within ear-shot of the user and then moderate the overall volume and type of sounds played to the user in an effort to mask or at least mitigate the level of distraction that these nearby sounds may have on the user.

The sounds that are sent to the user's ears may be sent through headphones that the user wears, or may be sent via nearby speakers, including speakers that are incorporated into the construction of the desk itself (i.e., embedded).

When the present sound-management system 70 is used in combination with a work-desk, the system can "listen" to the local environment and use the measured information to adjust the type of white noise or music played to the user's ears and the characteristics of that noise or music. As the level of measured audible distractions in the environment increase, the amplitude of the noise or the music sent to the user's ears likewise increases, but only up to a point. If the "corrective" noise or music sent the user's ears becomes too loud, at some point, this corrective sound itself will become a distraction to the user.

As described above, various "colors" of noise are predetermined and controlled spectrums of sound. According to another embodiment of the present invention, sound management system 70 can create its own specific noise with specific spectrum characteristics based on the tones the system detects around the user and the user's desk. For example, if the present system detects a person nearby speaking in a low voice, the system can introduce a type of music or sets of tones (or other generated custom noise) that are in a similar tonal range as the nearby distracting voice. By matching the audible distraction with similar tones (preferably of noise or sounds without words or lyrics), the distracting conversion will become effectively masked and the user's brain will not bother to try to understand it, thereby keeping the user focused and unbothered. This allows the system to abate or mitigate the distracting sounds and lower the Articulation Index without having to generate a full spectrum of noise.

Similarly, if a high squeaking noise is detected by the system of the present invention, a noise that is generated perhaps from a nearby door opening and closing, the generated corrective noise produced by the present system for the user's ears could be instantly shifted in that direction on the sound spectrum, functioning similar to a conventional active noise-cancellation system. By focusing on correcting or balancing the detected and measured frequency spectrum signature of the nearby distraction, the distracting noise can effectively be mitigated without a noticeable increase in amplitude in the user's ears.

System can be moved from random noise (white, pink, etc) to music using local controls (touch screen, etc).

If the user is wearing a device that measures levels of energy expenditure (such as a Fitbit® device, which is manufactured by Fitbit, Inc. of San Francisco, Calif., USA), the present sound management system will be able to "read" the Fitbit® device and change the type of music in response to the data read. For example, if the user recently completed a lot of exercise, the present sound management system 70 will change the music being played in the user's headphones to perhaps something more upbeat to make sure that the user doesn't fall asleep.

The user may have control of the present sound-management system to override any music or noise that the system automatically creates, and select their own from a list of selections, both of music and different "colored" noises. The user can also adjust other characteristics of the generated sounds, as desired. The user can make these adjustments using an appropriate controlling device, such as a computer with a touch-screen, or perhaps a tablet, or smart phone. Sound management system 70 is also able to automatically mix in music with any of the colored noises so that if a user is listening to white noise for an hour or so, for example, the present system can automatically and preferably slowly mix in the sounds of recognizable music. This will allow the user to avoid getting sick of listening to random noise for long periods of time. After a prescribed period of time, the system can slowly blend other noise patterns to create an effective sound that helps the user to abate or mitigate nearby audible distractions. Sound management system 70 allows the user a little variety in the sounds being played.

According to another embodiment of the invention, sound management system 70 includes a wireless connection (or a direct wired connection) to a user's computer or smart phone and is able to play specific sounds, such as music, in response to information on the user's calendar. For example, if it is shown on the user's calendar that the user has some free time between 3:00 and 3:30, the present system can play some upbeat music or some of the user's favorite songs. If the user will be going to a concert later that evening to see a particular band, the system will be able to obtain details of the band and the time an event of the concert from the user's smart phone, for example and then use this information to play select songs by that band . . . to get the user in the right "mood" for the concert later that night. Similarly, the user may be traveling to a country soon, such as Mexico, and the present system will learn this from the connected smart phone or computer and perhaps play Mexican music and sounds at different moments leading up to the day of travel. The system will learn what music and specific songs and sounds that the user likes (by keeping track of the frequency of which certain songs and sounds are played) and will play one or more of these preferred songs or sounds for the user at a specific time during the day and week. The present system will remember that the user loves to hear a particular song on Fridays at a given time and will play that song when the internal clock indicates that exact time and day.

The present system can detect which application the user is using on his or her computer or smart phone and could play sounds or music that are specific to particular detected applications. For example, when the user logs into Facebook®, the present system will detect this and will start playing a specific set of music tracks, perhaps "fun" and upbeat music, since the system will assume that the user is taking a break from work to enjoy reading their "wall."

Also, the present system can read inputs or profile data or favorite song lists generated by music programs, including Spotify® and Pandora®, and use this information and biometric data to help select new sounds and music to be played for the user at different times.

The present system is adapted to absorb any reachable information that provides context, such as where the user has been, what the user has been doing, and perhaps where the user will be going in the future. The system can then use this information to help select the types of music and sounds appropriate for the user, given other information, such as time of day, and other environment and biological conditions, described above.

The present system can use immediate user feedback to help learn what the user likes and dislikes and use this information to help plan future sounds and music. For example, if the system selects a song and the user turns the music off or skips the song, or turns the music down, then the system will know that it selected a song or sound that you likely do not like. It will then remove this particular song from the primary song list and move it to a secondary list. At random times, the system can play the song again from the secondary list and see how the user responds. If the response is still negative, the system will move the song to the "no-play" folder, where it will remain until the user moves it back to the primary list.

According to another feature of the present invention, in a work environment where there are several desks, each using the present sound management system 70, the system can work with all the users by allowing each to effectively vote on the sound being played, either a random noise or a particular song, and cause the system to accommodate the played sounds and music based on the consensus vote. The voting could be inputted by touch screen connected to a smart phone or computer that his connected to the system 70 by WIFI or other appropriate connection.

Also, each desk could include a microphone, as mentioned above, wherein all microphones would be connected to the sound management system 70. According to this feature, the microphones could be used to collect distracting sounds (sound levels at different frequencies). This information could be used to determine which areas within a work environment are quiet and which are loud. Workers could then move about within the environment to find the best work zone based on this information. This information would be sensitive to time and would be dynamic but it is likely that trends could be formed to establish zones within the work environment that offer average quiet and average moderate sounds within a range of volume and frequency that is considered distracting.

Chair Movement:

By way of overview, applicants have realized that it is desirable for an office chair to allow its user freedom of movement with little to no effort, while providing the user required support for health and, of course sufficient comfort to encourage continued use. There are several embodiments to this disclosure that improve upon the prior art and offer unique features to the rolling-type office chair.

The embodiments detailed below are preferably directed to ergonomic type chairs, typically used in offices and usually including wheels. Applicants have determined from research that a seated user should move regularly while seated to encourage a healthy disposition. As part of these regular movements, the user should:

a) Reduce lumbar strain by reclining in the chair;
b) Sitting upright with lowered thighs (provided by tilting the front edge of the seat down);
c) Sitting upright with raised thighs; and
d) Standing at their desk.

The user should ideally cycle through the above positions every 20 to 30 minutes to assist in preventing lower back pain and encourage a healthier disposition. When the user reclines, the spine is allowed to more easily return to a more normal curvature. This reduces or removes pressure on the discs of the user's vertebrae, which greatly reduces the chance of lower back pain. Of course, the user may not be able to as effectively work while fully reclined so other positions are necessary. Sitting upright with lowered thighs also increases the thigh-to-torso angle, which again helps the spine more easily attain a more normal curvature, which like reclining reduces disc pressure, but not as much as when fully reclined. Sitting upright with raised thighs may provide the most upright support for the user to work at a desk, but this position should not be used exclusively due to higher strain on discs. Finally, standing at regular and controlled intervals improves one's health.

Figure 14:
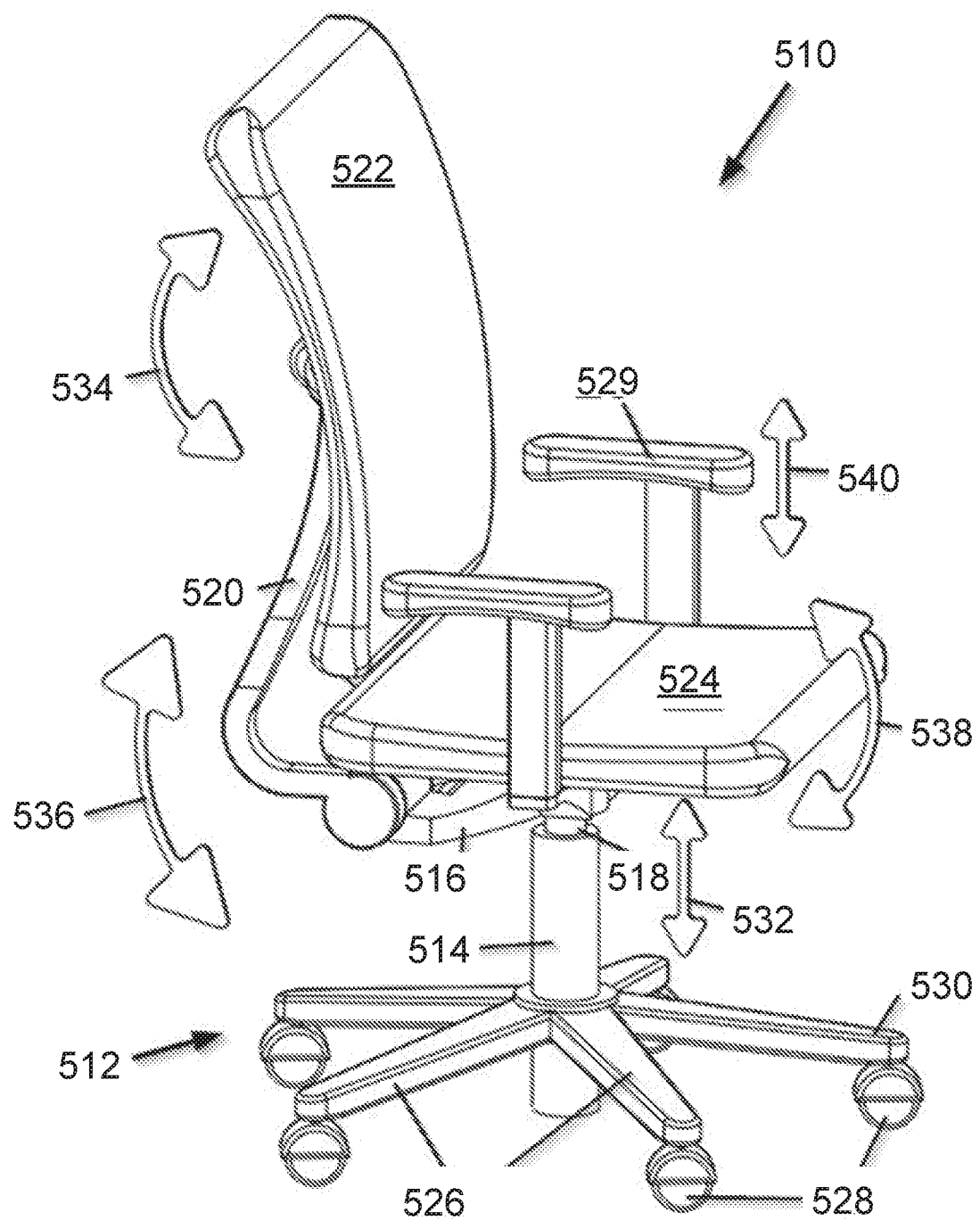
FIG. 14 is a front perspective view of an exemplary ergonomic chair, showing various components and movement arrows, in accordance with the present disclosure.

Referring to FIG. 14, and according to a first embodiment of the present disclosure, a chair 510 is provided having a dolly structure 512, from which a post 514 upwardly extends. A yoke assembly 516 includes a vertically disposed piston 518 which is slidably secured to post 514, as understood by those of skill in the art. A back support assembly 520 is pivotally secured to a portion of yoke assembly 516. A back cushion 522 is pivotally secured to a portion of back support assembly 520. A seat cushion 524 is pivotally secured to a portion of yoke assembly 516. As is well known by those skilled in the art, dolly structure 512 includes 5 radially disposed legs 526, each having a caster wheel 528 pivotally attached to a remote end 530. A left and right side armrest 529 are mounted to yoke assembly 516 by a telescoping connection and are selectively vertically displaceable.

According to the disclosure, post 514 is slidably vertically displaceable (as shown by arrow 532 in FIG. 14) between a predetermined low position and a predetermined high position and is used as in conventional ergonomic chairs to raise and lower seat cushion 524 and all other connected parts, as desired by the user. According to the disclosure, post 514 is selectively movable to any point between low and high position using an electrically powered drive, such as an appropriate high-torque motor (not shown) or a magnetic linear drive, a digital high-torque stepper motor, and any required gearing or torque multiplier, as required to provide sufficient force to raise and lower the expected load safely and efficiently.

Figure 15:
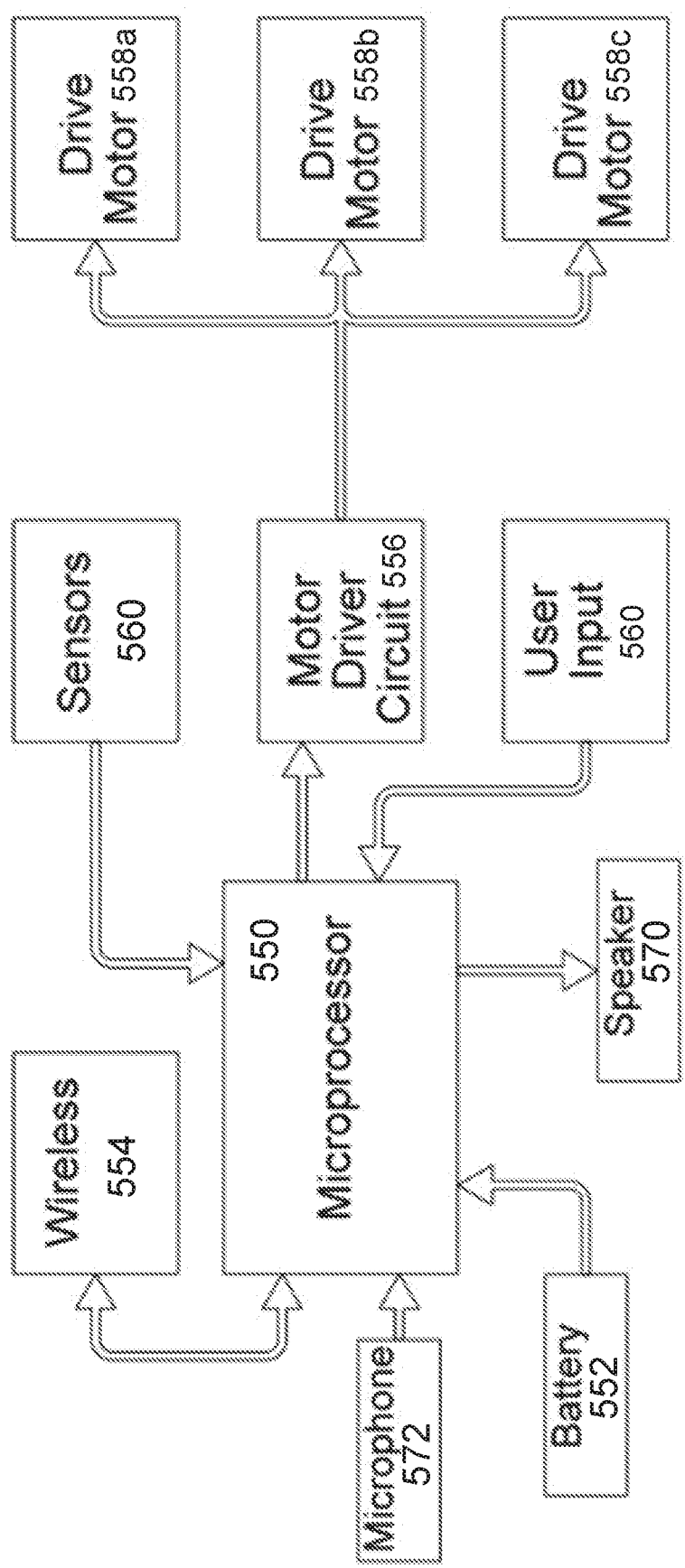
FIG. 15 is an operational schematic of the control system of the chair of FIG. 14, in accordance with the present disclosure.
Figure 16:
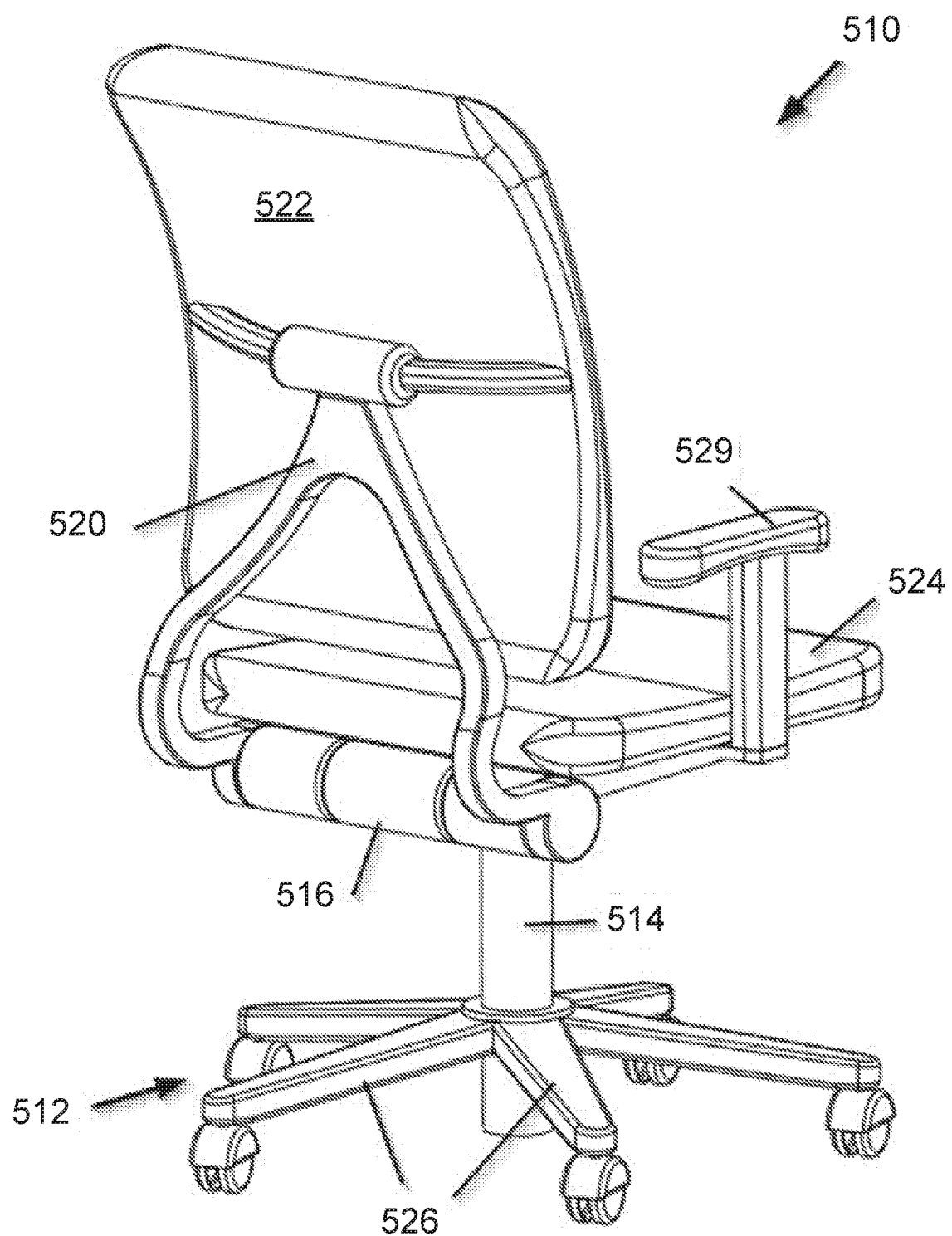
FIG. 16 is a rear perspective view of the exemplary ergonomic chair, showing various components and movement arrows, in accordance with the present disclosure.

An important aspect of this disclosure is that electrically powered motor drives, not shown in FIG. 14, but referred to in FIG. 15 as "558a, 558b, 558c, such as high-torque motors, servo motors with optical encoder feedback, electromagnetic linear drives, screw jack actuators or rotary actuators with hall sensor position feedback, a digital high-torque stepper motor or other such devices are used to selectively power all linear, tilting, and pivotal movements used throughout chair 510, including pivotal movement of back support assembly 520, indicated in FIG. 14 by arrow 534, pivotal movement of back cushion 522, indicated by arrow 536 in FIG. 14, tilting of lower seat cushion 524, indicated in FIG. 14 by arrow 538, lumbar support movement of back cushion 522, not shown by an arrow, and vertical displacement of either left or right side armrest 529, indicated by a single arrow 540, in FIG. 14.

Referring to FIG. 15, a schematic shows controller components used in accordance with the present disclosure, including a microprocessor 550, a battery 552, wireless communication 554, a motor driver circuit 556, drive motors 558a, 558b, 558c sensors 560 and user input 562. Microprocessor 550 is electrically connected to wireless communication 554, motor drive circuit 556, sensors 560 and user input 562. Battery 552 is shown connected to microprocessor 550 in FIG. 15 to provide power to that component, but it should be understood that battery 552 is effectively electrically connected to and powers all components, as necessary, and as understood by those skilled in the art.

Wireless communication 554 may be any type, such as Wi-Fi_33, or Bluetooth® and is used to communicate information between chair 510 and a remote location. According to one aspect of this embodiment of the disclosure, chair position type and duration information (called "use-information") over a period of time can be collected, stored in onboard memory (not shown) and transmitted (following a schedule) to a remote location for review and storage. This use information will help determine how well the user is using his or her chair, establishing a "use-history profile." This information could be used, for example to ensure that the user is following a position-variation schedule with the highest health benefits and comfort. If not, a particular user could be sent encouragements, reminders, and instructions regarding how to properly set up and operate their chair. Wireless communication 554 can also be used to connect (or pair) to other smart devices, such as a smart phone, or an adjacent sit/stand desk, such as the one sold by a company called Stirworks Inc, located in Pasadena, Calif. 915103. In doing so, the sit/stand desk controller could merge the sit-position variation schedule with the sit/stand desk position schedule. Currently, sit/stand desks, if they are "smart," do not know what the user is doing once they are in the sit mode. By linking the control system of the chair, according to this disclosure, to the control system of a smart desk, such as the Stir Kinetic Desk, a much larger picture of the posture and health habits of each user at a workplace may be realized and used to benefit both the user and the company. Applicants' herein incorporate by reference patent application, publication number: US20140096706 A1, published Apr. 10, 2014 with a priority filing of Oct. 10, 2010, entitled: "Height-Adjustable Support Surface and System for Encouraging Human Movement and Promoting Wellness" discloses such a smart sit/stand desk. The content of this publication is incorporated by reference in its entirety as if the entire patent publication content were reprinted in this current application.

As explained in greater detail below, microprocessor 550 controls motor driver circuit 556, which in turn controls the operation of any of several motors 558a, b, c, as required by either a preset position variation schedule, stored in on-board memory (not shown), or as instructed by user input controls 562 (buttons pressed by a user)—manual control mode.

According to this embodiment of the disclosure, sensors 560 are used to communicate accurate motor drive positional information to microprocessor 550. For example, should a drive motor 558a, b, c be activated to vertically displace armrests 529 from a first height to a desired second height, sensors 560 would "read" exact position information and would send a signal to microprocessor 550 when motor drive 558a, b, c reaches the desired height, in this example. Of course, a variety of different types of sensors could be used to provide such accurate positional information, a preferred type would be the use of actuator/motors with Hall Effect sensor, whose operation is well known by those skilled in the art and therefore not explained in any great detail here. Briefly, as the motor rotates, magnets mounted asymmetrically pass by a sensor and the incremental change in magnetic field is detected and occurrences counted. This information is then used to very accurately control the displacement of any component (such as an armrest 529) attached to the drive mechanism. Also, sensor 560 could include a safety shutoff that indicates that the mechanical movement has physically reached the end of its travel and any further movement could cause damage. Sensor 560 could also include switches and sensors that detect user presence on the chair and its components, such as a strategically positioned pressure switches could be used to detect not only that a user is simply sitting on seat cushion 524, but how the person is actually sitting. For example, sensor information could learn that the user is seated on seat cushion 524 and leaning forward since a sensor located in the front of the seat is reading a high-than normal pressure reading and that the back cushion 522 is not reading any pressure. The microprocessor 550 could compare the incoming sensor readings with known (and stored in memory, not shown) pressure ranges to determine how a particular "sensor signature" conveys a particular seated position. Alternatively, microprocessor 550 could learn "normal" positional information by reading sensor information as the user is instructed to sit in chair 510 as microprocessor 550 instructs motors 558 to cause the different displaceable components of chair 510 to change positions, which in turn would cause the seated user to follow the different seated positions (lean forward without touching the backrest, sit back and upright, sit back with a slight recline—then more recline until full recline is reached, and then stand up from the chair without using the armrests for support and then stand up using the armrests for support. During this initial set up procedure, sensors 560 would be carefully measuring pressure and microprocessor 550 would be recording the incoming pressure information at the different pressure sensors throughout the chair for each chair component position, as conveyed by the different motors.

According to another feature of the present disclosure, as shown in FIG. 15, microphone 572 and speaker 570 are electrically connected to microprocessor 550 in a manner that is well known by those skilled in the art. Microphone 572 can be used to pick up audible commands by the user or to pick up useful sounds in the environment, such as an audible control sound that allows chair 510 to be controlled remotely, using sounds at set frequencies. For example, microphone 572 could "hear" and discern the unique sound of a person typing and microprocessor 550 could use this information to hold off a scheduled reclining event until the user finishes typing (since the user may not be able or want to type while reclined).

The above feature of using pressure sensors 560 to establish a pressure-signature for the user at different chair orientations may function with or without the use of motors 558a, 558b, 558c. If motors are not used, the movable components of a chair would move similar to how these components move in conventional adjustable chairs. Such "manual" movements are made by the user activating levers to release mechanical locks and relying on the user's weight to force movement of a component against the action of a return spring. For example, should a user lean back in a chair, pressure sensors 560 would sense this (through a measured increase in pressure or force) and pressure sensors 560 could record these pressure or force readings when the user is at the reclined position.

It should be noted that pressure sensor is a term that includes any of a variety of sensors that measure applied force or pressure. A preferred type of pressure sensor is a load cell, or strain gauge. A strain-gauge is a transducer that is used to create an electrical signal whose magnitude is directly proportional to the force being measured. Some load cells operate by measuring a change in resistance when a load is applied and then generating an electric signal that is proportional to the applied load. Other types, such as Piezoelectric load cells work on the same principle of deformation as the strain gauge load cells, but a voltage output is generated by the basic piezoelectric material itself and the voltage output is proportional to the deformation of load cell and therefore also to the applied load. Regardless of the type of pressure or load sensor that is used in the chair, the sensor must be sensitive enough to reliably measure relatively slight changes in applied load, as a user sits in chair 510.

Regardless if each or certain chair component movements are motor driven or user driven, the inclusion of pressure sensors and a supporting control circuit in a chair, as shown in FIG. 15 and as described above could be used to:

a) Create a digital signature for each user;
b) Keep track of the weight of the user over time;
c) Keep track of the user's posture overtime;
d) Determine the user's chair-position history; and
e) Determine if the user is accurately following a assigned chair-position schedule;

By creating a digital signature for each user, the control circuit would be able to understand if the current user sitting in the chair has a pressure-sensor profile stored in memory. If so, then the chair components (when motor driven) could be automatically positioned to that user's preferred and desired chair positioning (overall height, backrest recline lock or level of spring bias, seat cushion tilt, armrest height, etc.). Also, once the user is known, his or her personal chair-position schedule could be uploaded and followed.

In use, and referring again to FIGS. 14 and 15, a purpose of the present chair 510 is to encourage the user of the chair to sit in a manner that prevents or discourages poor posture and related back pain, joint and circulatory problems and improves the health and posture of the user.

According to the preferred embodiment, as described above, chair 510 includes several displaceable components that can be moved to change position (within a range of movement).

Chair 510 preferably includes three modes of operation, automatic, semi-automatic and manual modes.

Automatic Mode:

In automatic mode, the displaceable components of chair 510 are automatically moved at prescribed times following a schedule to best maximize the health, posture, and comfort of the user. By way of example of this operational mode, the user could be seated in chair 510 for 510 minutes typing on the computer. An internal clock within microprocessor 550 would indicate that a scheduled chair position is due. According to the disclosure, the user would be notified that a change is imminent by causing the component that will be changing position to gently undulate back and forth, or up and down with at a gradual and non-disturbing, non-vibration, rate, such as within 5 and 30 cycles per minute and at an amplitude of less than 5 inches of movement, depending on the component (this undulation is called a "whisper-breath"). Illumination from LEDs (not shown) and/or sounds generated by speaker 570 could also be used to function as an alert to the user, but the gentle undulation type alert is preferred. If the position schedule requires that the user recline in their chair for 5 minutes, then the backrest would gently undulate for one or two full oscillations prior to the movement occurring, preferably between 5 and 20 seconds prior. The user will feel this undulation and understand that the chair's backrest is about to recline to a prescribed angle 30-40 degrees from vertical, for example. During the undulating alert and thereafter (including during and after the backrest pivots back to recline), the user can cancel the scheduled event in one of several ways, including:

a) By rotating the chair back and forth about the post;
b) By rolling the chair on the floor mat;
c) By bouncing one or both legs up and down (lifted up by flexing his or her foot of the floor);
d) By tapping either armrest once or twice (depending how the system is set up);
e) By leaning back against the backrest and then leaning forward;
f) By tapping on the smart sit/stand desk (assuming the desk and chair are paired to each other through wireless connection);
g) By tapping onto a remote device that has been paired to chair 510, such as the user's smart phone, or another such device; and
h) By announcing a "Cancel" command verbally to the chair directly, or through the user's smart phone.

In this automatic mode, microprocessor 550 will follow a prescribed chair movement schedule that will try to get the user of the chair to cycle through chair body movements including reclining back, sitting upright with lower thighs, sitting upright with a raised thighs and standing upright, every 20 to 30 minutes, as described above. If the user cancels a particular chair-movement event, microprocessor 550 will revise the schedule for that particular user to try to get the user to move more while seated. The schedule will mesh with the sit/stand schedule is a smart desk is also being used.

According to another feature of the disclosure, chair 510 is adaptive and will learn the user's behavior and physical ability and will continuously adjust the positioning schedule accordingly. For example, chair 510 will keep track how close the user keeps to the preferred positioning schedule. If the user tends to sit more often than stand, then the schedule will adjust to provide more sit time at first and then slowly decrease the permitted sit duration so that the user can adjust to the new positioning and hopefully adapt too. Also, chair 510 can keep track of the user's schedule and seating habits, such as encouraging more standing earlier in the morning and providing more sit upright time later in the day. It should be noted, however, that although there is some room to adjust the positioning schedule, it is still important that the user moves to different positions, as described above regularly and if he or she cannot, then a manager may have to intervene and provide the user with additional help and support, as necessary.

If a stepper motor 558*a, b, c*, is being used instead of smoother servo-type or rotary type motors, the resulting movement of each displaceable component will be a bit jerky, since a stepper motor is more like a rotary solenoid divided up into degrees of a rotation. The jerky motion would be noticeable and subtle, but not annoying. Applicants' contemplate using this subtle jerky motion as a non-annoying alert that a movement event is about to occur.

Semi-Automatic Mode:

In semi-automatic mode, a user operates user input 562 (buttons on an accessible control panel, not shown) to instruct microprocessor 550 to activate select motors 558*a-c* to move a select chair component, as desired by the user until the desired new position of the particular chair component is reached. For example, the user may decide to raise their armrest 529 and can push a button located on the armrest itself, or push a button located on a control panel (not shown), which will cause motor 558*a, b, c*, that is associated with that armrest displacement mechanism to activate and displace the armrest to the desired point in movement. Semi-auto mode means that the user initiates the move of a particular component, but electric motors 558*a-c* perform the actual movement. A contemplated variation here is that pressure sensors located at various locations within chair 510, such as in lower seat cushion 524 and backrest cushion 522 will sense sudden increased pressure one, two or three times in a row, evenly spaced apart which is caused by the user pushing back, for example, against the backrest. This movement acts as instructions for the control circuit to electrically drive the backrest back to a prescribed angle, or until the user instructs the control circuit to stop. Alternatively, the user can tap onto their Stir sit/stand smart desk controller which is embedded in the surface of the desktop.

This action (or similar tapping action sequence) will cause the control circuit of chair 510 to perform the action, receiving the instructions from the desk by wireless communication 554. Another variation of this would include an image of the desk chair 510 on either the display of the Stir sit/stand smart desk, their smart phone display, or on the user's laptop/PC computer display. The user can either tap the part (component) of the chair that they wish to displace or hold their finger on their touch screen, on the chair part they want to move. This action will translate into an instruction to move that part, sent to chair 510 and received by wireless communication 554. The user simple releases the touch screen to stop the movement. If the screen is not a touch screen, the user can use their mouse and cursor.

Manual Mode:

Manual mode means the user both initiates the move of a particular component of the chair and then makes the actual move of the component. In manual mode, the components are mechanically disengaged from the motor and motor drive mechanism. Manual mode is similar to the movement of conventional chairs. This mode is preferably used only when battery 552 depletes or another electrical failure occurs and the user requires movement before the battery is recharged, or the failure is corrected.

Monitors and Postural Rotation:

Applicants' acknowledge that if the user is using a computer with a display on their desktop, the viewing angle may be compromised by the movement of a part of chair 510, such as if the chair reclines. In this instance, the user could have difficulty viewing the display and work efficiency could decrease. Applicants' propose a display mount (not shown) that would be mounted on the user's desktop and would support the user's monitor. The display mount would include two motors (or drives) that would allow the display to move up or down (closer or farther away from the table top), and tilt up and down. The display mount, according to this disclosure, would be powered remotely and would include onboard controlling circuitry and wireless communication (or would be hard-wire communication connected to the smart desk). The display mount would be paired with the smart desk, is one is being used, and chair 510. In use, as chair 510 moves, the chair's control circuit would send instructions by way of wireless communication 554 to move the supported display up or down or tilt up or down in an effort to reposition the display to align with the newly repositioned user's head.

In a further enhancement the monitor mount can periodically adjust (ideally automatically or semi-automatically) when a user is sitting upright in their chair between straight ahead of user which is often comfortable for the neck but can cause eye strain, and a second lower tilted position which is more ideal for the eyes but can cause some neck strain. As noted it has been suggested by ergonomists that one's "next position in his or her best position" suggesting that there is not one single good position for a monitor.

In a further enhancement the monitor mount would adjust to result in the user looking slightly to the left and slightly to the right (ideally automatically or semi-automatically) to support periodic healthy position changes of the neck and spine. Additional actuators would be added to enable this motion.

Conference Room Application:

The above-described disclosures directed to Chair 510 can be applied to many different types of chairs, but a primary intended chair type is the office chair used at desks within an office setting. However, these chairs can also be used in a conference room setting wherein several chairs populate the perimeter of a large conference table. In this application, all the desks and chairs used in the entire office could be connected wirelessly to the company's server wherein all individual chair positioning and use information can be stored. Chair 510 can further include a simple reader (not shown), such as optical, magnetic, Bluetooth® or RFID, etc. This reader may be used to sense or otherwise read information, preferably automatically, from an employee's security card (or other ID type card), or phone when the user sits at any chair within the company, including the chairs positioned around the conference table. In use, once the employee sits in any of the chairs, the selected chair will automatically identify the user and the onboard control system will activate the various motors 558a-c of the chair to position all moveable chair components to align with the seated user's stored preferences. This approach may also be applied in other instances when many people use the same chair at different times such as in "desk sharing," which is also referred to as "hot-desking" in the furniture industry Using Chair Movement for Alerts:

According to yet another feature of the present disclosure, different motors 558a-c are selectively activated to move select chair components in preset movement patterns which could be single movement, slow or quick, or oscillatory and can repeat at spaced intervals. This allows chair 510, working with wireless connection to the company's server, the user's smart phone, the user's computer, the user's smart desk, or other similar devices to communicate upcoming or current events to the seated user in a non-disturbing manner. The user could assign (during setup) different types of chair component movements with specific types of event alerts. For example, microprocessor 550 could be instructed to activate the chair's seat cushion motor 558a-c in an up and down undulating movement with an amplitude of 2 inches peak-to-peak and a period of 4 seconds in response to an upcoming meeting, as listed in an appointment program operating on the user's smart phone, such as MS Outlook® provided by the Microsoft company of Redmond, Wash. 98052. The first movement could indicate a 15 minute reminder prior to the particular meeting. At 5 minutes, microprocessor 550 would interrogate sensors 560 and would learn, in this example, that the user is still seated, and would then confirm that the meeting appointment remains active. Microprocessor 550 would then move the same component up and down, but now at a quicker frequency, such as 2 second cycles and with an amplitude of just 1 inch and would increase the duration for 5 seconds. This action provides the user of an alert of higher urgency. The user may cancel the alert sequence for the particular appointment either on his or her smart phone or by moving in a preset manner in the chair within a preset time limit after the start of the alert, such as by rotating the chair about post 514 clockwise and counterclockwise twice within 510 seconds after the beginning of the alert sequence. Sensors 560 would detect this rotation and microprocessor 550 would cancel further alerts for this scheduled appointment.

Other chair components can be moved in a similar manner to remind the user of other events.

An important feature of the present disclosure is that chair 510 is "smart" and connected to the user's smart devices. The chair according to the disclosure effectively becomes a giant computer mouse in that the user can move different components of chair 510 to perform specific computer related tasks, such as cancelling a meeting alert. The chair can also receive information from other smart devices and the Internet and the company's server to understand the seated user, his or her profile, preferences, and schedule etc.

and respond automatically if necessary, to better the user's health and workplace efficiency.

Figure 18:
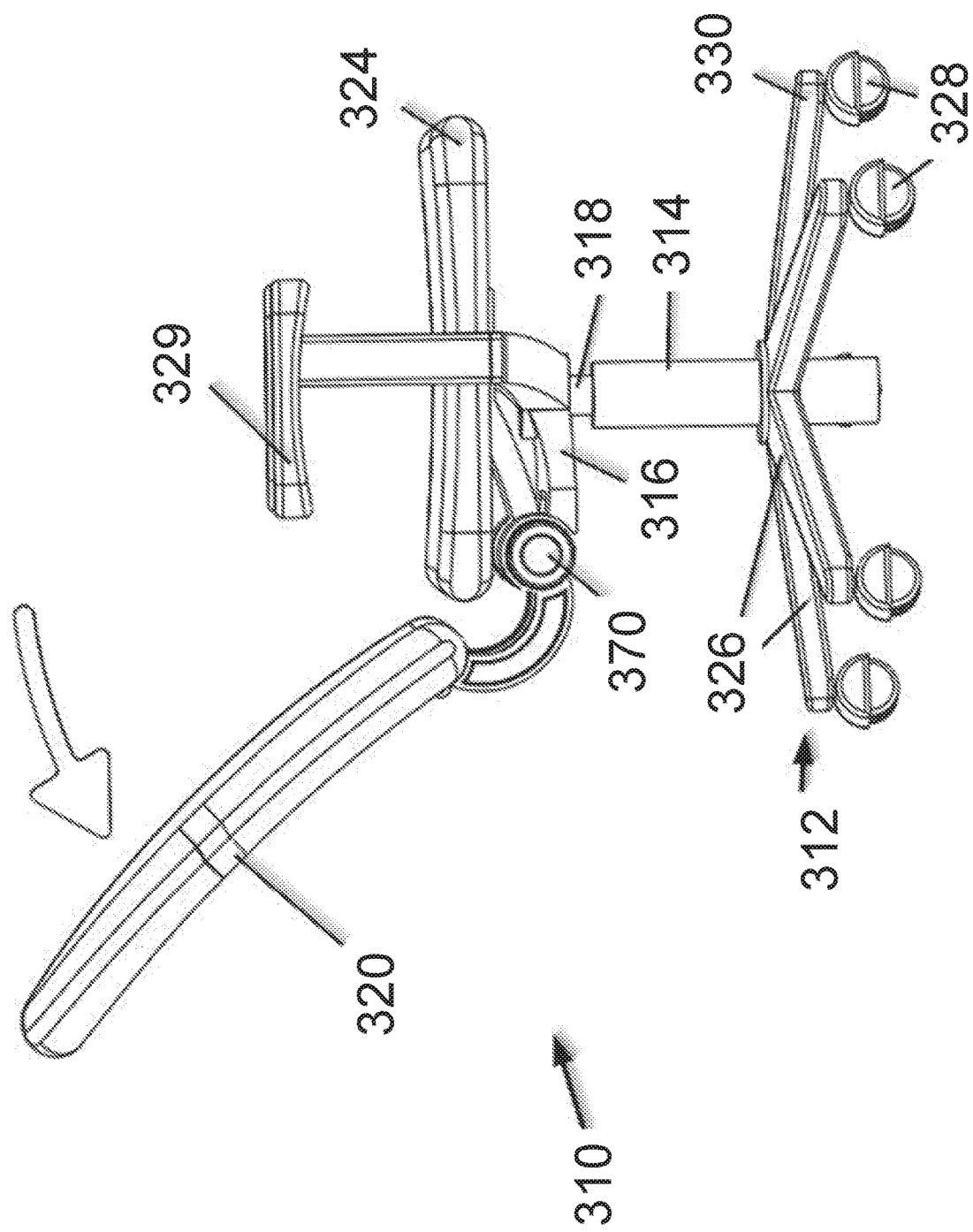
FIG. 18 is a side elevation view of the seating structure of FIG. 17, showing the backrest reclined, in accordance with another embodiment of the disclosure.
Figure 19:
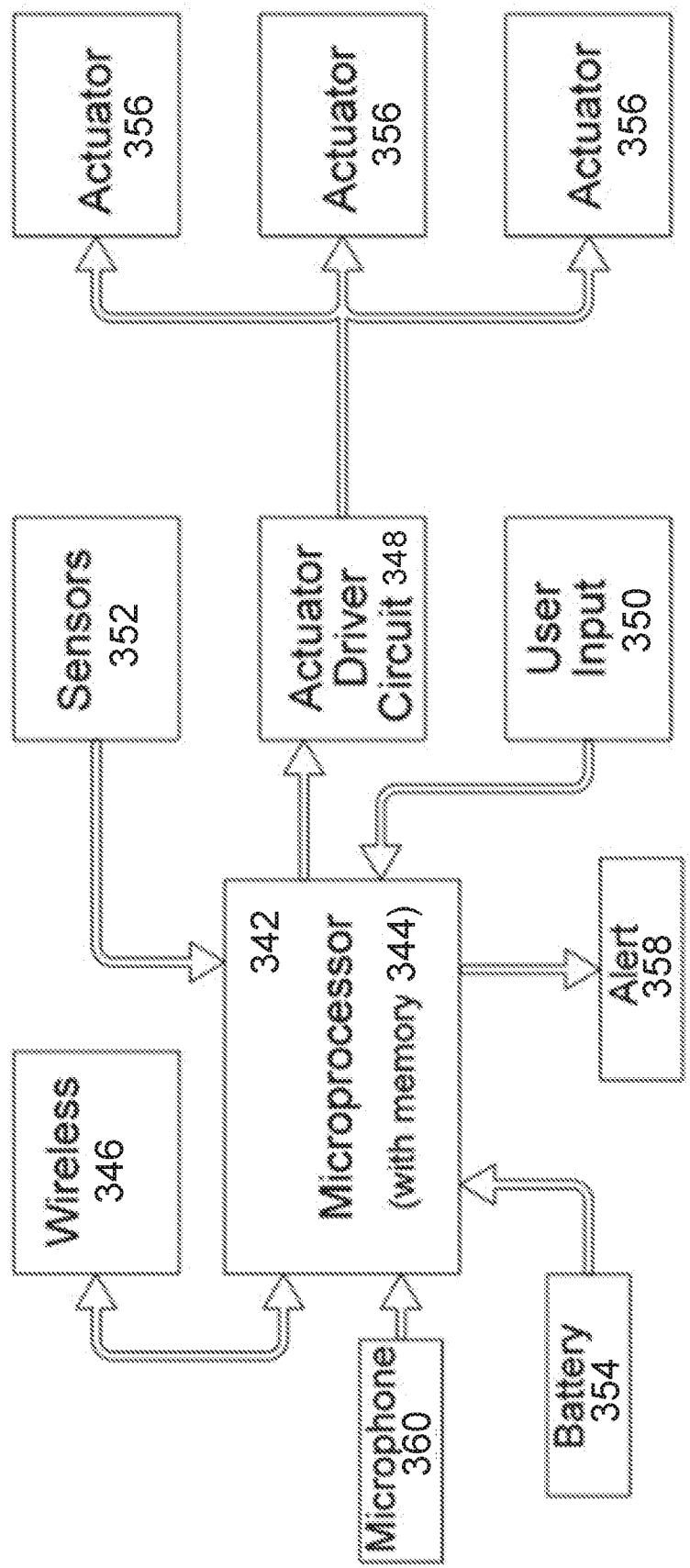
FIG. 19 is a schematic showing various electrical components, in accordance with the disclosure.

Referring to FIGS. 18 and 19, and according to a first embodiment of the present disclosure, a seating structure 310 is provided having a dolly structure 12, from which a post 314 upwardly extends. A yoke assembly 316 includes a vertically disposed piston 318 which is slidably secured to post 14, as understood by those of skill in the art. A backrest 320 is pivotally secured to a portion of yoke assembly 16. A seat portion 324 is pivotally secured to a portion of yoke assembly 16. As is well known by those skilled in the art, dolly structure 312 includes 5 radially disposed legs 26, each having a caster wheel 328 pivotally attached to a remote end 30. A left and right side armrest 329 are mounted to yoke assembly 316 by a telescoping connection and are selectively vertically displaceable.

As shown in FIG. 19, and according to the disclosure, seating structure 310 further includes a microprocessor 42, memory 44, wireless communication 346 and an actuator driver circuit 48, collectively called a control circuit 40. Seating structure 310 further includes user input controls 350 (buttons, knobs, etc.), positioning sensors 52, a battery 354 and actuators 356. All these components are mounted throughout the seating structure and are electrically connected to microprocessor 342.

As is understood by those skilled in the art, backrest 320 is pivotally secured to yoke assembly 316 and may pivot back (or recline) between a generally straight upright position (no recline—about 90° with respect to seat portion) and a predetermined full recline position, defining an angle of about 130° with respect to the seat portion 24. As with conventional seating structures of the type that include a reclining backrest, backrest 320 is biased to the upright no-recline position by a spring-bias, which may be provided by compression, tension, torsion, or axial mechanical springs, a pneumatic piston arrangement, or another mechanism, as understood by those skilled in the art.

In conventional adjustable seating structures, the magnitude of this recline-spring-bias may be controlled by a lever (not shown). Also, hard stop points may be selected using knob 70 that prevent backrest 320 from reclining past a fixed preset angle. This allows the user to decide the maximum degree of recline the backrest will move, when he or she leans back in the chair. As mentioned above, often the user keeps the preset recline angle to a no recline angle of about 90°, straight upright. Unfortunately, when the user does this, applicants' research indicate they often forget the need to alleviate the strain on the discs of their vertebrae and to return their lumbar curve back to its desired rest position and slouch. In other words, most users don't think about reclining when they are working and miss out on the health benefits of cycling regularly between reclining, sitting upright and standing every 20 minutes or so throughout the day.

Positioning sensors 352 are positioned at different locations on seating structure 310 and are used to detect user presence (is there a user sitting in the chair), if the user is seated upright, the force the user is exerting against backrest 20, and the angular position of backrest with respect to seat portion 24. The type of sensor may vary depending on what it is required to sense, but the sensors are well known and may be conventional. Strain-gauge type sensors may be mounted, for example, within seat portion 324 to detect the user's weight (and therefore the user's seated presence) and also the force the user is exerting against backrest 20. Optical-coupler sensors or hall-type sensors may be used to determine the angle of backrest 20. Any type of sensor may be used here, as understood by those skilled in the art, without departing from the disclosure.

Manual Mode (Remind):

According to a first manual mode of operation of this embodiment of the disclosure, at prescribed times, following a schedule stored in memory 44, microprocessor 42 will first interrogate the sensors to determine certain values, including:

a) If there is a person seated on seat portion 24;
b) The force being exerted against backrest 20;
c) The current angle of backrest 20; and
d) The preset maximum reclining angle (set by the user).

At prescribed times, based on the schedule, if there is a person seated and the current angle of backrest is less than the prescribed and suggested recline angle, microprocessor 42 will send an alert (from alert generator 358) to the seated user, such as a vibration, a tactile impulse, a movement of a chair component, illuminating lights, or generating sounds or a voice, to indicate that a reclined position is suggested to maintain good posture and health. This reminder to the user may also be in the form of a generated alert that will appear on his computer screen, or even on the user's smart phone, as a push notification text or alert. The user may cancel the request by voice (which would be "heard" by a connected microphone 360), pushing a button on input control 50, moving one of the chair components (including rolling the chair on the floor mat) a prescribed number of times, such as two or three times, tapping on a chair component, such as armrest 329 (picked up by a sensor) or using their smart device (such as their cell phone, computer, or other) which is connectable by wireless communication 346 (Bluetooth®, Wi-Fi_33, etc.). According to this mode, and the disclosure, the user is only reminded to change position (recline). The recline tilt lock (or hard-stops) will not be automatically released. If the user does not cancel the alert or reminder, control system 40 will continue to remind the user at preset intervals. If the user does heed the reminder and manually releases the recline tilt lock, he or she will push against backrest 320 (against the action of the spring-bias) until the desired recline angle has been reached. Sensors 352 will detect the angle and will either confirm that the recline angle is following the recommended angle (acceptable) with another confirmation alert, or with another alert that indicates that the user must further recline. The user may still select the maximum angle of recline.

After a prescribed period of time at the reclined position, control system will alert the user that the reclining period has ended and that backrest 320 may be (or should be) returned to the full upright position, or to a different position, such as the previous recline position set by the user. The user may again cancel the alert and remain in the reclined position, as desired.

Automatic Mode (Remind and Disengage):

According to the disclosure, in a semi-automatic mode, control system 40 performs the same reminding process as in the above-described manual mode, but now the user is being reminded that unless he or she cancels the event, any tilt-stop or hard stops will automatically release and backrest 320 will be released and the user will be allowed to lean back to a reclined position. In this mode, backrest 320 does not automatically recline, but only releases any stops that have been preset and subsequently allows the user to recline to a greater degree, the degree to which may be selected by the user in an interface such as a smart-phone connected via Bluetooth. If the user remains seated upright during this time, sensors will detect this and in response, microprocessor 42 will generate alerts, as before, to the user that must be cancelled. The behavior patterns of the user may be aggregated and transmitted to a usage dashboard or otherwise aggregated for later review. Once backrest 320 reaches the prescribed angle of recline (according to the event schedule), applicants contemplate locking backrest 320 in the reclined position. The seated user may activate a control or voice command to release the fully reclined lock at any time.

After a prescribed period of time in the reclined position, control system will alert the user that the reclining period has ended and that backrest 320 will either be unlocked (if that feature is set) or the alert is merely a reminder to the user that the recline time has ended and that the user may raise (with the action of the spring-bias) to an upright position. If the user remains reclined, alerts will continue, but the user may again cancel the alert and remain in the reclined position. Control circuit 40 causes recline lock to automatically match the lock settings before the recline. If it was set to lock, then the locked setting will be reset. Same with unlocked.

In each mode, the user determines the maximum angle of recline.

Training Mode:

Since seating structure 310 can be paired with a separate smart device, applicants contemplate using the smart device to help educate the user how to use the chair—a kind of real-time interactive instruction manual.

In use, when a user touches a control on the chair, for example, a height adjustment lever, this action would be sensed by sensors and the microprocessor would work with an app running on the user's smart-phone to explain how the height adjustment works, with video, graphics and text instructions. When the user does adjust the height of the chair, according to one embodiment, a graphic located on the screen of the smart-phone simultaneously show the seat move in the same direction.

This training tool works with different alerts. In such instance, if the user feels three vibrations in the cushion of their chair, in the training mode, the microprocessor on the chair can communicate to a smart device to push instructions of what the three vibrations means. This would continue for a period of time and automatically shut off. Alternatively, the training tool can be used to detect how the user responds to a particular alert sequence, if applicable, and can use this information to determine if further training is required.

Similarly, the user can tap on the screen of their smart-phone over a particular graphic component of the chair and the information would be transmitted to the microprocessor on the chair which would cause that selected component to move or vibrate, to indicate where a particular component is located.

Figure 21:
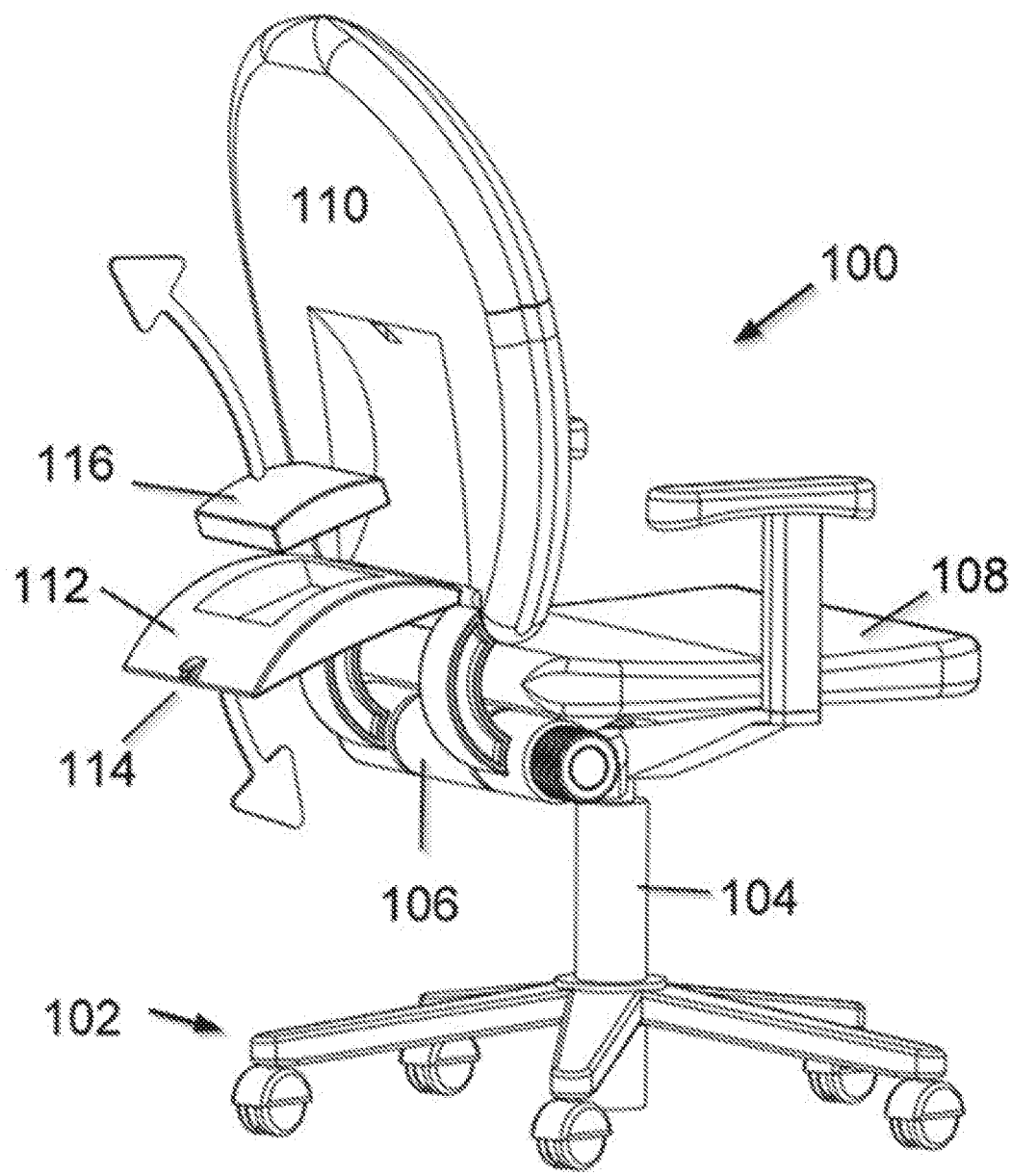
FIG. 21 is a rear perspective view of the seating structure of FIG. 19, showing the module access door open and the module being removed therefrom, in accordance with the present disclosure.

Feature Module:

This disclosure provides a chair that includes an easily accessible and replaceable component (a "module"). The module can be positioned anywhere on the seating structure, but is preferably secured (such as snapping into place or being inserted like a cartridge into a snug-fit recess or cavity) to the backrest of the chair, as shown in FIG. 21. The module includes any of several features including massaging motion to massage the user's back, vibration (or mechanical impact) which may function as an alert to the user, heat and transforming lumbar support, as detailed below.

Figure 17:
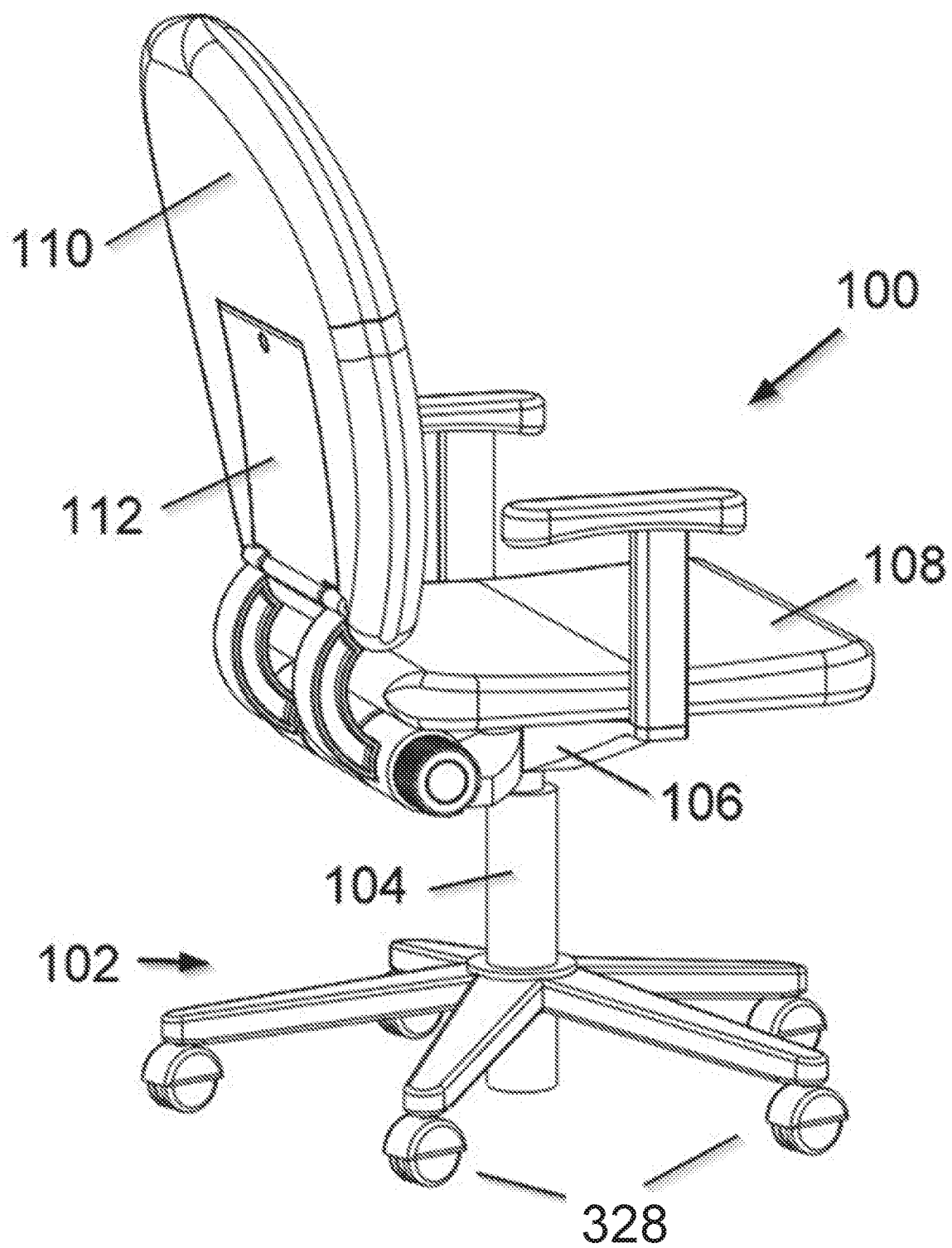
FIG. 17 is a rear perspective view of an exemplary ergonomic seating structure, showing various components, in accordance with the present disclosure.
Figure 20:
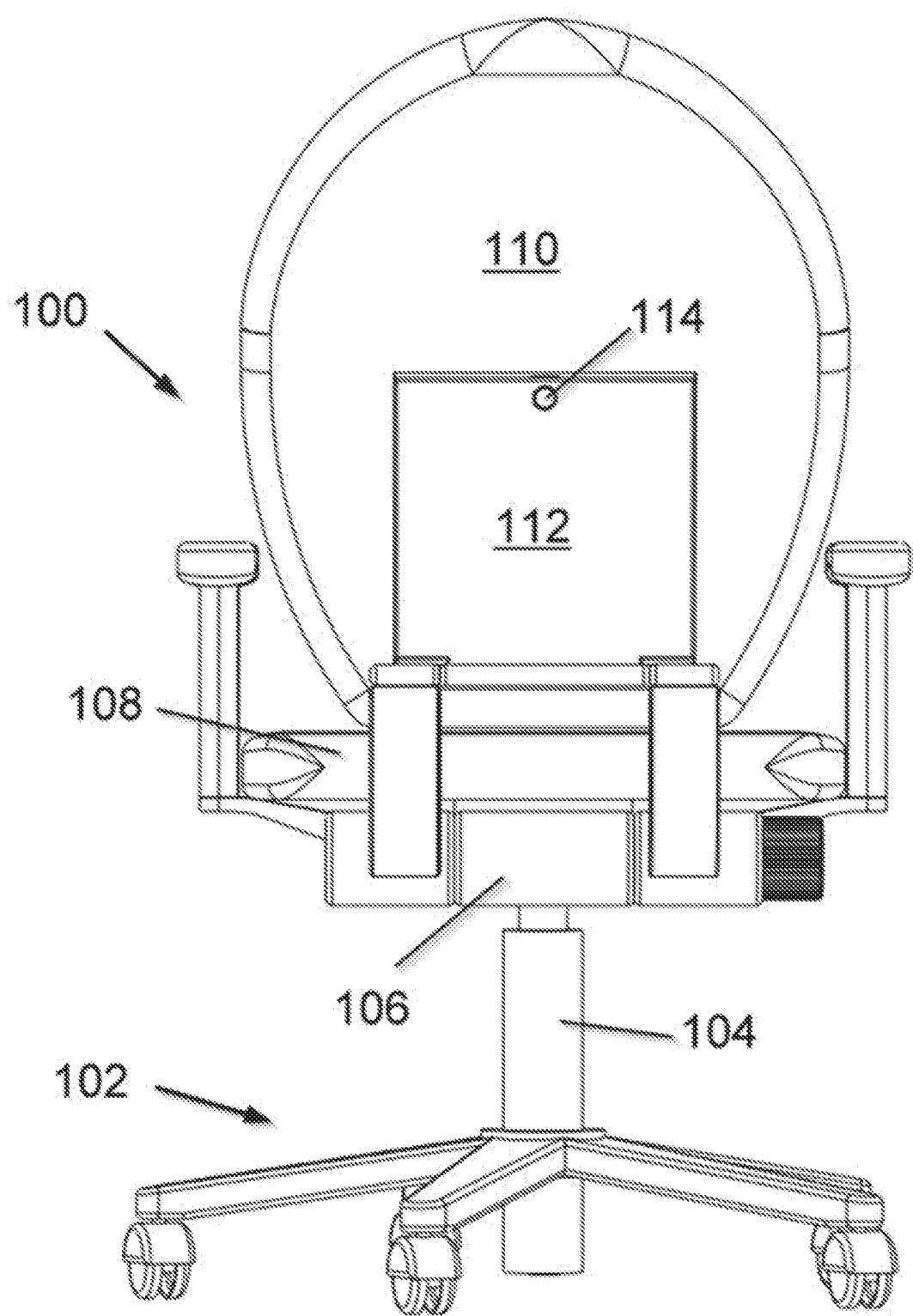
FIG. 20 is a rear plan view of the seating structure of FIG. 17, in accordance with the present disclosure.

Referring now to FIGS. 17, 20 and 21, chair 100 is shown including a dolly assembly 102, a post 104 attached thereto and supporting a yoke 106. A seat portion 108 is attached to yoke 106. A backrest 110 is pivotally attached to yoke 106 and includes a module cover 112 which is pivotally attached to backrest 110, pivotal between a fully closed position, shown in FIG. 17 and an open position, shown in FIG. 21.

Module cover 112 is securable to backrest 110 when in the closed position by a latch 114, for example. When module cover 112 is in the open position, a module 116 can be accessed, removed and replaced by the same module or other ones. Module 116 preferably includes its own power supply (such as batteries, not shown), and is controlled by wireless communication (e.g., Wi-Fi_33, Bluetooth®) to a remote smart device (e.g., smart-phone, remote control unit, a laptop computer, tablet, or smart desk).

One type of application for a module is messaging which includes an electromechanical actuator that can be activated to create single tactile impulses, preferably to the back of the user, a sequence of tactile impulses, or a pattern of pulses generated at prescribed frequencies, amplitudes, and durations. These tactile patterns are used to communication information to the seated user in a subtle and non-disturbing manner. The electromechanical actuator can be a solenoid, a motor rotating an offset weight, linear motion actuators, rotational vibrators, pendulum vibrators and oscillators, or similar. An onboard microprocessor controls the electromechanical actuator to generate a predetermined tactile message to the user's back. Since the microprocessor is paired with the user's smart device, such as his or her phone, and laptop, the tactile messages could provide a reminder that a meeting is starting in 10 minutes, for example. Another proposed use would be to have the tactile messaging convey the passage of time, by transmitting a single impulse, for example, every half hour of time, or at lunch time, etc.

This messaging module could include connections to automatically connect with electrical components already installed in a chair, or could include all the required components, all self-contained, including, a battery, a controller circuit (microprocessor, memory, etc.), an impulse generator and a wireless communication circuit, such as Bluetooth®.

To install the module, in the example shown in the figures, the user simply inserts the module into the cavity of the module door. The door is then closed.

The module feature can be remotely controlled by the user's smart device so that exposed controls on the module itself are not necessary.

Another proposed module includes a section that can expanded or contract against the user's back so that it can selectively provide lumbar support. Once example would be to control the inflation or deflation of a sealed fluid bladder.

Another proposed module includes a heating element and a strong massaging oscillation generator (not shown). This module would provide local heat and massaging on demand by the user. Again, the user merely has to select the option and duration on his or her smart device.

Figure 22:
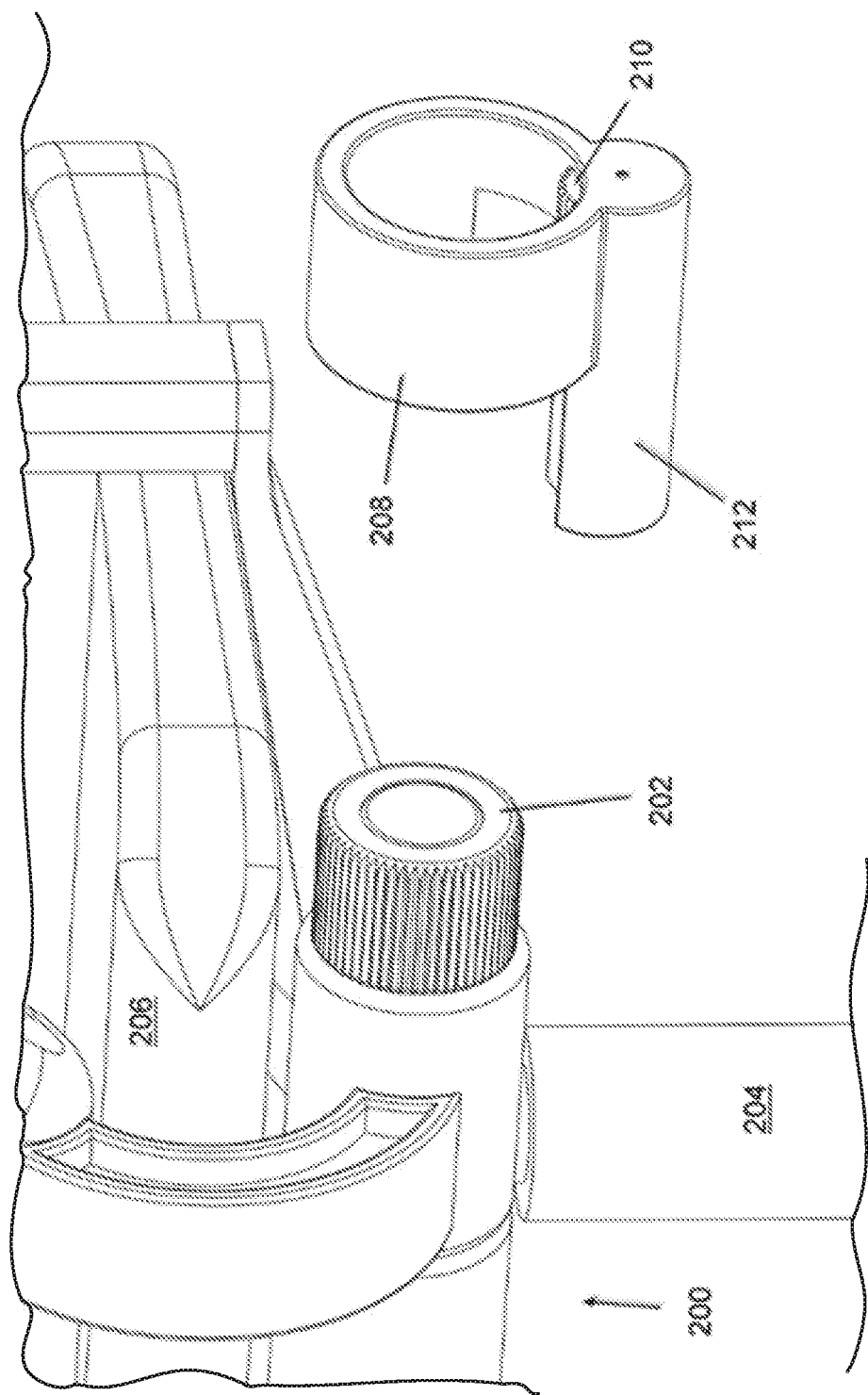
FIG. 22 is a partial perspective view of the seating structure of FIG. 17, showing details of an add-on tilt-control unit prior to being secured to the seating structure, in accordance with the present disclosure.
Figure 23:
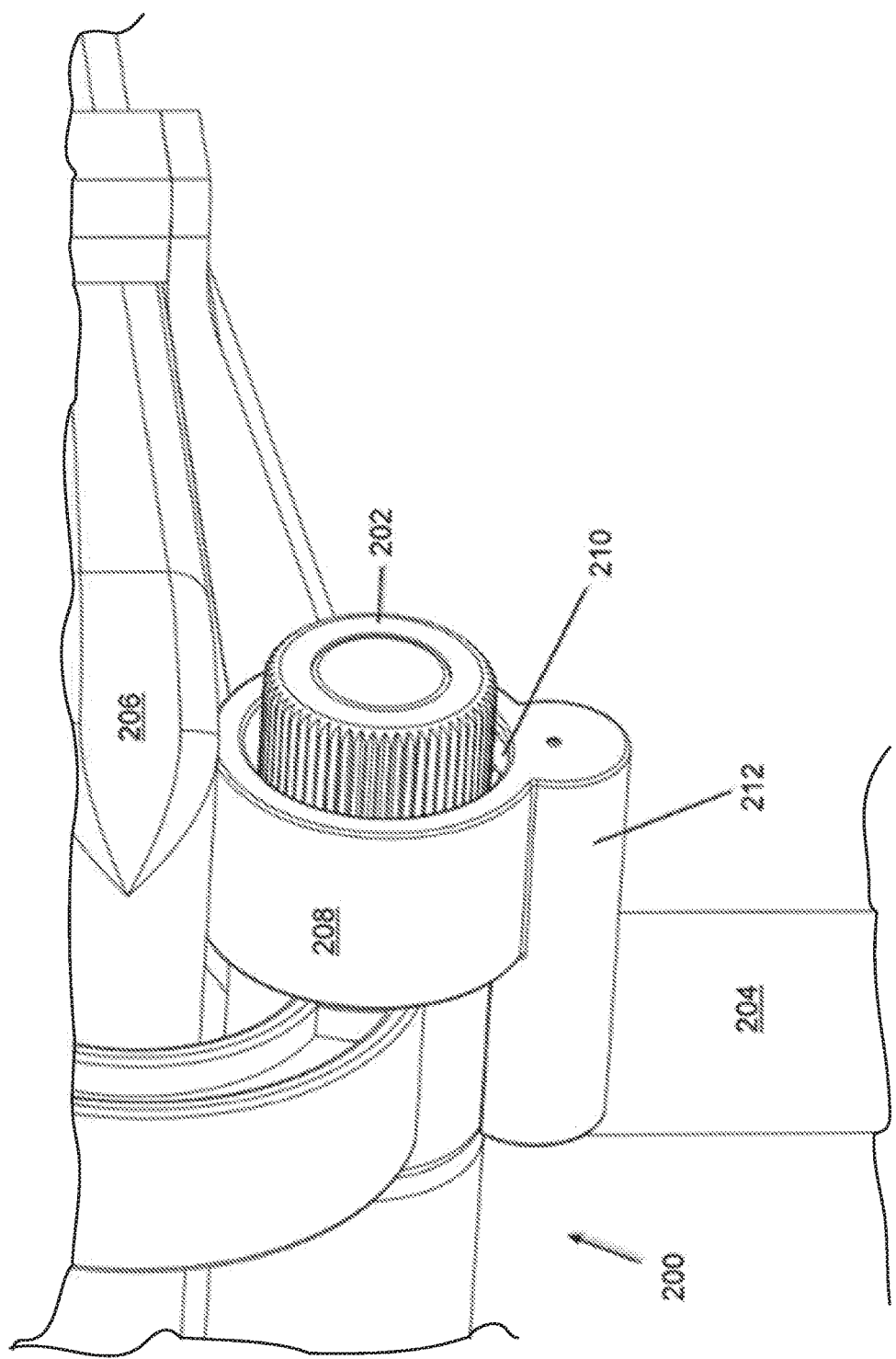
FIG. 23 is a partial perspective view of the seating structure of FIG. 22, showing details of the add-on tilt-control unit secured to the seating structure, in accordance with the present disclosure.
Figure 24:
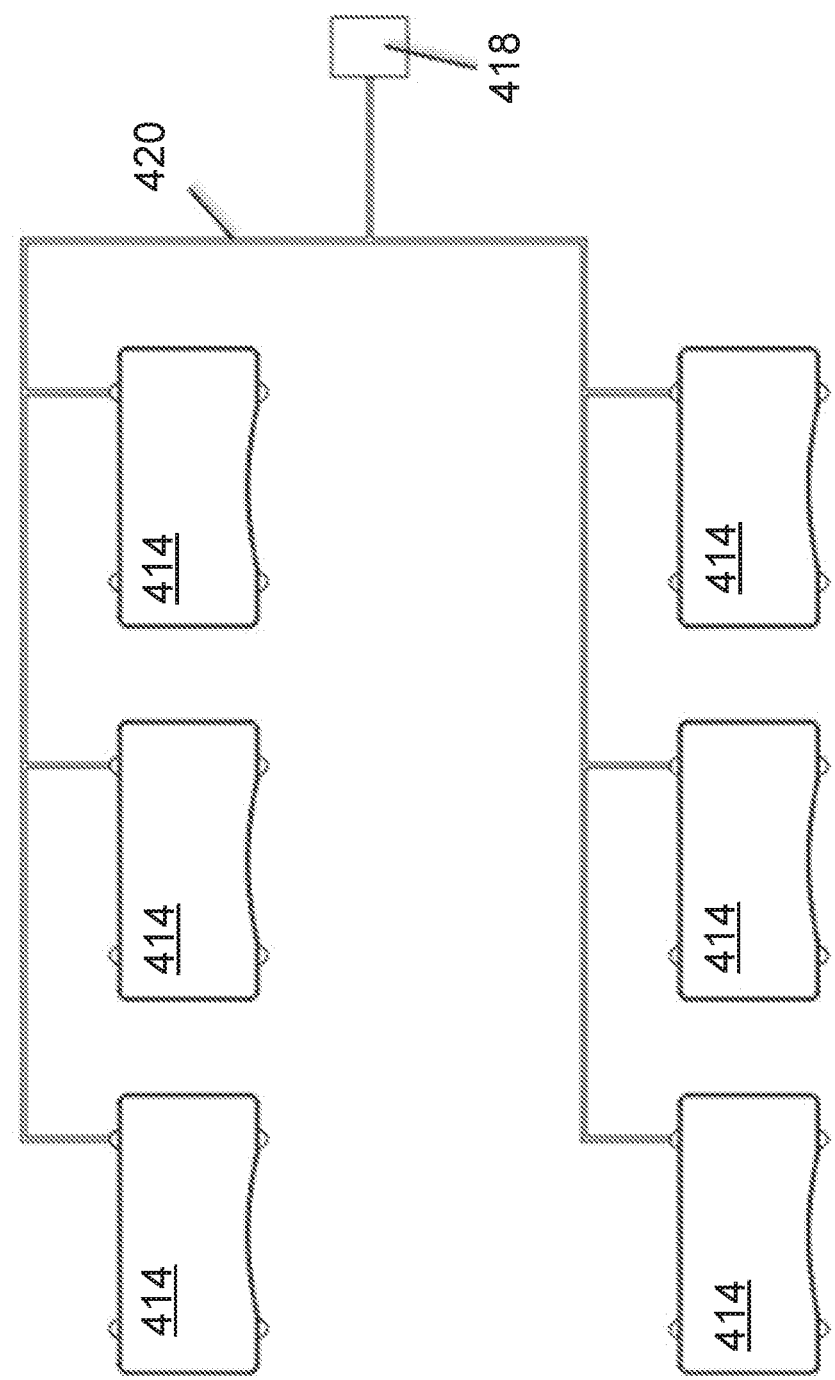
FIG. 24 is a top plan view of an exemplary matrix of installed sit-stand desks showing connection to a controller, according to the present disclosure.

Add-On Tilt Control Unit:

Referring to FIGS. 22, 23 and 24, a seating structure 200 is shown having a seat portion 206 mounted to a post 204. Preferably a knob 202 (having external teeth) is provided to selectively release the recline lock, allowing the user to recline the backrest of the seating structure. Other mechanisms for actuated rotation may be used here in place of the knob, as understood by those skilled in the art. According to this disclosure, an add-on tilt-control unit 208 is provided which includes a housing 212 that houses an actuator (not shown), a drive gear 210, a battery (not shown), and controlling circuitry (not shown, but the same as shown in FIG. 19 and described above. Add-on tilt control unit 208 would be custom made to fit each seating structure 200, as required. In this example, add-on tilt control unit 208 is designed and shaped to snuggly secure to seating structure 200 around knob 202, as shown in the figures. As shown in FIG. 24, gear 210 is sized and positioned to engage the teeth of knob 202. Gear 210 is mechanically attached to the actuator of the add-on tilt control unit 208 so that when actuator is activated, gear 210 will rotate and, in turn, rotate knob 202, in a direction that causes the factory-installed tilt-lock mechanism that is located within seating structure 200.

Once installed to seating structure 200, as shown in FIG. 23 and, the operation of add-on tilt control unit 208 is the same as above-described embodiments. Depending on the mode, control circuitry, powered by onboard battery, announces to the user that the position-change schedule is recommending a position change. If the recommended change is a recline, the user will be so notified by an appropriate alert, as described above in earlier embodiments. The user may decline by moving the chair side to side or pivoting the seat 206 about post 204 or use other input methods described in this specification. Sensors within add-on tilt control unit 208 will detect this and reschedule the position-changing event. If the user accepts the change (by doing nothing), the add-on tilt control unit 208 will activate the internal actuator and gear 210 so rotate knob 202 and release the reclining tilt-lock. The user will then push back against the backrest to a reclined position. After a prescribed period of time, the user will again be alerted and he can again move back to a different position. Of course, other tilt-lock and tilt-release mechanisms may be used in connection with this embodiment of the disclosure, as understood by those skilled in the art.

Health Management Light:

According to this disclosure, an LED is mounted to the seating structure or nearby desk and will illuminate when the user (employee) is actively following the prescribed position-change schedule during reclining. This communicates that that the user is reclining for health management reasons and addresses cultural inhibitions to reclining in certain office environments that applicants have identified in their research. Control circuit 40 can also instruct a nearby smart-device to offer a similar indication. A separate device could be positioned on the desk and instructed to illuminate during this time period of reclining or when standing to provide encouragement help overcome cultural barriers to these changes in work styles.

Sit-Stand Desk with Remote Height Management:

By way of overview and introduction, the present disclosure concerns improvements of managing sit-stand desks and in turn, positively influencing healthy behavior of workers. The embodiments discussed below are not intended to be exhaustive or limit the disclosure to the precise forms disclosed in the following detailed description. Rather, the embodiments are chosen and described so that others skilled in the art may utilize their teachings.

Figure 25:
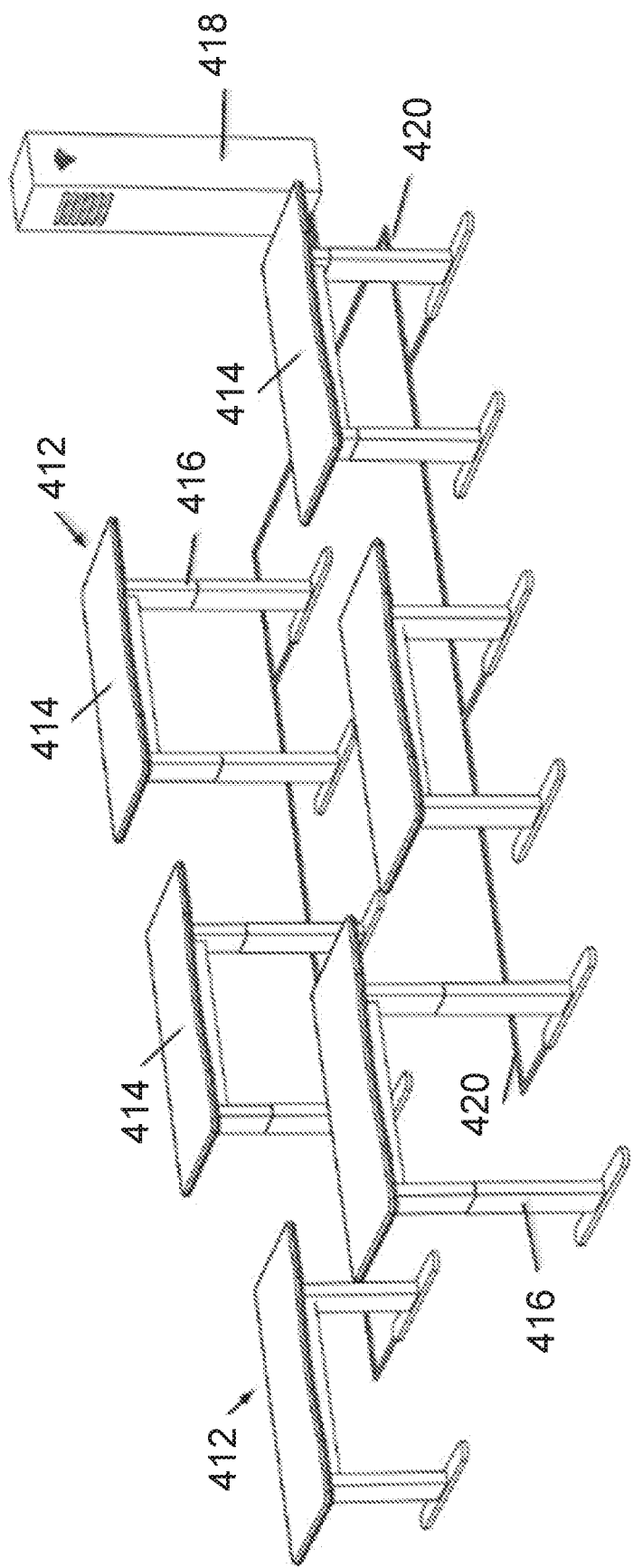
FIG. 25 is a perspective view of the exemplary sit-stand desks of FIG. 24, showing each desk having a worktop positioned at a different height, according to the present disclosure.
Figure 26:
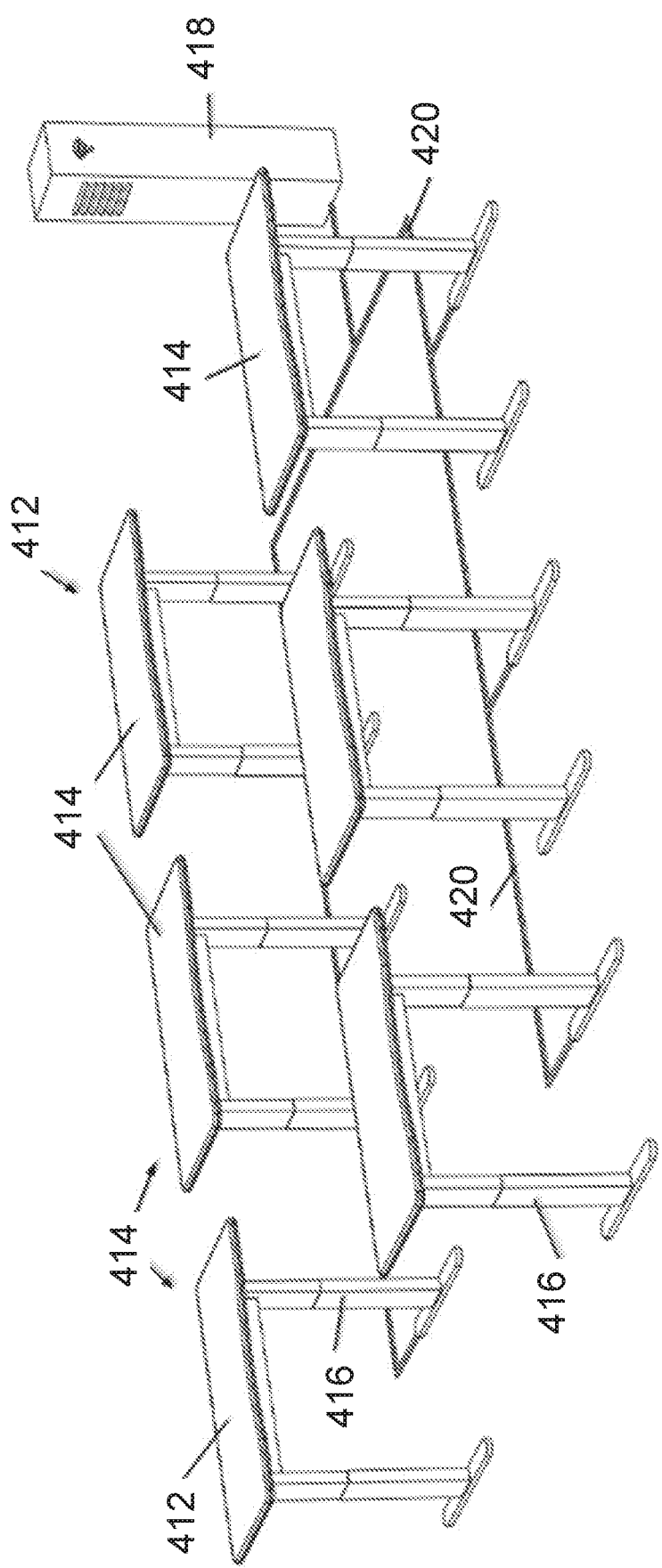
FIG. 26 is a perspective view of the exemplary sit-stand desks of FIG. 24, showing the worktop of each desk in the matrix positioned at a common height, according to the present disclosure.

Referring to FIGS. 24-26, an exemplary installation of six sit-stand desks are shown. Each desk 412 includes a worktop 414, and motorized legs 416. According to a first embodiment of the disclosure, motorized legs 416 are controlled by a local control unit (not shown) secured to worktop 414. A user of each desk 412 can use the control unit to power motorized legs 416 to move worktop 414 up and down to a desired height. According to this disclosure, each control unit of each desk 412 is connected to a local master controller 418. The connection can be either hardwired, such as using a CAT-5 communication cable 420 shown in the figures, or wirelessly, using Bluetooth®, Wi-Fi, or another suitable system.

According to one embodiment of the disclosure, local master controller 418 includes a timing circuit (not shown), an Internet connection (not shown) and a control panel (not shown). Local master controller 418 is in electrical communication with each of desks 412 and may change the height of each worktop 414 of each desk 412 either individually, in preselected groups, or all simultaneously. The height change to any, or all worktops 414 (that are connected to local master controller 418) can be controlled manually, by an operator using the control panel (not shown) located at local master controller 418. Alternatively, the height change commands to select desks or all desks may be generated automatically, following a timing schedule, such as:

| Which desk(s)? | Move to what height? | When should this occur? | On which days? |
| --- | --- | --- | --- |
| ALL | 44 inches | 8:00 PM | M-F |

In the above example, the desktops of ALL the desks controlled by local master controller 418 are programmed to reposition to a new set height of 44 inches above the floor at 8:00 PM, each night, Monday thru Friday, unless instructed otherwise. According to another embodiment of the disclosure, sensors (not shown) located at each desk 412 detect the presence of a user at a desk. Such sensors may be proximity, pressure (used in connection with a pressure mat), infrared (e.g., thermal), optical, capacitive, or similar, as is well known by those skilled in the art. If it is determined (through sensing) that a particular desk is being used at the time of a scheduled height change (e.g., at 8:00 pm, Monday), an "in use" signal will be sent to, or read by local master controller 418 at the time of the planned event. In such instance, all other, unoccupied desks will proceed to move to the new scheduled height (e.g., 44 inches), but the occupied desk in this example will remain unchanged and in full control by the immediate user. Once it is determined (by scheduled interrogation of local master controller 418) that the user no longer occupies the particular lone desk, local master controller 418 will instruct that desk to raise its worktop 414 to the scheduled height (e.g., 44 inches) to match the height of the other desks in the group.

According to the present disclosure, if a user returns to a desk after leaving and his or her desk has already been raised to a new scheduled height by local master controller 418, the user may simple return the desktop height to any desired height using the controls at the desk. Local master controller 418 will periodically interrogate that desk (and any other desk which is forced off the master height schedule by the user) to determine through electronic sensing if the user has left. At such time, local master controller 418 will again reset the height of the now unoccupied desk to match the height of the others, or to match the prescribed height of that desk, according to the preset schedule.

In one embodiment, the height of each desk is programmed to move to a set height that is common to all desks (i.e., all desks will move to the same height value) in the controlled group, as represented illustratively in FIG. 26. According to another embodiment of the disclosure, each desktop is moved to the "stand" height set by and specific to each respective user (their highest worktop setting). In this embodiment, each desk will raise to a specific max height which may or may not be equal to the other desks in the group.

An important benefit to having all sit-stand desks pre-positioned at the "stand" position in the morning when the users arrive is that doing so encourages the users to actively use the sit-stand desk to benefit their respective health. Applicants have learned that there is a psychological benefit generated when a user arrives and sees their desk in the stand position. The user is more likely to start their work standing and is more likely to continue using the sit-stand schedule of their own desk throughout the day. By setting their sit-stand desk to its "stand" position at the start of the day, the user is reminded of the desk's main purpose—to encourage a healthy lifestyle and behavior.

Another benefit to having the worktops 414 all rise to a high setting at night, is that doing so provides better access for the cleaning crew to clean under and around each desk.

The present system could also lower each desk to a low height if desk includes sensors that allow the desk to stop in respond to contact with an obstruction or sense obstructions and not descend. This is not always a preferred approach so some desks only include functions that only automatically raise the desk.

It is not uncommon, in some installations to have hundreds of sit-stand desks arranged and online, in a single large group (such as at a call-center). In this environment, it is not uncommon for several or many desks to be unoccupied for extended periods of time, as different factors change the schedules and populations of workers throughout the group. Having the worktop 414 of some or many unused desks in the room remain in a "stand" or high-setting position for extended periods of time may be considered unsightly, or may otherwise interfere with daily operations as people move about in the room and between the desks. To address this concerns and according to another feature of this disclosure, user-data history for each desk and sensors located at each desk could be used to determine the occupancy of any desk in the group. If it is determined that any desk has not been occupied for a predetermined period of time, for example, at least 2 days in a row, local master controller 418 would flag those specific desks to remain at a low, "seated" height until the desks are used once again. By doing this, the present system would not force the worktops 414 of unused desks to remain raised at the "stand" or max positions for extended periods of time during work hours.

System for Remotely Powering Seat Structures:

Referring now to FIGS. 27-31, a system for remotely powering a seat structure is shown, including a chair 450 having a base 452, a central post 454, a seat portion 456, a backrest 458 and armrests 460. Chair 450 is shown positioned on a floor mat 462 in FIG. 27. As described in greater detail below, floor mat 462 includes at least one embedded primary induction coil 464 which is electrically connected to a charging control circuit (not shown) and is powered by line voltage (plugged into a nearby outlet—not shown).

Chair 450 may be conventional in structure in that base 452 includes a number of radially disposed, equally spaced legs 466 (usually five) radiating from central post 454, which is vertically disposed. Attached to the remote end of each leg 466 is a caster wheel 470, collectively allowing the chair to selectively roll along floor mat 462. Seat portion 456, backrest 458, and armrests 460 are either directly or indirectly mechanically supported by central post 454 and in turn support the seated user. In conventional use of chair 450, as is well known, a user sits on seat portion 456, leans back, as desired against backrest 458 and supports his or her arms on armrests 460, again as desired. The user may push their feet against floor mat 462 to cause the entire chair 450 to roll on caster wheels 470 along the floor mat in any planar direction, as necessary.

According to the present disclosure, and referring to FIGS. 28-31, a secondary induction coil and drive assembly 480 is secured to the underside of base 452. Assembly 480 includes an upper housing 482 and a vertically displaceable lower housing 484. Lower housing 484 supports a secondary induction coil 486, a drive wheel assembly 488, and location sensors 490. As mentioned above, lower housing 484 may be selectively displaced vertically with respect to upper housing 482, as described below. However, lower housing 484 is preferably snugly slidably engaged in a telescoping manner with upper housing 482, allowing relative vertical movement, but minimal relative lateral or transverse displacement. Lower housing 484 mechanically supports drive assembly 480, which, although not shown in great detail, includes a drive motor connected to a drive wheel 492 and drive circuitry. Drive motor (not shown) and drive wheel 492 are mounted to a pivotal frame (not shown) which can rotate about a central axis. A steering drive (not shown) is mounted within lower housing 484 and connected to the pivotal frame (not shown). Steering drive is connected to drive circuitry.

An actuator (not shown) is mounted to either lower housing 484 or upper housing 482 and is used to displace lower housing 484 with respect to upper housing 482 in a controlled manner. This actuator is preferably a servo type drive motor, but may also be a linear drive motor or solenoid, or a drive mechanism used in combination with an over-center spring arrangement. Regardless of the type of actuator used, the function of the actuator is to move lower assembly 484 between a lower position (shown in FIG. 31), wherein drive wheel 492 frictionally engages floor mat 462 and secondary induction coil 486 becomes immediately adjacent to the upper surface of floor mat 462, and an upper position (shown in FIG. 30), wherein drive wheel 492 and secondary induction coil 486 are remote from floor mat 462, as described in greater detail below.

Figure 27:
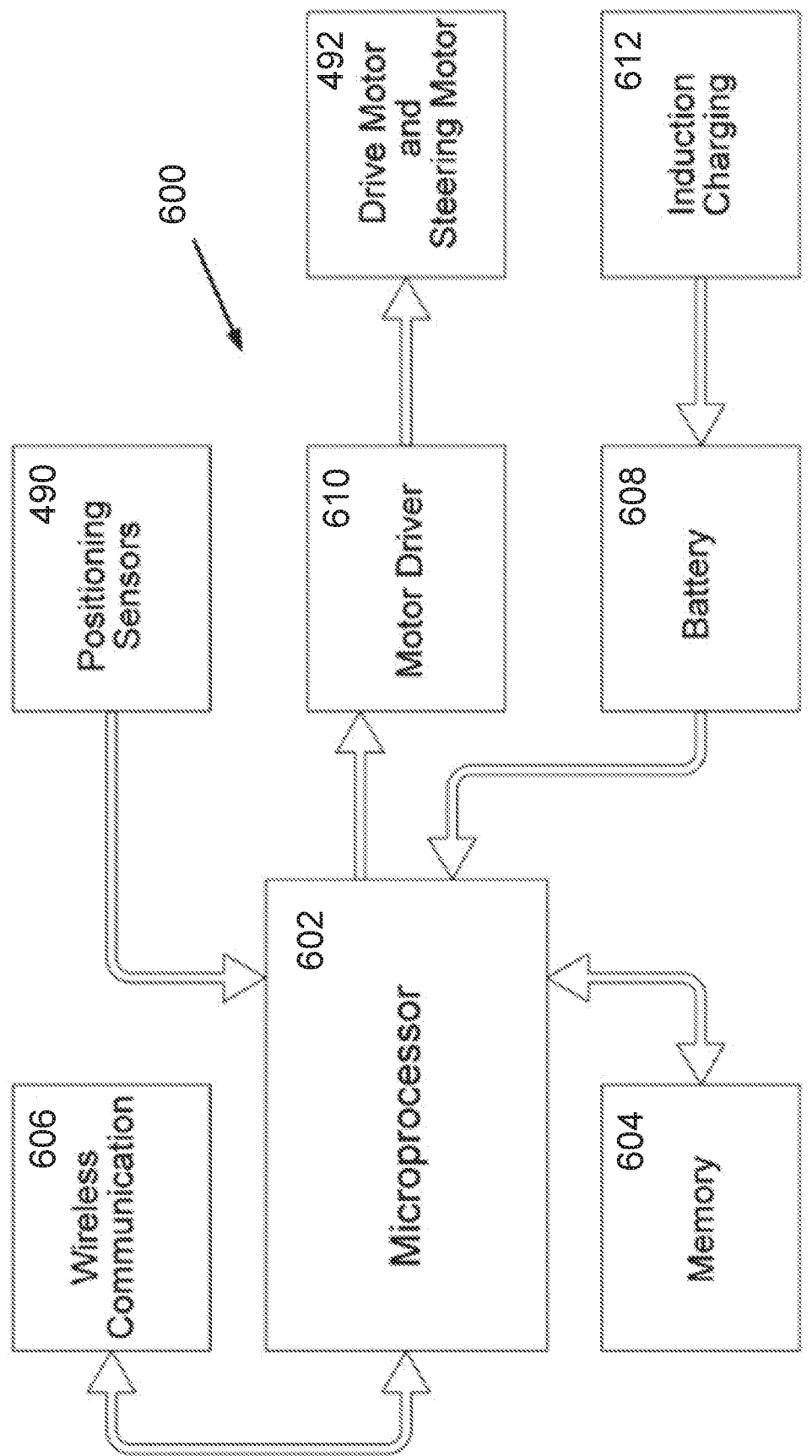
FIG. 27 is an operational schematic showing the different components used to operate various electrical functions of a chargeable mobile chair, according to the present disclosure.
Figure 28:
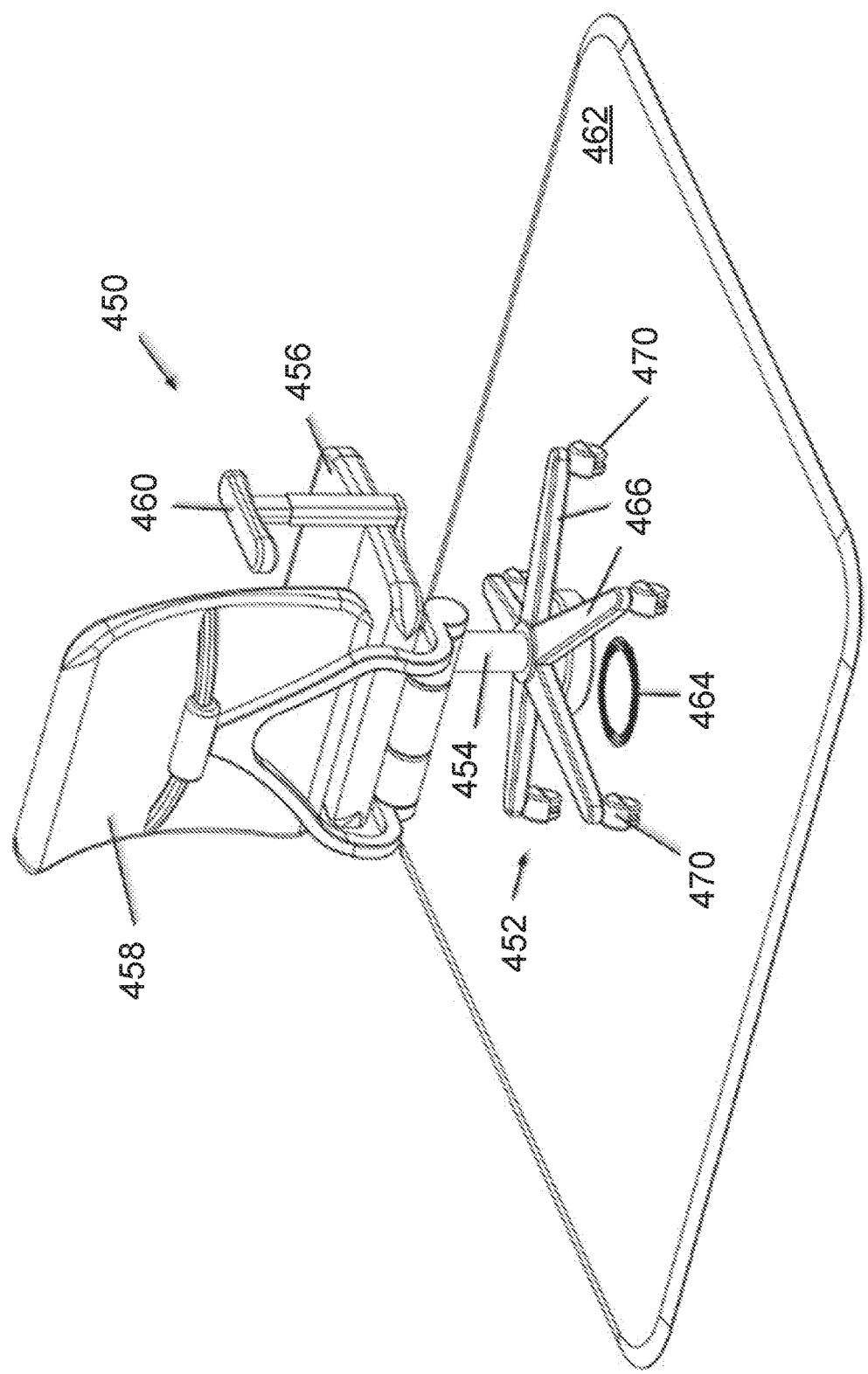
FIG. 28 is a perspective view of a mobile chair located on a chair-mat, showing details of an induction charging system, according to the present disclosure.
Figure 29:
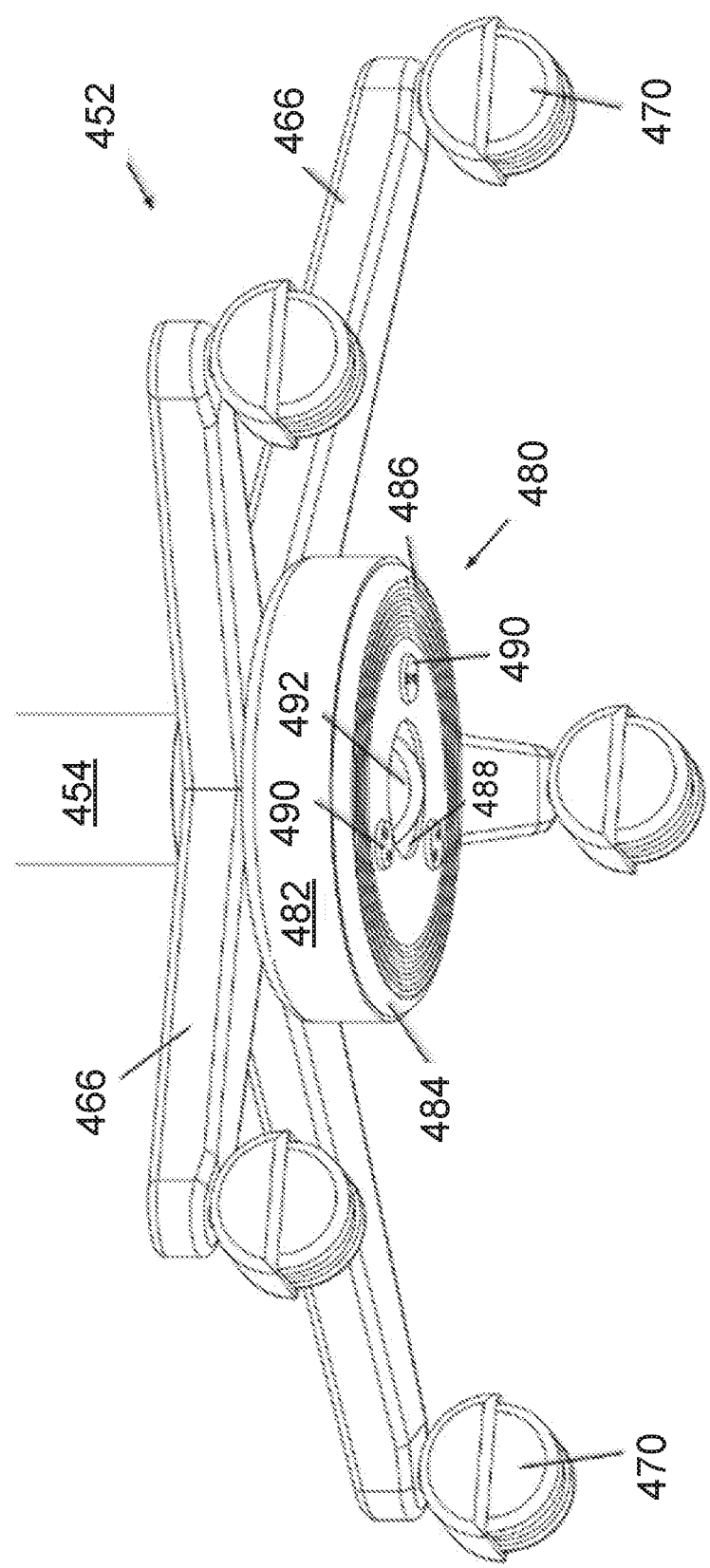
FIG. 29 is a perspective view of a portion of the mobile chair of FIG. 28, showing a chair base supporting the induction charging system of FIG. 28 with the system shown in a retracted and stowed position, according to the present disclosure.
Figure 30:
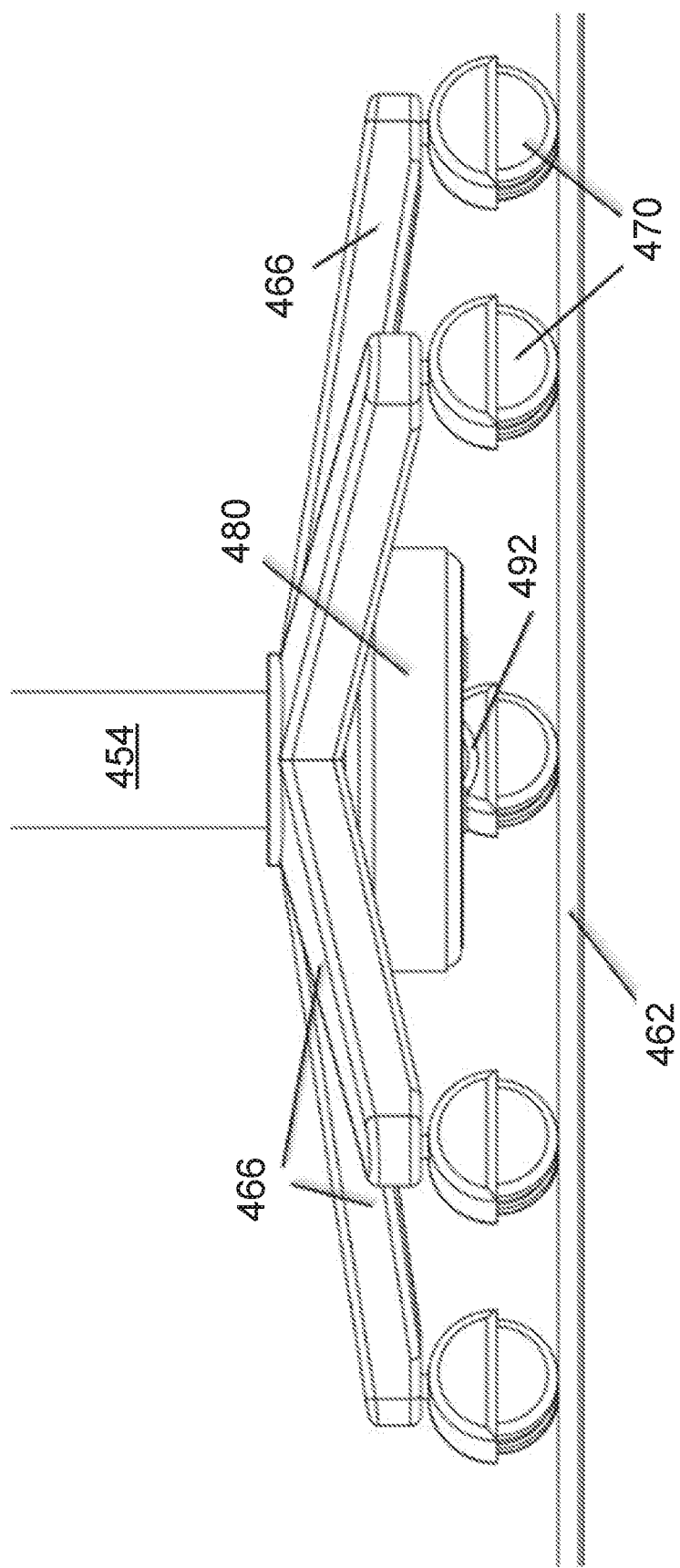
FIG. 30 is an elevation side view of the induction charging system of FIG. 29 with the system shown in a retracted and stowed position, according to the present disclosure.

As shown in the operational schematic of FIG. 27, a control circuit 600 includes a microprocessor 602, memory 604, wireless communication 606 and a battery 608. Control circuit 600 is located on chair 450 in an appropriate (preferably accessible, but hidden) location. Microprocessor 602 is connected a motor driver circuit 610, which in turn is connected to the above-described drive motor that powers drive wheel 492 and steering drive (not shown). Battery 608 is an appropriate rechargeable battery and is used to power all electronic components used on chair 450, including microprocessor 602, memory 604, wireless communication 606 and allow drive actuators described herein. Battery 608 is also electrically connected to an induction charging control circuit 612. Positioning sensors 490 are connected to microprocessor 602 to provide positioning information of chair 450 on mat 462, as described in greater detail below.

Figure 31:
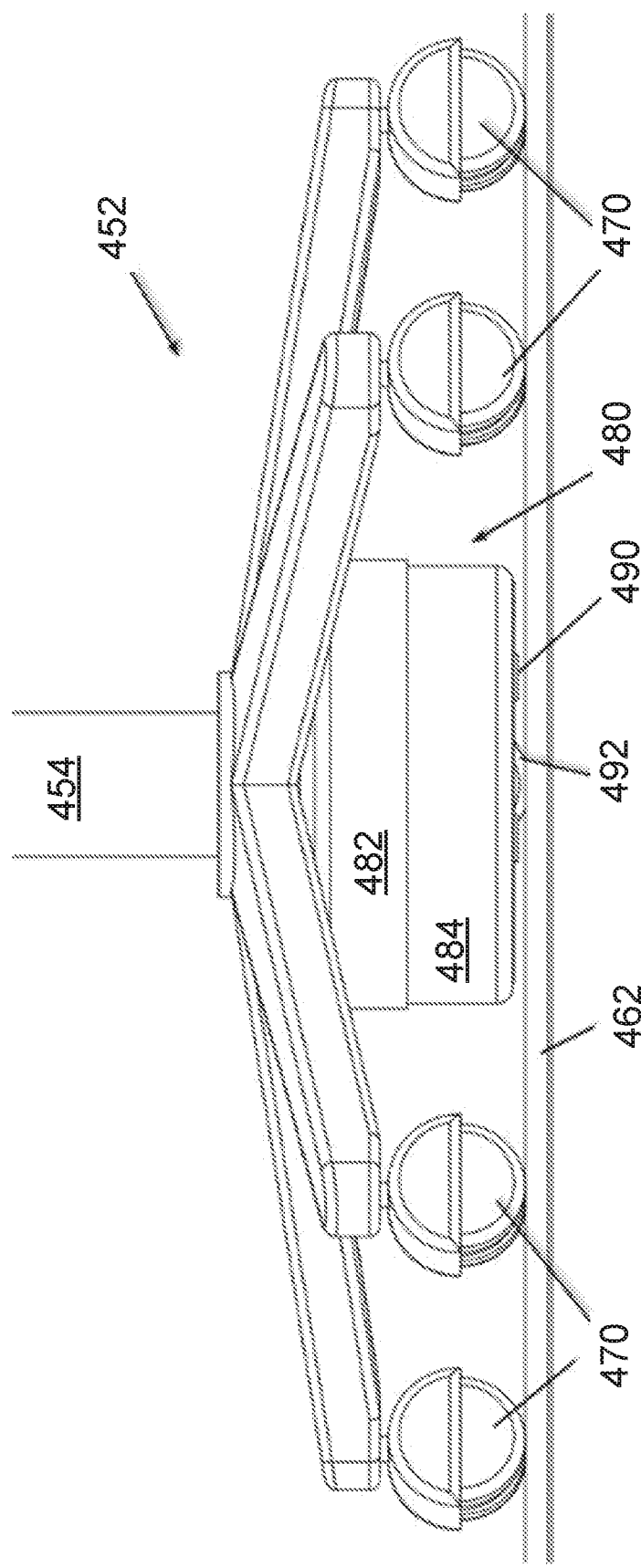
FIG. 31 is an elevation side view of the induction charging system of FIGS. 29 and 30 with the system shown in an extended and deployed charging position, according to the present disclosure.

Referring to figure FIG. 31, a section of floor mat 462 is shown including a plurality of lines 620. The lines are preferably printed onto mat 62 and thereafter coated with a protective coating so that lines 620 will not wear out during use. Lines 620 are sensed by sensors 490 and used to help control circuit determine the exact location of chair 450 on mat 462. Lines 620 can vary in width, and/or vary in spacing therebetween. This controlled variation in either line width or line spacing is accurately measure by sensors 490, similar to how a conventional laser mouse reads a mouse pad to determine relative location and movement. As explained below, when lower assembly 484 is positioned in the lower position (as shown in FIG. 31), sensors 490 become immediately adjacent to mat 462 and lines 620. As chair 450 is moved across mat 462, sensors 490 move across lines 620 and measure their unique characteristics, such as line width and line spacing and send this information to microprocessor 602 during operation, as described below. In this embodiment, sensors 490 are laser emitter and receiver type, but sensors 490 may be other types, including infrared or magnetic (Hall sensors), in which case, lines 620 would be made from a magnetic material so that they would be detectable by the Hall type sensors.

In use of chair 450, battery 608 is initially fully charged and any electrically-powered accessories of chair 450 can be used throughout the day by a user. Microprocessor 602 carefully measures the charge of battery 608, as it discharges. When the charge remaining on battery 608 reaches a certain level, microprocessor 602 will activate an audible (sound), visual (LED), or tactile (vibration) alert to the user, indicating that the battery is low and that charging is required for that night. It is preferred that control circuit will charge battery 608 frequently enough to always allow the user with full use of all electrical accessories during each day. When battery 608 requires charging and the user is so alerted by microprocessor 602, the user may (if he or she remembers) manually position chair 450 to align over primary charging coil 464 located in mat 462. Since charging coil 464 is embedded within mat 462, a visual mark (not shown in the drawings) is preferably provided on the mat surface so that the user may easily see coil 464 during chair alignment. If the user does manually move chair 450 over primary coil 464, the user will activate a button or switch on chair 450 (not shown) which will cause control circuit to deploy lower assembly 484. This will cause secondary coil 486 to become immediately adjacent to primary coil 484. In such instance, a charging circuit (not shown) located within mat 462 will detect that the two coils are aligned and will activate primary coil 464 (allowing current to flow therethrough). As is well known, the current flowing in primary coil 464 will induce a charge and current to flow in the adjacent second coil 486, which will in turn be used to charge battery 608 located on chair 450.

Should the user forget to move chair 450 into the coil-aligned charging position, control circuit 600 will do it automatically. Once battery charge passes a predetermined threshold, and the time of day reaches a predetermined time (e.g., 9 PM), and sensors detect that a user is not seated in seat rest 456 (by measuring load thereon) microprocessor 602 will activate motor driver 610 to drive actuator (not shown) to move lower assembly 484 from its raised and stowed position, shown in FIG. 30, to its lowered position, shown in FIG. 31. In the lowered position, drive wheel 492 will frictionally contact the upper surface of floor mat 462.

Once drive wheel is fully lowered, control circuit will power the motor attached to drive wheel 492 causing chair 450 to roll about mat 462. During this initial drive period, sensors 490 located on the lower surface of lower assembly 484 will accurately read lines 620 located within mat 462. This detection and reading of lines 620 will allow microprocessor 602 to determine the chair's location on mat 462. Microprocessor 602 will then control drive motor and the steering motor to effectively move chair 450 so that secondary induction coil 486 aligns with primary induction coil 464, allowing charging to commence.

Once charging completes (either battery 608 is fully charged or after a prescribed time period), an appropriate motor will be activated to return lower assembly from its deployed position back to its retracted and stowed position.

Should chair 450 be moved when lower assembly 484 is in its deployed position, sensors 490 will immediately detect this and microprocessor 602 will instantly raise lower assembly 484 so that drive wheel 492 no longer contacts floor mat 462. After a period of time, as long as chair 450 is not moving and no person is detected seated thereon, lower assembly 484 will again be deployed, drive motor will again activate so that sensors 490 can determine the chair location on mat 462 and control circuit 600 can again drive motors to move it back to the charging location so that charging may continue.

While this disclosure has been described as having an exemplary design, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

While the invention may be susceptible to various modifications and alternative forms, specific embodiments have been shown by way of example in the drawings and have been described in detail herein. However, it should be understood that the invention is not intended to be limited to the particular forms disclosed. For example, Thus, the invention is to cover all modifications, equivalents, and alternatives falling within the spirit and scope of the invention as defined by the following appended claims.

What is claimed is:

1. A system for managing the elevation of a workstation, the system comprising:
   a frame;
   a worktop having an upper worksurface;
   at least a first powered vertical-displacement drive mechanism connected between the frame and the worktop and arranged to selectively vertically displace the worktop with respect to the frame;
   a presence sensor detecting presence of a user's body within a sensing zone associated with the workstation and generating a signal indicating user presence at the workstation whenever any user's body is present within the sensing zone; and
   a memory device storing at least a first height adjustment time specifying a specific time during a day at which the worktop is to be automatically moved to a first scheduled height when at a height that is different than the first scheduled height, the first height adjustment time being prescheduled prior to any use of the workstation during the day and that occurs independent of any prior workstation use during the day;
   a processor linked to the drive mechanism and the sensor, the processor programmed to track a current time and identify occurrence of at least the first height adjustment time, the processor using presence sensor signals to track user presence at the workstation and, upon determining in information from the presence sensor that no user is present at the workstation at the at least a first height adjustment time and that the worktop is at a height that is different than the first scheduled height, automatically controlling the drive mechanism to move the worktop from a current height to the first scheduled height.

2. The system of claim 1 wherein the memory device stores a plurality of prescheduled height adjustment times, the processor further programmed to identify occurrence of each of the plurality of prescheduled height adjustment times, the processor automatically adjusting worktop elevation each time one of the prescheduled height adjustment times occurs while no user is present at the workstation.

3. The system of claim 2 further including an interface enabling users to manually control worktop elevation by controlling the drive mechanism wherein, while any user is present at the workstation, worktop elevation changes require at least some manual user input via the interface.

4. The system of claim 3 wherein the interface is useable at any time while a user is present at the workstation to manually change the worktop elevation.

5. The system of claim 4 wherein the first scheduled height is a standing user height.

6. The system of claim 4 wherein the first scheduled height is a sitting user height.

7. The system of claim 4 wherein the workstation is used by a primary user and wherein the first scheduled height is specific to the primary user.

8. The system of claim 2 wherein at least a first prescheduled height adjustment time of the plurality of prescheduled height adjustment times occurs at a specific time each night.

9. The system of claim 2 wherein at least a first prescheduled height adjustment time of the plurality of prescheduled height adjustment times occurs at a time of day so that the worktop is positioned at a standing height prior to the start of a user workday.

10. The system of claim 1 further including another sensor for sensing obstructions to movement of the worktop from the current height to the scheduled height, the processor halting worktop elevation changes upon the occurrence of a sensed obstruction.

11. The system of claim 1 for use with multiple height adjustable workstations wherein the processor controls a drive mechanism in each of the workstations to automatically move the worktop at each specific workstation from a current height to a first scheduled height upon detection that no user is present at the specific workstation at the first height adjustment time.

12. The system of claim 11 wherein the processor is further programmed to track a current time and identify occurrence of each of a plurality of prescheduled height adjustment times, the processor automatically adjusting worktop elevation at each workstation each time one of the plurality of prescheduled height adjustment times occurs while no one is present at the workstation and while the worktop at the workstation is at a height other than the first scheduled height.

13. The system of claim 12 wherein the first scheduled heights for at least first and second workstations are different elevations.

14. The system of claim 1 wherein the sensor is one of a proximity sensor and a capacitive sensor.

15. The system of claim 1 wherein the processor further provides periodic reminders to a workstation user to change the worktop height while the user is present at the workstation.

16. The system of claim 15 further including an interface enabling a user to manually control the drive mechanism to change worktop height, the processor only enabling the user interface to control the drive mechanism while a user is present at the workstation.

17. The system of claim 1 wherein the processor is further programmed to, while a user's body is present at the workstation, track at least a first duration of time while the worktop is at a specific height and, upon the first duration reaching a threshold duration, providing a signal to the user indicating the threshold duration.

18. The system of claim 17 further including an interface enabling users to manually control worktop elevation by controlling the drive mechanism wherein, while any user is present at the workstation, worktop elevation changes require at least some manual user input via the interface.

19. The system of claim 18 wherein the interface is useable at any time while a user is present at the workstation to manually change the worktop elevation.

20. The system of claim 17 wherein the signal indicating the threshold duration includes causing the worktop to move independent of any user input via the interface such that the movement can be hapticly detected by a user in contact with the worktop.

21. A method for managing the elevation of a workstation, the method comprising the steps of:
    detecting presence of a user's body within a sensing zone associated with the workstation and generating a signal indicating user presence at the workstation whenever any user is present within the sensing zone;
    storing at least a first height adjustment time specifying a first specific time during a day at which the worktop is to be automatically moved to a first scheduled height when the worktop is at a height different than the first scheduled height, the first height adjustment time being prescheduled prior to any use of the workstation during the day and that occurs independent of any workstation use during the day; and
    using presence sensor signals to track user presence at the workstation and, upon determining that no user is present at the workstation at the first height adjustment time and that the worktop is at a height other than the first scheduled height, automatically moving the worktop to the first scheduled height.

22. The method of claim 21 wherein the step of storing includes storing a first scheduled height associated with the first prescheduled height adjustment time and a second scheduled height associated with the second prescheduled height adjustment time and wherein, the method further including moving the worktop to the first scheduled height while the station is vacant at the first prescheduled height adjustment time while the workstation is vacant and automatically moving the worktop to the second scheduled height while the station is vacant at the second prescheduled height adjustment time.

23. A system for managing the elevation of a workstation, the system comprising:
    a frame;
    a worktop having an upper worksurface;
    at least a first powered vertical-displacement drive mechanism connected between the frame and the worktop and arranged to selectively vertically displace the worktop with respect to the frame;
    a memory device storing a plurality of height adjustment times specifying specific times during a day at which the worktop is to be automatically moved to a scheduled height, each of the plurality of height adjustment times being prescheduled prior to any use of the workstation during the day and that occurs independent of any prior workstation use during the day; and
    a presence sensor detecting presence of a user's body within a sensing zone associated with the workstation and generating a signal indicating user presence at the workstation whenever any user's body is present within the sensing zone; and
    a processor linked to the drive mechanism and the sensor, the processor tracking current time and identifying occurrence of each of the plurality of height adjustment times, the processor further using presence sensor signals to track user presence at the workstation and automatically adjusting the worktop elevation to the scheduled height each time any of the plurality of prescheduled height adjustment times occurs while the worktop is at a height that is different than the scheduled height while no user is present at the workstation.

* * * * *